US011671688B2

(12) United States Patent
Park et al.

(10) Patent No.: US 11,671,688 B2
(45) Date of Patent: Jun. 6, 2023

(54) CAMERA MODULE HAVING EXTENDED SUPPORT MEMBERS FOR REDUCED POWER CONSUMPTION

(71) Applicant: LG INNOTEK CO., LTD., Seoul (KR)

(72) Inventors: Sang Ok Park, Seoul (KR); Sang Jun Min, Seoul (KR); Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/455,385

(22) Filed: Nov. 17, 2021

(65) Prior Publication Data

US 2022/0078315 A1 Mar. 10, 2022

Related U.S. Application Data

(63) Continuation of application No. 16/499,696, filed as application No. PCT/KR2018/003958 on Apr. 4, 2018, now Pat. No. 11,223,752.

(30) Foreign Application Priority Data

Apr. 6, 2017 (KR) .................. 10-2017-0044573
Aug. 2, 2017 (KR) .................. 10-2017-0098109
Aug. 14, 2017 (KR) .................. 10-2017-0102905

(51) Int. Cl.
*H04N 23/54* (2023.01)
*G02B 27/64* (2006.01)
(Continued)

(52) U.S. Cl.
CPC ........... *H04N 23/54* (2023.01); *G02B 27/646* (2013.01); *G03B 5/02* (2013.01); *H04N 23/55* (2023.01);
(Continued)

(58) Field of Classification Search
CPC .. H04N 5/2253; H04N 5/2254; H04N 5/2257; H04N 5/23248–23287;
(Continued)

(56) References Cited

U.S. PATENT DOCUMENTS 10,571,650 B2 2/2020 Yu et al.
2014/0255016 A1 9/2014 Kim et al.
(Continued)

FOREIGN PATENT DOCUMENTS

CN 102879972 A 1/2013
CN 104038682 A 9/2014
(Continued)

OTHER PUBLICATIONS

International Search Report in International Application No. PCT/KR2018/003958. filed Apr. 4, 2018.
(Continued)

*Primary Examiner* — Paul M Berardesca
(74) *Attorney, Agent, or Firm* — Saliwanchik, Lloyd & Eisenschenk

(57) ABSTRACT

An embodiment comprises a housing, a bobbin disposed inside the housing, a first coil disposed on the bobbin, a first magnet disposed in the housing, an upper elastic member coupled to the bobbin and the housing, a circuit substrate disposed under the housing, a base which is disposed under the circuit substrate and includes a first hole, a conductive pattern disposed on the base and electrically connected to the circuit substrate, and a support member having one end coupled to the upper elastic member and the other end coupled to the conductive pattern, wherein the other end of the support member is coupled to the base through the first hole in the base.

20 Claims, 57 Drawing Sheets

(51) Int. Cl.
  *G03B 5/02* (2021.01)
  *H04N 23/55* (2023.01)
  *H04N 23/57* (2023.01)
  *H04N 23/68* (2023.01)
  *G03B 17/12* (2021.01)

(52) U.S. Cl.
  CPC ........... *H04N 23/57* (2023.01); *H04N 23/687* (2023.01); *G03B 17/12* (2013.01); *G03B 2205/0069* (2013.01)

(58) Field of Classification Search
  CPC ........ G02B 27/64; G02B 27/646; G03B 3/10; G03B 5/00; G03B 5/02; G03B 13/32–36; G03B 2205/00–0023; G03B 2205/0038; G03B 2205/0053; G03B 2205/0069
  See application file for complete search history.

(56) References Cited

U.S. PATENT DOCUMENTS

| | | |
|---|---|---|
| 2016/0241787 A1 | 8/2016 | Sekimoto |
| 2016/0259177 A1 | 9/2016 | Ladwig et al. |
| 2017/0054883 A1 | 2/2017 | Sharma et al. |
| 2018/0106980 A1* | 4/2018 | Yu .................... G02B 7/08 |
| 2019/0170967 A1 | 6/2019 | Jung et al. |
| 2020/0260011 A1* | 8/2020 | Sasaki ................ G02B 27/646 |

FOREIGN PATENT DOCUMENTS

| | | | | |
|---|---|---|---|---|
| CN | 105717601 A | * | 6/2016 | ............... G02B 7/02 |
| EP | 2 587 7882 A2 | | 5/2013 | |
| JP | 2008-90023 A | | 4/2008 | |
| JP | 2011-118032 A | | 6/2011 | |
| JP | 2011-138027 A | | 7/2011 | |
| JP | 2013-97375 A | | 5/2013 | |
| JP | 2013-210550 A | | 10/2013 | |
| JP | 2015-35003 A | | 2/2015 | |
| JP | 2016-35599 A | | 3/2016 | |
| JP | 2017-3956 A | | 1/2017 | |
| JP | 2017-90809 A | | 5/2017 | |
| KR | 10-2015-0042681 A | | 4/2015 | |
| KR | 10-1535548 B1 | | 7/2015 | |
| KR | 10-2016-0000387 A | | 1/2016 | |
| KR | 10-2016-0030059 A | | 3/2016 | |
| KR | 10-2016-0054636 A | | 5/2016 | |
| KR | 10-1657513 B1 | | 9/2016 | |
| KR | 10-2016-0121298 A | | 10/2016 | |
| KR | 10-2017-0029986 A | | 3/2017 | |
| KR | 10-2017-0071097 A | | 6/2017 | |
| KR | 10-2017-0086927 A | | 7/2017 | |
| WO | 2011/068085 A1 | | 6/2011 | |
| WO | 2013/121788 A1 | | 8/2013 | |
| WO | WO-2014/100516 A1 | | 6/2014 | |
| WO | WO-2016/031756 A1 | | 3/2016 | |
| WO | WO-2016/199775 A1 | | 12/2016 | |
| WO | WO-2017/043884 A1 | | 3/2017 | |

OTHER PUBLICATIONS

Supplementary European Search Report dated Apr. 28, 2020 in European Application No. 18781259.9.
Office Action dated Feb. 20, 2021 in Chinese Application No. 201880030096.2.
Office Action dated Sep. 20, 2021 in Korean Application No. 10-2017-0098109.
Office Action dated Sep. 24, 2021 in Korean Application No. 10-2017-0102905.
Office Action dated Oct. 5, 2020 in U.S. Appl. No. 16/499,696.
Office Action dated May 27, 2021 in U.S. Appl. No. 16/499,696.
Notice of Allowance dated Aug. 17, 2021 in U.S. Appl. No. 16/499,696.
European Search Report dated Mar. 11, 2022 in European Application No. 21201196.9.
Notice of Allowance dated Feb. 1, 2022 in Japanese Application No. 2019-554597.

* cited by examiner

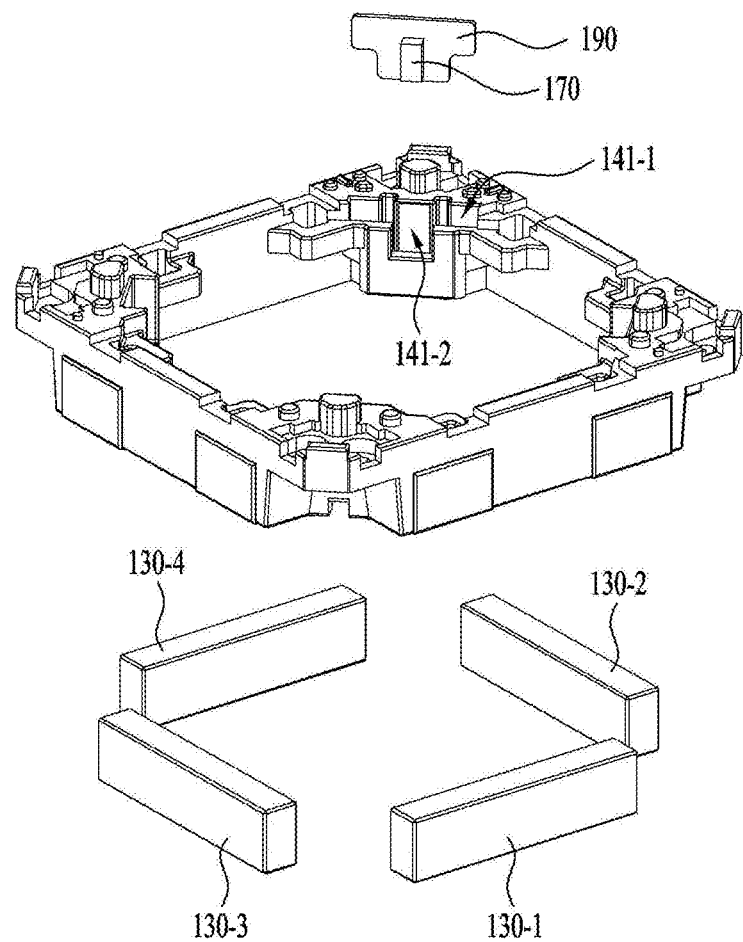

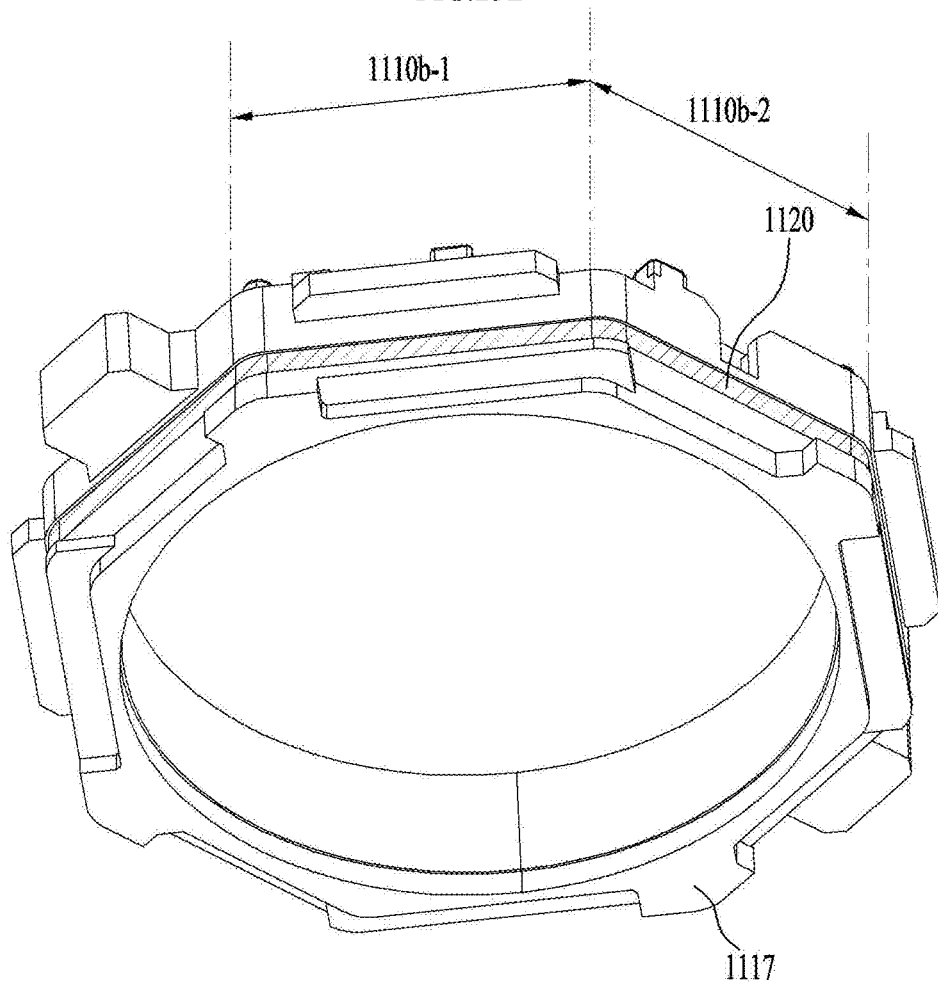

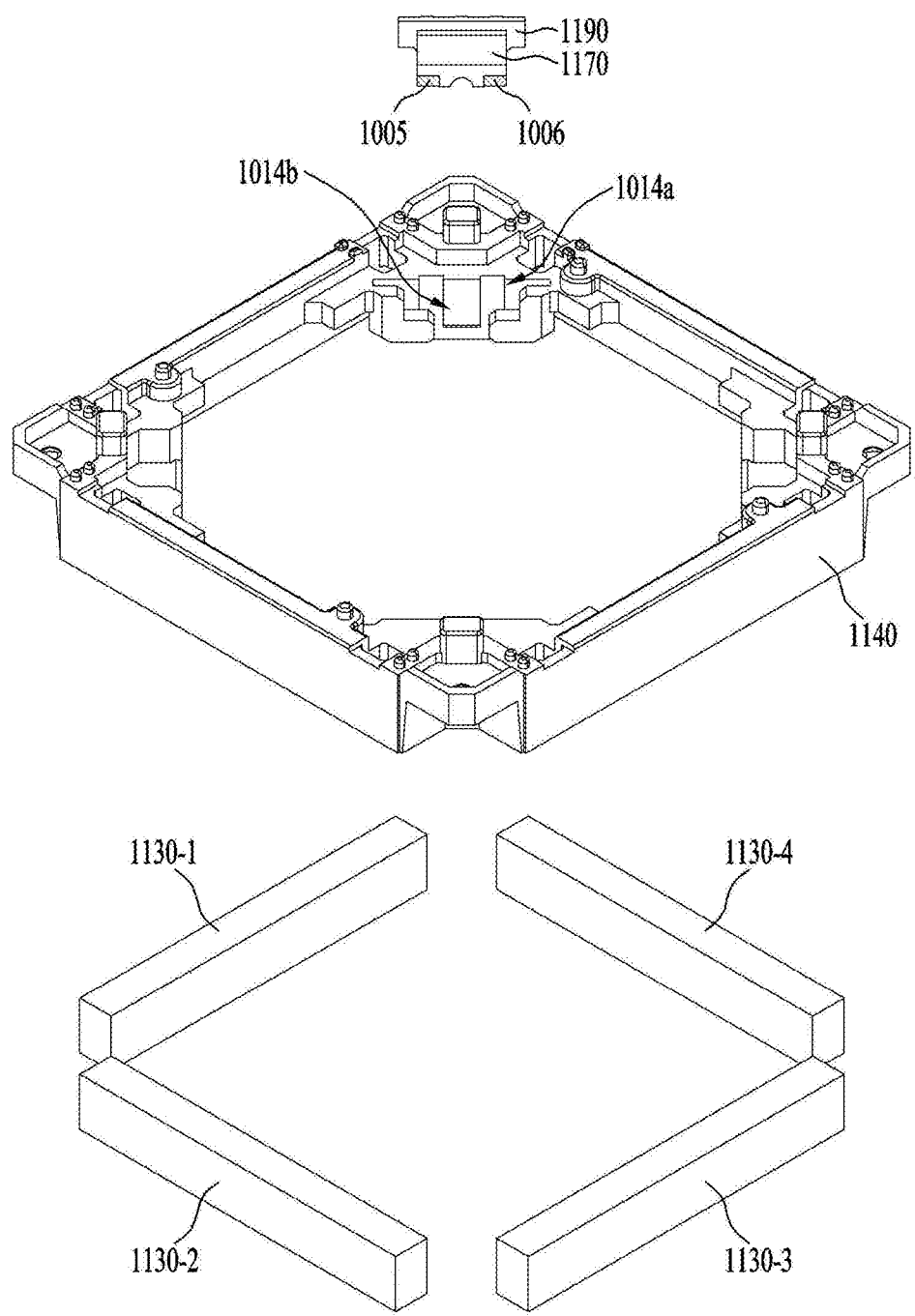

FIG.25B
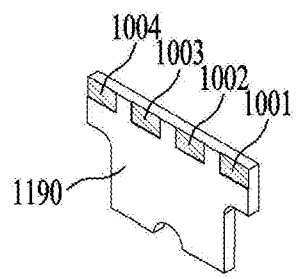
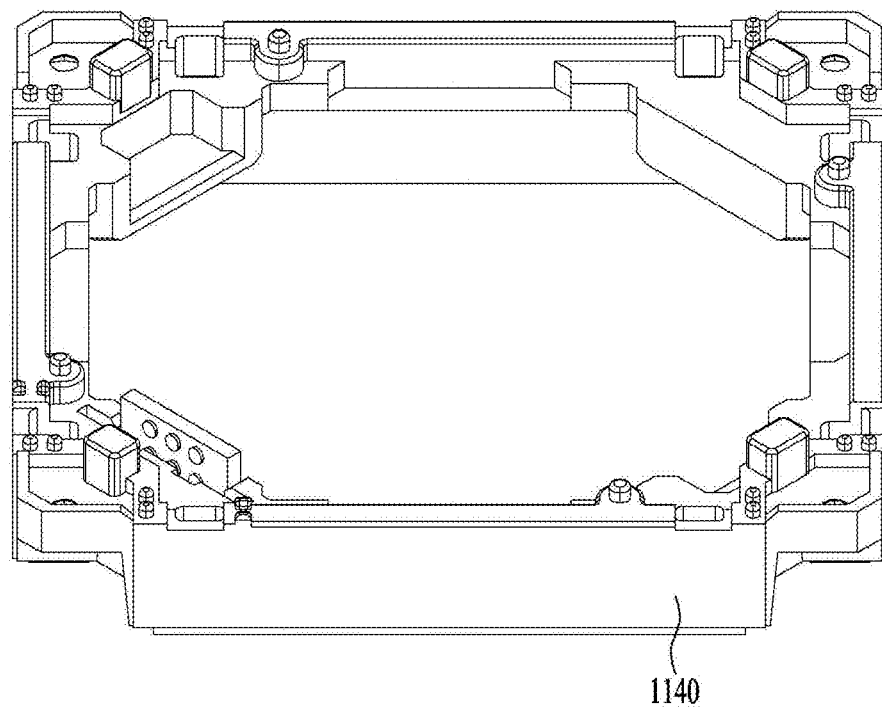

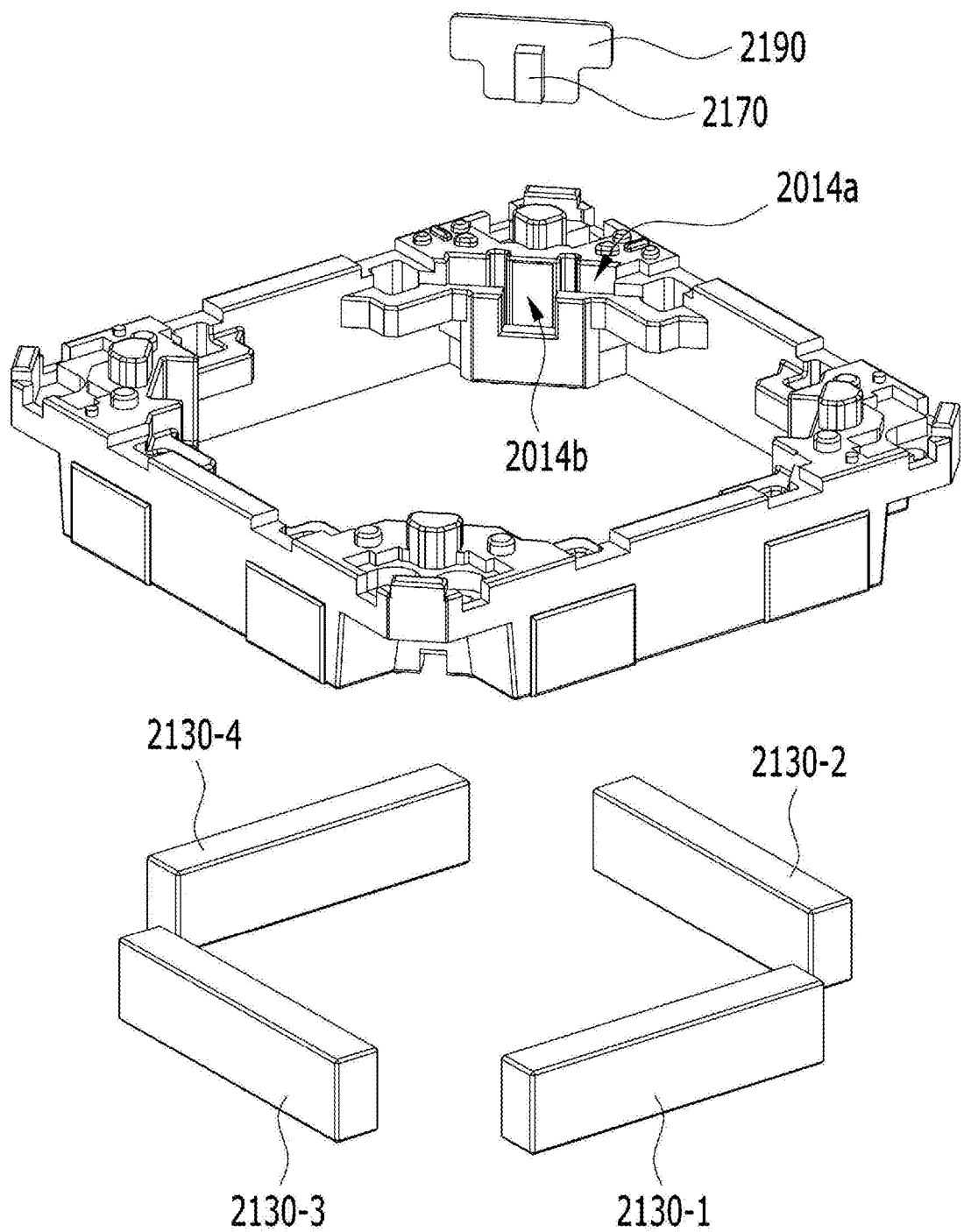

FIG.46B
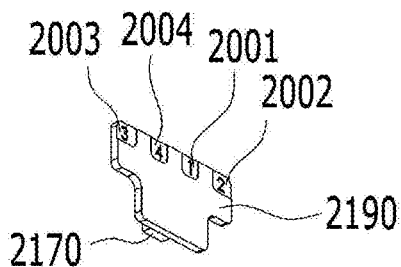
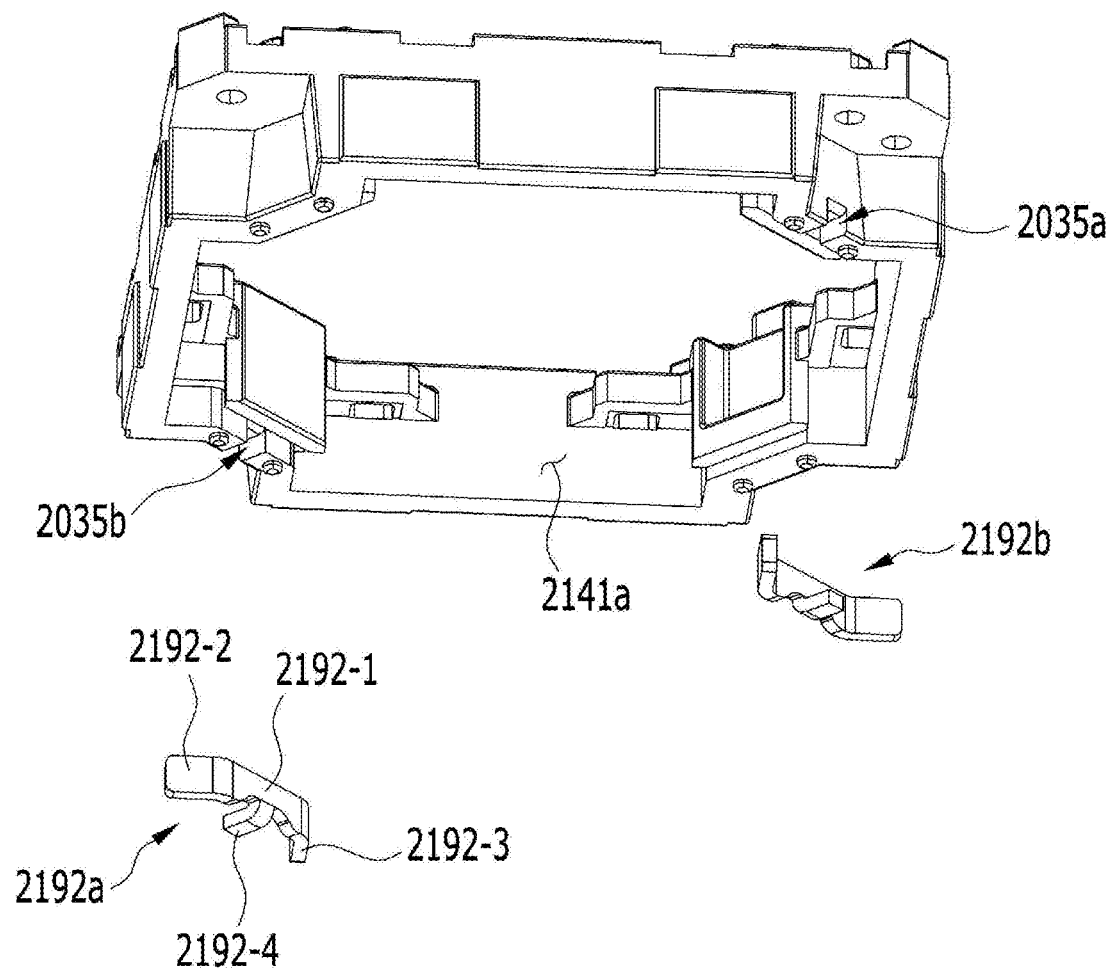

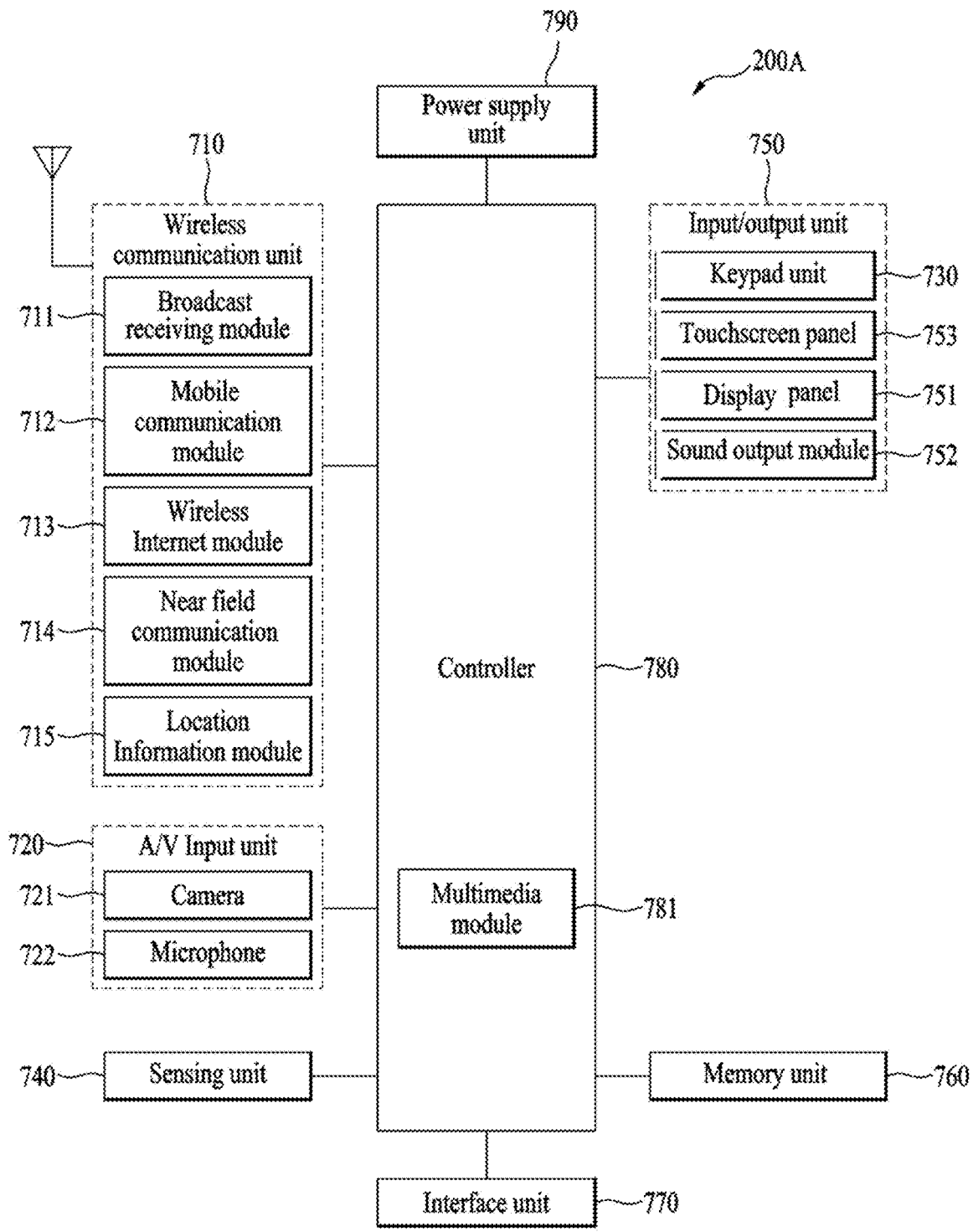

CAMERA MODULE HAVING EXTENDED SUPPORT MEMBERS FOR REDUCED POWER CONSUMPTION

CROSS-REFERENCE TO RELATED APPLICATIONS

This application is a continuation of U.S. application Ser. No. 16/499,696, filed Sep. 30, 2019; which is the U.S. national stage application of International Patent Application No. PCT/KR2018/003958, filed Apr. 4, 2018, which claims the benefit under 35 U.S.C. § 119 of Korean Application Nos. 10-2017-0044573, filed Apr. 6, 2017; 10-2017-0098109, filed Aug. 2, 2017; and 10-2017-0102905, filed Aug. 14, 2017, the disclosures of each of which are incorporated herein by reference in their entirety.

TECHNICAL FIELD

Embodiments relate to a lens moving apparatus and to a camera module and an optical device each including the same.

BACKGROUND ART

Technology of a voice coil motor (VCM), which is used in existing general camera modules, is difficult to apply to a miniature low-power camera module, and studies related thereto have been actively conducted.

In the case of a camera module configured to be mounted in a small electronic product, such as a smart phone, the camera module may frequently receive shocks when in use, and may undergo fine shaking due to, for example, the shaking of a user's hand. In consideration thereof, technology enabling a device for inhibiting handshake to be additionally installed to a camera module is being developed.

DISCLOSURE

Technical Problem

Embodiments provide a lens moving apparatus capable of reducing the intensity of current flowing through the support members and thus reducing power consumption and of inhibiting deterioration of reliability in OIS driving attributable to a reduction in the diameter of an OIS wire, and a camera module and an optical device each including the lens moving apparatus.

Technical Solution

A lens moving apparatus according to an embodiment includes a housing, a bobbin disposed in the housing, a first coil disposed on the bobbin, a first magnet disposed on the housing, an upper elastic member coupled both to the bobbin and to the housing, a circuit board disposed under the housing, a base disposed under the circuit board and including a first hole, a conductive pattern disposed on the base and conductively connected to the circuit board, and a support member coupled at one end thereof to the upper elastic member and at a remaining end thereof to the conductive pattern, wherein the remaining end of the support member is coupled to the base through the first hole in the base.

The base may further include a second hole spaced apart from the first hole.

The conductive pattern may include a first conductive pattern disposed on the upper surface of the base, a second conductive pattern disposed on the lower surface of the base, and a third conductive pattern disposed in the first hole and the second hole so as to connect the first conductive pattern to the second conductive pattern.

The first hole may not overlap the circuit board in a vertical direction, and the second hole may overlap the circuit board in the vertical direction.

The first conductive pattern and the remaining end of the support member may be coupled to each other via a solder.

The base may further include a groove communicating with a lower portion of the first hole, and a portion of the conductive pattern may be disposed in the groove.

The circuit board may include a pad coupled to the first conductive pattern.

The lens moving apparatus may further include a damper disposed in the first hole.

The size of the first hole may be larger at an upper portion thereof than at a lower portion thereof.

The lens moving apparatus may further include a second coil disposed on the circuit board, a second magnet disposed on the bobbin, a first position sensor disposed on the housing so as to correspond to the second magnet, and a second position sensor disposed on the base so as to correspond to the first magnet.

Advantageous Effects

Embodiments are able to reduce the intensity of current flowing through the support members and thus reduce power consumption and to inhibit deterioration of reliability in OIS driving attributable to reduction in the diameter of an OIS wire.

DESCRIPTION OF DRAWINGS

FIG. 7A is a perspective view of the housing, a first position sensor and a first circuit board shown in FIG. 1;

FIG. 23B is a bottom perspective view of the bobbin and the first coil;

FIG. 25A is a perspective view of the housing, the first position sensor, the circuit board and the first magnets, which are shown in FIG. 21;

FIG. 25B is a perspective view of the housing and the circuit board, which are shown in FIG. 21;

FIG. 46A is a perspective view of the housing, the first position sensor and the circuit board, which are shown in FIG. 40;

FIG. 46B is a perspective view of the housing, the first position sensor, the circuit board and the first and second yokes, which are shown in FIG. 40;

FIG. 60 is a view illustrating the configuration of the portable terminal illustrated in FIG. 59.

BEST MODE

Figure 1:
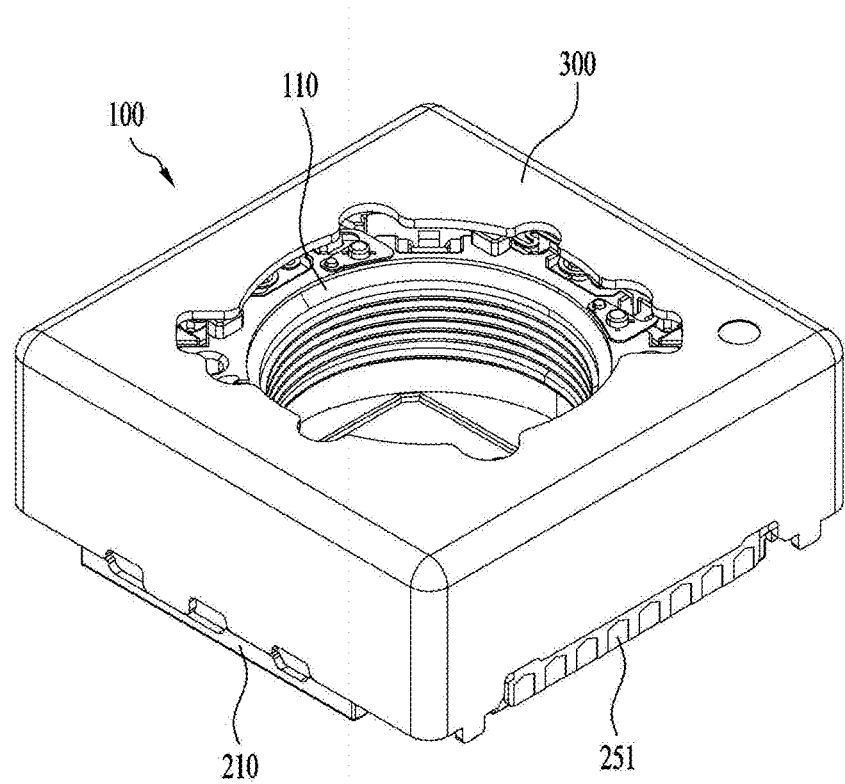
FIG. 1 is a perspective view of a lens moving apparatus according to an embodiment.

Hereinafter, embodiments of the present invention capable of concretely achieving the above objects will be described with reference to the accompanying drawings.

In the following description of the embodiments, it will be understood that, when an element is referred to as being formed "on" or "under" another element, it can be directly "on" or "under" the other element, or can be indirectly disposed, with one or more intervening elements therebetween. In addition, it will also be understood that "on" or "under" the element may mean an upward direction or a downward direction based on the element.

In addition, relative terms such as, for example, "first", "second", "on/upper/above" and "beneath/lower/below", used in the following description may be used to distinguish any one substance or element with another substance or element without requiring or containing any physical or logical relationship or sequence between these substances or elements. The same reference numeral designates the same element throughout all the drawings.

Unless otherwise defined, the terms "comprise," "include" or "have" used in the above description are used to designate the presence of features, steps or combinations thereof described in the specification, and should be understood so as not to exclude the presence or probability of additional inclusion of one or more different features, steps or combinations thereof. Furthermore, the terms "correspond" or the like may include at least one of designations of "face" or "overlap".

For the convenience of description, although the lens moving apparatus is described using a rectangular coordinate system (x, y, z), the lens moving apparatus may be described using some other coordinate systems, and the embodiments are not limited thereto. In the respective drawings, the X-axis and the Y-axis mean directions perpendicular to an optical axis, i.e. the Z-axis, and the optical axis (Z-axis) direction or a direction parallel to the optical axis may be referred to as a "first direction", the X-axis direction may be referred to as a "second direction", and the Y-axis direction may be referred to as a "third direction".

A "handshake correction device", which is applied to a subminiature camera module of a mobile device such as, for example, a smart phone or a tablet PC, may be a device that is configured to inhibit the contour line of a captured image from being indistinctly formed due to vibration caused by shaking of the user's hand when capturing a still image.

In addition, an "auto-focusing device" is a device that automatically focuses an image of a subject on an image sensor surface. The handshake correction device and the auto-focusing device may be configured in various ways, and the lens moving apparatus according to an embodiment may move an optical module, which is constituted of at least one lens, in the first direction, which is parallel to the optical axis, or relative to a plane defined by the second and third directions, which are perpendicular to the first direction, thereby performing handshake correction motion and/or auto-focusing.

Figure 2:
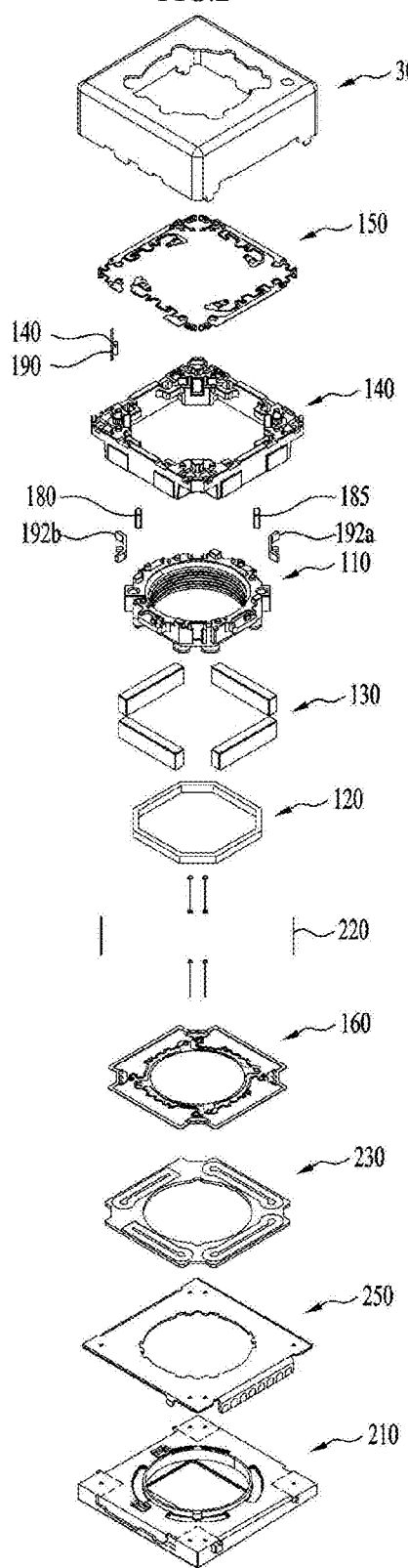
FIG. 2 is an exploded view of the lens moving apparatus shown in FIG. 1.
Figure 3:
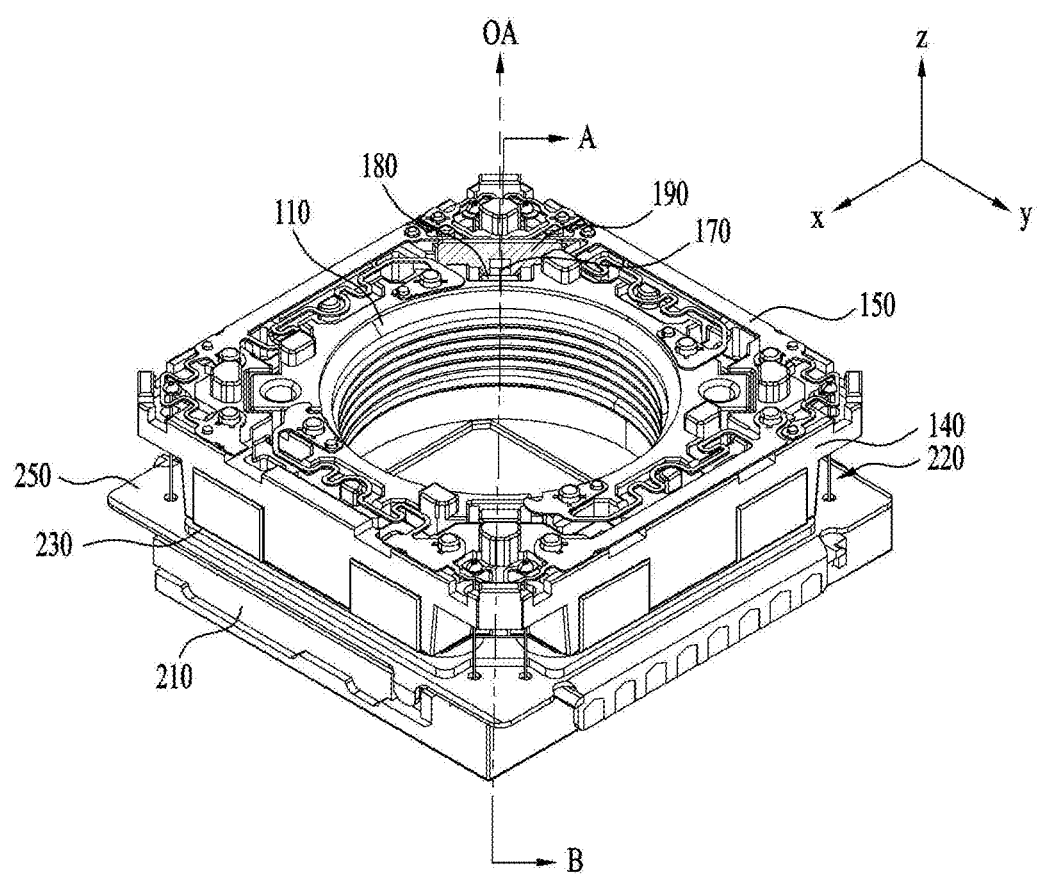
FIG. 3 is a view illustrating the assembled state of the lens moving apparatus shown in FIG. 1, from which a cover member is removed.

FIG. 1 is a perspective view of a lens moving apparatus 100 according to an embodiment. FIG. 2 is an exploded view of the lens moving apparatus 100 shown in FIG. 1. FIG. 3 is a view illustrating the assembled state of the lens moving apparatus 100 shown in FIG. 1, from which a cover member 300 is removed.

Referring to FIGS. 1 to 3, the lens moving apparatus 100 may include a bobbin 110, a first coil 120, first magnets 130, a housing 140, an upper elastic member 150, a lower elastic member 160, support members 220, a second circuit board 250 and a base 210.

The lens moving apparatus 100 may include a first circuit board 190 and a first position sensor 170. The lens moving apparatus 100 may further include a second magnet 180 and a third magnet 185.

The lens moving apparatus 100 may further include a second coil 230 for optical image stabilizer (OIS) driving, and a second position sensor 240. The lens moving apparatus 100 may further include a cover member 300. The lens moving apparatus 100 may further include first and second yokes 192a and 192b coupled to the housing 140.

The cover member 300 will first be described.

The cover member 300 accommodates the components 110, 120, 130, 140, 150, 160, 170, 220 and 250, in the space defined between the cover member 300 and the base 210.

The cover member 300 may take the form of a box that has an open bottom and includes a top plate and a side plate. The bottom of the cover member 300 may be coupled to the top of the base 210. The top plate of the cover member 300 may have a polygonal shape, for example, a square or octagonal shape.

The cover member 300 may have an opening formed in the top plate thereof in order to expose a lens (not shown), coupled to the bobbin 110, to outside light. In order to inhibit foreign substances such as dust and moisture from entering the inside of the camera module, the cavity in the cover member 300 may further be provided with a window made of light transmissive material.

Although the material of the cover member 300 may be a non-magnetic material such as, for example, SUS in order to inhibit the cover member 300 from being attracted by the magnets 130, the cover member 300 may be formed of a magnetic material, and may thus function as a yoke for increasing electromagnetic force caused by interaction between the cover member 300 and the first coil 120.

Next, the bobbin 110 will be described.

The bobbin 110 may allow a lens or a lens barrel to be mounted thereon and may be disposed inside the housing 140. The bobbin 110 may be configured to have a cavity so as to allow a lens or a lens barrel to be mounted therein. Although the shape of the cavity may be a circular shape, an elliptical shape or a polygonal shape, the disclosure is not limited thereto.

Figure 4:
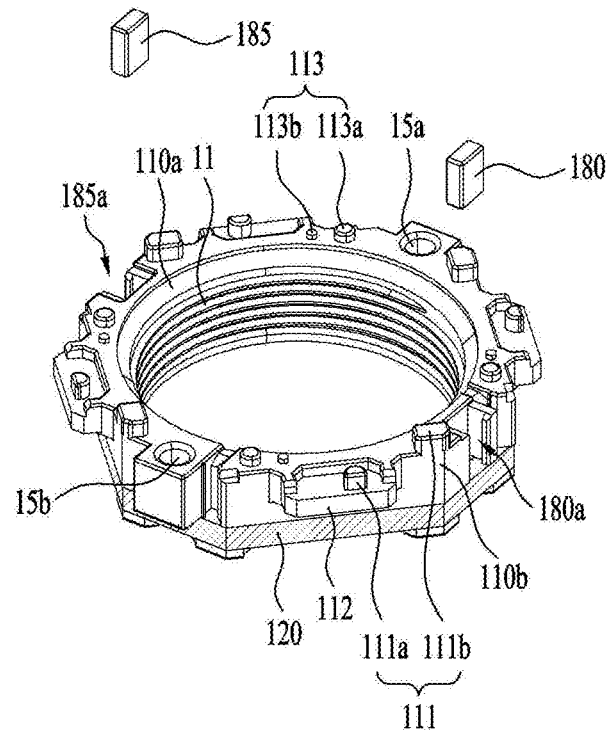
FIG. 4 is a perspective view of a bobbin, a first coil, a second magnet and a third magnet shown in FIG. 1.
Figure 5:
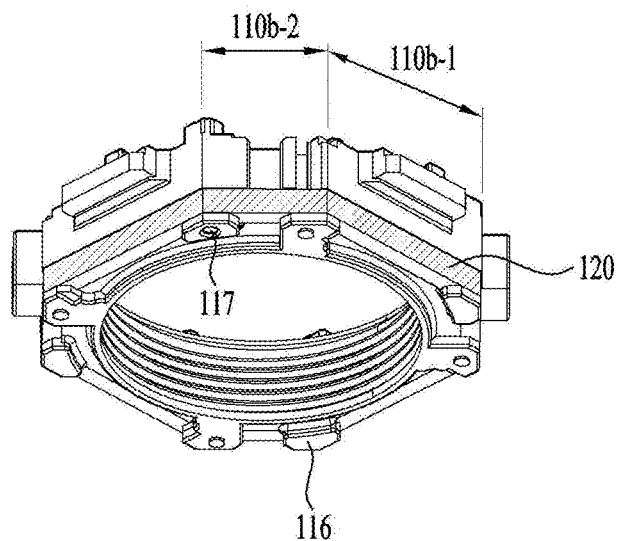
FIG. 5 is a bottom perspective view of the bobbin and the first coil shown in FIG. 4.

FIG. 4 is a perspective view of the bobbin 110, the first coil 120, the second magnet 180 and the third magnet 140 shown in FIG. 1. FIG. 5 is a bottom perspective view of the bobbin 110 and the first coil 120 shown in FIG. 4.

Referring to FIG. 4, the bobbin 110 may include first projections 111, which project from the upper surface of the bobbin 110 in the first direction, and second projections 112, which project from the outer peripheral surface 110b of the bobbin 110 in the second and/or third direction.

Each of the first projections 111 of the bobbin 110 may include a first guide portion 111a and a first stopper 111b. The first guide portion 111a of the bobbin 110 may serve to guide the positioning of the upper elastic member 150. For example, the first guide portion 111a of the bobbin 110 may guide a first frame-connector 153 of the upper elastic member 150.

The second projections 112 of the bobbin 110 may project from the outer peripheral surface 110b of the bobbin 110 in the second and/or third direction. In order to avoid spatial interference with the first frame-connectors 153, the upper surfaces of the second projections 112 may be positioned lower than the upper surface of the bobbin 110. For example, each of the second projections 112 may be an escape groove, and the escape groove may have a shape that is depressed from the upper surface of the bobbin 110.

The first stoppers 111b and the second projections 112 of the bobbin 110 may serve to inhibit the upper surface and/or the side surface of the bobbin 110 from directly colliding with the internal surface of the cover member 300 even if the bobbin 110 is moved beyond a specified range due to external impact or the like when the bobbin 110 is moved in the first direction in order to perform an autofocus function.

The bobbin 110 may include second stoppers 116, which project from the lower surface thereof. The second stoppers 116 may serve to inhibit the lower surface of the bobbin 110 from directly colliding with the base 210, the second coil 230 or the second circuit board 250 even when the bobbin 110 is moved beyond a specified range due to external impact or the like when the bobbin 110 is moved in the first direction in order to perform an autofocus function.

The bobbin 110 may include first side portions 110b-1 and second side portions 110b-2 positioned between the first side portions 110b-1.

The first side portions 110b-1 may correspond to or face the first magnets 130. Each of the second side portions 110b-2 of the bobbin 110 may be disposed between two adjacent first side portions.

The bobbin 110 may be provided in the outer peripheral surface thereof with a first coil groove (not shown), to which the first coil 120 is disposed or mounted. For example, the first coil groove may be formed in the first side portions 110b-1 and the second side portions 110b-2 of the bobbin 110.

The number and shape of first coil grooves may correspond to the number or shape of the first coils 120 disposed on the outer peripheral surface 110b of the bobbin 110. Although the first coil groove formed in the first side portions 110b-1 and the second side portions 110b-2 of the bobbin 110 may have a ring shape, the disclosure is not limited thereto.

In another embodiment, the bobbin 110 may not have the first coil groove, and the first coil 120 may be directly wound around the outer peripheral surface 110b of the bobbin 110 and may be secured thereto.

The bobbin 110 may have a second magnet-mounting groove 1801, in which the second magnet 180 is mounted, fitted, secured or disposed, and a third magnet-mounting groove 185a, in which the third magnet 185 is mounted, fitted, secured or disposed.

The second magnet-mounting groove 180a and the third magnet-mounting groove 185a may be formed in two selected from the first side portions of the bobbin 110.

For example, the third magnet-mounting groove 185a and the second magnet-mounting groove 180a may be disposed so as to face each other. For example, the line that connects the center of the third magnet-mounting groove 185a to the center of the second magnet-mounting groove 180a may be disposed so as to extend through the center of the bobbin 110. The reason for this is to dispose or arrange the second magnet 180 and the third magnet 185 in a balanced state with respect to the first position sensor 170, thereby accurately performing autofocus (AF) driving.

Although the second magnet-mounting groove 180a and the third magnet-mounting groove 185a may be positioned above the first coil groove, the disclosure is not limited thereto.

Furthermore, the bobbin 110 may be provided on the upper surface thereof with first upper support protrusions 113, which are fitted into holes 151a in first inner frames 151.

Although the first upper support protrusions 113 may be provided on the upper surfaces of the first side portions 110b-1, the disclosure is not limited thereto.

For example, the first upper support protrusions 113 may include a first upper protrusion 113a and a second upper protrusion 113b. Each of the first side portions 110b-1 may be provided with the first upper protrusion 113a and the second upper protrusion 113b.

For example, although the first upper protrusions 113a may be intended to be fused to the first inner frames 151 of the upper elastic member 150, and the second upper protrusions 113b may be intended to be conductively connected to the first inner frames 151 of the upper elastic member 150 via solder or conductive adhesive members, the disclosure is not limited thereto. For example, the diameter of the first upper protrusion 113a may be larger than the diameter of the second upper protrusion 113b.

The bobbin 110 may be provided in the lower surface thereof with a first lower coupling groove 117, which is coupled or secured to a hole 161a in the lower elastic member 160. In another embodiment, for coupling with the hole 161a in the lower elastic member 160, the lower surface of the bobbin 110 may be provided with a support protrusion.

The bobbin 110 may be provided in the inner peripheral surface thereof with a threaded line 11 for engagement with a lens or a lens barrel. The threaded line 11 may be formed in the inner peripheral surface of the bobbin 110 in the state in which the bobbin 110 is held by means of a jig, and the upper surface of the bobbin 110 may have jig-holding grooves 15a and 15b formed therein. For example, the jig-holding grooves 15a and 15b may be provided in upper surfaces of the second side portions 110b-2 that are opposite each other, without being limited thereto.

Next, the first coil 120 will be described.

The first coil 120 may be a drive coil, which is disposed on the outer peripheral surface 110b of the bobbin 110 so as to perform electromagnetic interaction with the first magnets 130 disposed on the housing 140.

In order to create electromagnetic force through interaction with the first magnets 130, a drive signal (for example, drive current or voltage) may be applied to the first coil 120.

The drive signal applied to the first coil 120 may be an AC signal, for example, AC current. For example, the drive signal applied to the first coil 120 may be a sinusoidal wave or a pulse signal (for example, a pulse width modulation (PWM) signal).

In another embodiment, the drive signal that is applied to the first coil 120 may include an AC signal and a DC signal.

An AF movable unit may be moved in the first direction by virtue of electromagnetic force resulting from the interaction between the first coil 120 and the first magnets 130. By controlling the intensity and/or polarity of a drive signal applied to the first coil 120 (for example, the direction in which current flows) and thus controlling the intensity and/or direction of electromagnetic force resulting from the interaction between the first coil 120 and the first magnets 130, it is possible to control the movement of the AF movable unit in the first direction, thereby performing an autofocus function.

The AF movable unit may include the bobbin 110, which is elastically supported by the upper and lower elastic members 150 and 160, and components that are mounted on the bobbin 110 and are moved therewith. For example, the AF movable unit may include the bobbin 110, the first coil 120, and a lens (not shown) mounted on the bobbin 110.

The first coil 120 may be wound or disposed around the outer peripheral surface of the bobbin 110 in a clockwise or counterclockwise direction about the optical axis. In another embodiment, the first coil 120 may be embodied as a coil ring, which is wound or disposed in a clockwise or counterclockwise direction about an axis perpendicular to the optical axis. Although the number of coil rings may be equal to the number of first magnets 130, the disclosure is not limited thereto.

The first coil 120 may be conductively connected to at least one of the upper elastic member 150 or the lower elastic member 160, and may be conductively connected to the second circuit board 250 via the upper elastic member 150 or the lower elastic member 160 and the support members 220.

Although the first coil 120 disposed on the bobbin 110 may be spaced apart from each of the second magnet 180 and the third magnet 185 disposed on the bobbin 110 in a direction perpendicular to the optical axis OA, the disclosure is not limited thereto. In another embodiment, each of the second magnet 180 and the third magnet 185, which are disposed on the bobbin 110, may be brought into contact with the first coil 120.

Next, the housing 140 will be described.

The housing 140 accommodates therein the bobbin 110, with the first coil 120 disposed thereon.

Figure 6A:
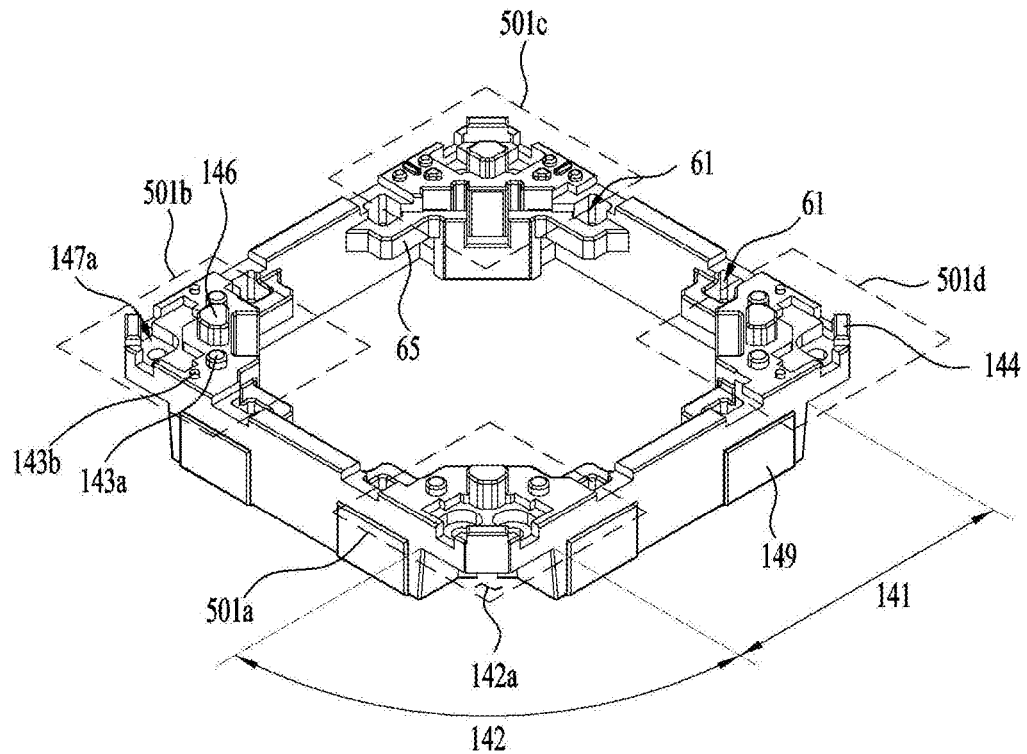
FIG. 6A is a first perspective view of a housing shown in FIG. 1.
Figure 6B:
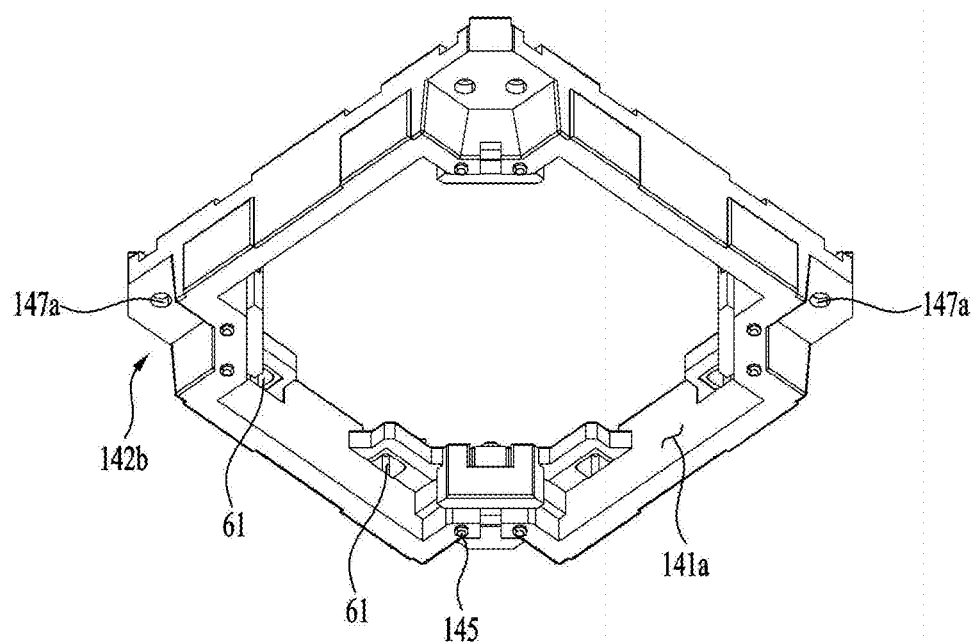
FIG. 6B is a second perspective view of the housing shown in FIG. 1.
Figure 7B:
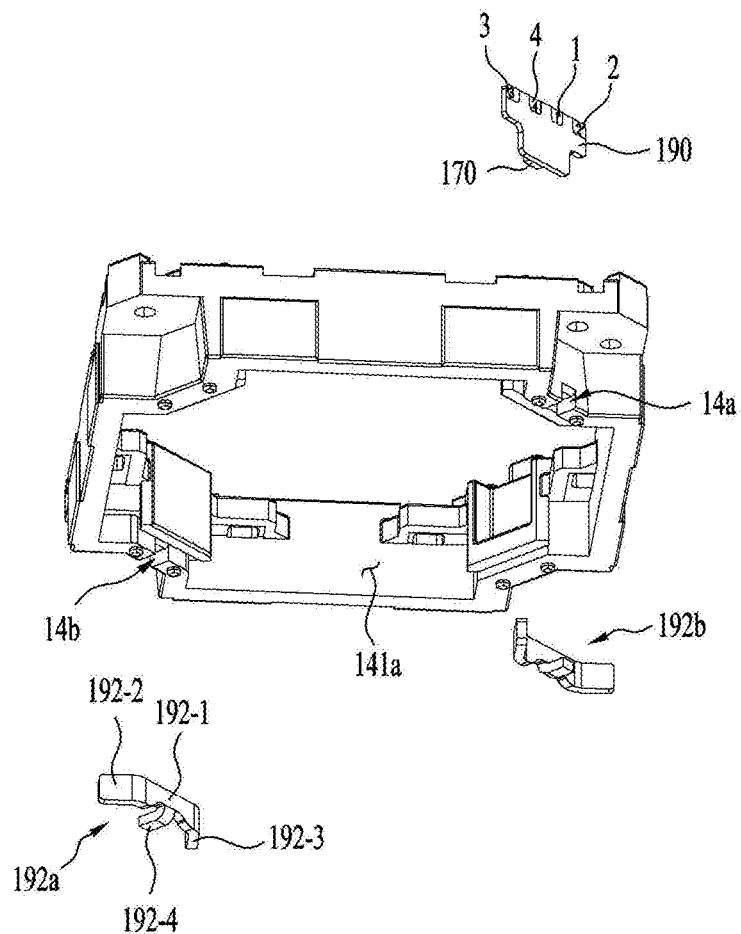
FIG. 7B is a perspective view of the housing, the first position sensor, the first circuit board and first and second yokes shown in FIG. 1.
Figure 8:
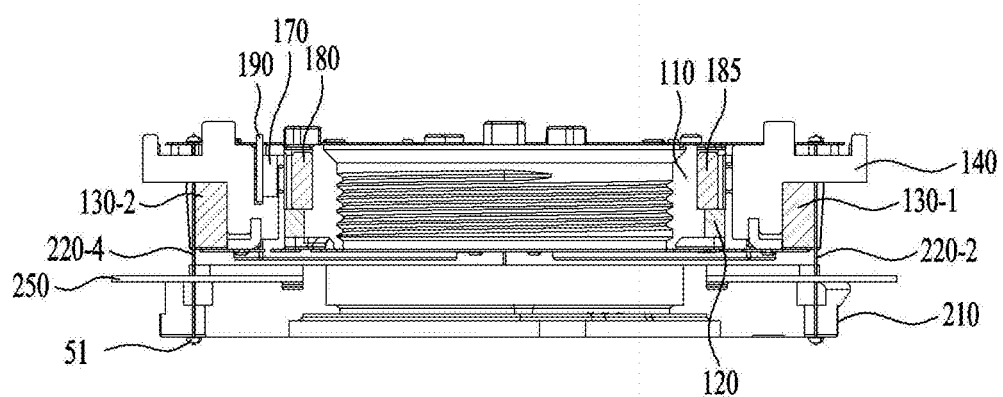
FIG. 8 is a cross-sectional view of the lens moving apparatus shown in FIG. 3, which is taken along line A-B in FIG. 3.

FIG. 6A is a first perspective view of the housing 140 shown in FIG. 1. FIG. 6B is a second perspective view of the housing 140 shown in FIG. 1. FIG. 7A is a perspective view of the housing 140, the first position sensor 170 and the first circuit board 190 shown in FIG. 1. FIG. 7B is a perspective view of the housing 140, the first position sensor 170, the first circuit board 190 and the first and second yokes 192a and 192b shown in FIG. 1. FIG. 8 is a cross-sectional view of the lens moving apparatus shown in FIG. 3, which is taken along line A-B in FIG. 3.

Referring to FIGS. 6A to 8, the housing 140 may be configured to have the overall shape of a hollow cylinder, and may include a plurality of first and second side portions 141 and 142, which define the hole.

For example, the housing 140 may include the first side portions 141, which are spaced apart from each other, and the second side portions 142, which are spaced apart from each other. Each of the first side portions 141 may be disposed or positioned between two adjacent second side portions 142 so as to connect the two adjacent second side portions 142 to each other, and may include a flat surface having a predetermined depth.

Since the second side portions 142 of the housing 140 correspond to the corner regions of the housing 140, the second side portions 142 of the housing 140 may be referred to as "corner portions (corner member)".

As illustrated in FIG. 6A, for example, the housing 140 may include first to fourth side members and first to fourth corner portions 501a to 501d.

Although the first side portion 141 of the housing 140 may correspond to the first side portion 110b-1 of the bobbin 110 and the second side portion 142 of the housing 140 may correspond to the second side portion 110b-2 of the bobbin 110, the disclosure is not limited thereto.

The first magnets 130; 130-1 to 130-4 may be disposed or mounted on the first side portions 141 of the housing 140, and the support members 220 may be disposed on the second side portions 142 of the housing 140.

In order to support or receive the first magnets 130-1 to 130-4, the housing 140 may include magnet mounts 141a, which are provided on the inner surfaces of the first side portions 141.

The first side portions 141 of the housing 140 may be provided with grooves 61, into which an adhesive for attaching the first magnets 130 to the magnet mounts 141a of the housing 140 is introduced.

The first side portions 141 of the housing 140 may be disposed parallel to the side plate of the cover member 300. The second side portions 142 of the housing 140 may be provided with holes 147a through which the support members 220 extend. Although each of the holes 147a may have a constant diameter, the disclosure is not limited thereto. In another embodiment, the hole 147a may be configured such that the diameter thereof is gradually increased moving toward the lower surface from the upper surface of the housing 140 in order to allow a damper to be easily applied.

Furthermore, the housing 140 may be provided on the upper surface thereof with second stoppers 144 so as to inhibit the housing 140 from directly colliding with the inner surface of the cover member 300. For example, although the second stoppers 144 may be respectively disposed on the first to fourth corner portions 501a to 501d of the housing 140, the disclosure is not limited thereto.

In order to guide positioning of first outer frames 152 of the upper elastic member 150 when the upper elastic member 150 is placed on the upper surface of the housing 140, the housing 140 may be provided on the upper surface thereof with second guide portions 146.

The second guide portions 146 may be disposed on the corner portions 501a to 501d of the housing 140 so as to be respectively spaced apart from the second stoppers 144. For example, each of the second guide portions 146 may face a corresponding one of the second stoppers 144 in a diagonal direction. Here the diagonal direction may be the direction toward the second stopper 144 from the center of the housing 140. Furthermore, the second guide portions 146 may also serve as stoppers for inhibiting the upper surface of the housing 140 from directly colliding with the inner surface of the cover member 300.

The housing 140 may include one or more first upper support protrusions 143a and 143b, which are provided on the upper surfaces of the second side portions 142 for coupling into holes 152a and 152b in the first outer frame 152 of the upper elastic member 150.

The first upper support protrusions 143a and 143b may be disposed on at least one of the upper surfaces of the first to fourth corner portions 501a to 501d of the housing 140.

The second upper support protrusions 143a and 143b may be disposed at at least one of both sides of the second guide portion 146.

For example, although two second upper support protrusions may be disposed at one side of the second guide portion 146 of the housing 140 and two second upper support protrusions may be disposed at the other side of the second guide portion 146, the disclosure is not limited thereto.

The housing 140 may include one or more second lower support protrusions 145 disposed on the lower surfaces of the second side portions 142 so as to be coupled or secured to holes 162a in second outer frames 162 of the lower elastic member 160. Although the second lower support protrusions 145 may be disposed on a lower surface of at least one of the first to fourth corner portions 501a to 501d of the housing 140, the disclosure is not limited thereto.

In order to ensure not only paths through which the support members 220 extend but also spaces that are filled with silicone for damping, the housing 140 may have recesses 142a formed in the lower portions of the second side portions 142. The recesses 142a in the housing 140 may be filled with, for example, damping silicone.

The housing 140 may have third stoppers 149, which project from the side surfaces of the first side portions 141 in the second or third direction. The third stoppers 149 are intended to inhibit the housing 140 from colliding with the inner surfaces of the side members of the cover member 300 when the housing 140 moves in the second and third directions.

In order to inhibit the bottom surface of the housing 140 from colliding with the base 210, the second coil 230 and/or the second circuit board 250, which will be described later, the housing 140 may further include a fourth stopper (not shown) projecting from the lower surface thereof.

Referring to FIG. 7A, the housing 140 may have a first groove 141-1 for receiving the first circuit board 190 therein and a second groove 141-2 for receiving the first position sensor 170 therein.

The first groove 141-1 may be formed in the upper portion or the upper end of one of the second side portions 142 of the housing 140. In order to facilitate mounting of the first circuit board 190, the first groove 141-1 may be configured to have a groove shape, which is open at the upper end thereof and has a side surface and a bottom, and the side surface of the first groove 141-1 may have a shape that corresponds to or coincides with the shape of the first circuit board 190.

Although the second groove 141-2 may be formed in the inner surface of one of the second side portions 142 of the housing 130, may have an opening, which is open toward the inside of the housing 130d, and may communicate with the first groove 141-1, the disclosure is not limited thereto.

In order to facilitate mounting of the first position sensor 170, the second groove 141-2 may have an opening, which is open at the upper surface and the side surface thereof. The second groove 141-2 may have a shape that corresponds to or coincides with the shape of the first position sensor 170.

Although each of the first magnets 130 and the first circuit board 190 may be secured to the first magnet mounts 141a and the second groove 141-2 in the housing 140 by means of an adhesive, the disclosure is not limited thereto, and they may also be secured thereto by means of an adhesive member such as double-sided adhesive tape.

One of the second side portions of the housing 140 that faces the second magnet 180 may be provided at a lower portion thereof with a first yoke-mounting groove 14a, in which the first yoke 192a is disposed, and another of the second side portions of the housing 140 may be provided at a lower portion thereof with a second yoke-mounting groove 14b, in which the second yoke 192b is disposed.

The yoke-mounting portion 142b may be formed in the lower end of the second side portion 142 of the housing 140 between the recess 142a in the housing 140 and the first magnet mount 141a of the housing 140.

Next, the first magnets 130 will be described.

The first magnets 130 may be disposed on the housing 140 so as to overlap at at least a portion thereof the first coil 120 in the second or third direction perpendicular to the optical axis at the initial position of the bobbin 110. The first magnets 130 may be fitted or disposed in the mounts 141a of the housing 140.

Here, the initial position of the bobbin 110 may be the initial position of the AF movable unit in the state in which power is not applied to the first coil 120, and may be the position of the AF movable unit when the upper elastic member 150 and the lower elastic member 160 are elastically deformed by only the weight of AF movable unit.

Furthermore, the initial position of the bobbin 110 may be the position of the AF movable unit when gravity is applied toward the base 210 from the bobbin 110 or toward the bobbin 110 from the base 210. The AF movable unit may include the bobbin 110 and components mounted on the bobbin 110, for example, the first coil 120.

In another embodiment, the first magnets 130 may be disposed on the outer surface of the first side portions 141 of the housing 140. Alternatively, the first magnets 130 may also be disposed on the inner surfaces or the outer surfaces of the second side portions 142 of the housing 140.

Although each of the first magnets 130 may have a shape corresponding to the shape of a corresponding one of the first side portions 141 of the housing 140, that is, a rectangular shape, the disclosure is not limited thereto. The surface of the first magnet 130 that faces the first coil 120 may be configured to have a curvature that corresponds to or coincides with a corresponding surface of the first coil 120.

The first magnets 130 may be integrally constructed such that the surface of the first magnet 130 that faces the first coil 120 becomes an S pole and the opposite surface of the first magnet 130 becomes an N pole. The reverse configuration is also possible.

Two or more of the first magnets 130 may be disposed on the first side portions of the housing 140 that face each other, and may be positioned so as to face each other.

For example, the first magnets 130-1 to 130-4 may be disposed on the first side portions 141 of the housing 140. Two pairs of first magnets 130-1 to 130-4, each pair of first magnets facing each other, may be disposed on the first side portions 141 of the housing 140 so as to intersect each other. Here, although the flat surface of each of the first magnets 130-1 to 130-4 may have an approximately rectangular shape, the shape may also be a triangular shape or a rhombic shape.

Next, the second magnet 180 and the third magnet 185 will be described.

The second magnet 180 may be disposed in the second magnet-mounting groove 180a in the bobbin 110. The third magnet 185 may be disposed in the third magnet-mounting groove 185a in the bobbin 110.

Although a portion of one surface of the second magnet 180 mounted in the second magnet-mounting groove 180a and a portion of one surface of the third magnet 185 mounted in the third magnet-mounting groove 185a may be exposed from the outer surface of the bobbin 110, the disclosure is not limited thereto. In another embodiment, they may not be exposed from the outer surface.

Although the boundary plane between the N pole and the S pole of each of the second magnet 180 and the third magnet 185 may be parallel to a direction perpendicular to the optical axis, the disclosure is not limited thereto. In another embodiment, the boundary plane between the N pole and the S pole may be parallel to the optical axis.

The second magnet 180 may be moved together with the bobbin 110 in the optical-axis direction OA by the interaction between the first coil 120 and the first magnets 130. The first position sensor 170 may detect the intensity of the magnetic field of the second magnet 180, which is moved in the optical-axis direction, and may output a signal according to the result of the detection. For example, a controller 830 of a camera module or a controller 780 of a terminal may detect displacement of the bobbin 110 in the optical-axis direction based on the signal output from the first position sensor 170.

The magnetic field of the second magnet 180 may have an influence on the interaction between the first magnets 130 and the first coil 120 (or the second coil 230). The third magnet 185 may serve to reduce or eliminate the influence on the interaction between the first magnets 130 and the first coil 120 (or the second coil 230) attributable to the magnetic field of the second magnet 180.

By symmetrically disposing the third magnet 185 and the second magnet 180, it is possible to balance the AF movable unit and thus to perform accurate AF motion.

In another embodiment, the second magnet 180 and the third magnet 185 may be omitted, and the first position sensor may be mounted on the bobbin 110 rather than on the housing. Furthermore, as the bobbin 110 and the first position sensor are moved in the optical-axis direction by the interaction between the first coil 120 and the first magnets 130, the first position sensor may detect the intensity of the magnetic field of the first magnet, and may output a signal according to the result of the detection.

The first magnets 130 may be referred to "drive magnets", the second magnet 180 may be referred to a "sensing magnet", and the third magnet 185 may be a "balancing magnet".

Next, the first position sensor 170 and the first circuit board 190 will be described.

The first position sensor 170 and the first circuit board 190 may be disposed on one of the second side portions of the housing 140 so as to correspond to the second magnet 180. For example, the first position sensor 170 may face and overlap the second magnet 180 in a direction perpendicular to the optical-axis direction at the initial position of the bobbin 110.

For example, the first circuit board 190 may be disposed in the first groove 141-1 in the housing 140. The first position sensor 170 may be mounted on the first circuit board 190 disposed in the housing 140.

When the bobbin 110 is moved, the first position sensor 170 may be detect the intensity of the magnetic field of the second magnet 180, and may output an output signal (for example, output voltage) according to the result of the detection.

The first position sensor 170 may be disposed on a first surface of the first circuit board 190. The first surface of the first circuit board 190 mounted on the housing 140 may be a surface that faces toward the inside of the housing 140.

The first position sensor 170 may be embodied as a driver including a hall sensor, or may be embodied as a position detection sensor, such as a hall sensor, alone.

The first position sensor 170 may include two input terminals and two output terminals, and the input terminals and the output terminals of the first position sensor 170 may be conductively connected to a first pad 1, a second pad 2, a third pad 3 and a fourth pad of the first circuit board 190, respectively.

The first circuit board 190 may include circuit patterns or wires (not shown), which connect the first to fourth pads 1 to 4, disposed on the second surface thereof, to the first position sensor 170 mounted on the first surface thereof. For example, the second surface of the first circuit board 190 may be the surface opposite the first surface. For example, the first circuit board 190 may be a printed circuit board or an FPCB.

In another embodiment, although the first position sensor 170 may be disposed on a lower surface of the first circuit board 190 and the first to fourth pads 1 to 4 may be disposed on an upper surface of the first circuit board 190, the disclosure is not limited thereto.

The first to fourth pads 1 to 4 of the first circuit board 190 may be conductively connected to the second circuit board 250 via the upper springs 150-1, 150-4 to 150-6 and the support member 220-3 to 220-6, and the first position sensor 170 may be conductively connected to the second circuit board 250.

Both ends of the first coil 120 may be connected to the inner frames of the second and third upper springs 150-2 and 150-3, and may be conductively connected to the second circuit board 250 via the second and third upper springs 150-2 and 150-3 and the support members 220-2 and 220-3.

Next, the first yoke 192a and the second yoke 192b will be described.

Each of the first yoke 192a and the second yoke 192b may be respectively disposed on the housing 140 between two first magnets 130-1 and 130-3, 130-2 and 130-4, thereby increasing the electromagnetic force between the first coil 120 and the first magnets 130-1 to 130-4.

Each of the first yoke 192a and the second yoke 192b may include a yoke body 192-1, a first bent portion 192-2, a second bent portion 192-2 and a projection 192-4. The yoke body 192-1 may have a shape corresponding to the shape of the yoke-mounting portion 142b of the housing 140, and may be disposed so as to contact yoke-mounting portion 142b.

The first bent portion 192-2 may be bent at one end of the yoke body 192-1, and the second bent portion 192-3 may be bent at the other end of the yoke body 192-1. Each of the first and second bent portions 192-2 and 192-3 may be bent in one direction from the yoke body 192-1. In order to increase the coupling force between the projection 192-4 and the housing, the projection 192-4 may be connected to a lower portion of the yoke body and may project from the yoke body 192-1 in one direction.

Next, the upper elastic member 150, the lower elastic member 160 and the support members 220 will be described.

Each of the upper elastic member 150 and the lower elastic member 160 is coupled both to the bobbin 110 and to the housing 140 so as to support the bobbin 110.

For example, the upper elastic member 150 may be coupled both to the upper portion, the upper surface or the upper end of the bobbin 110 and to the upper portion, the upper surface or the upper end of the housing 140, and the lower elastic member 160 may be coupled both to the lower portion, the lower surface or the lower end of the bobbin 110 and to the lower portion, the lower surface or the lower end of the housing 140.

The support members 220 may support the housing 140 with respect to the base 210, and may conductively connect at least one of the upper elastic member 150 and the lower elastic member 160 to the second circuit board 250.

Figure 9:
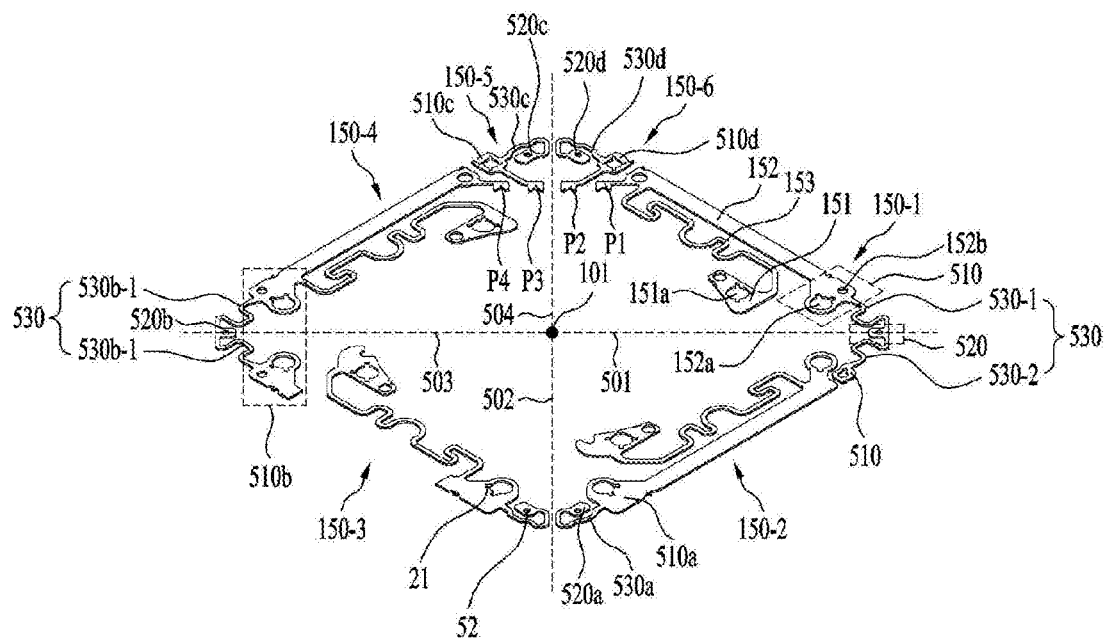
FIG. 9 is a perspective view of an upper elastic member shown in FIG. 1.
Figure 10:
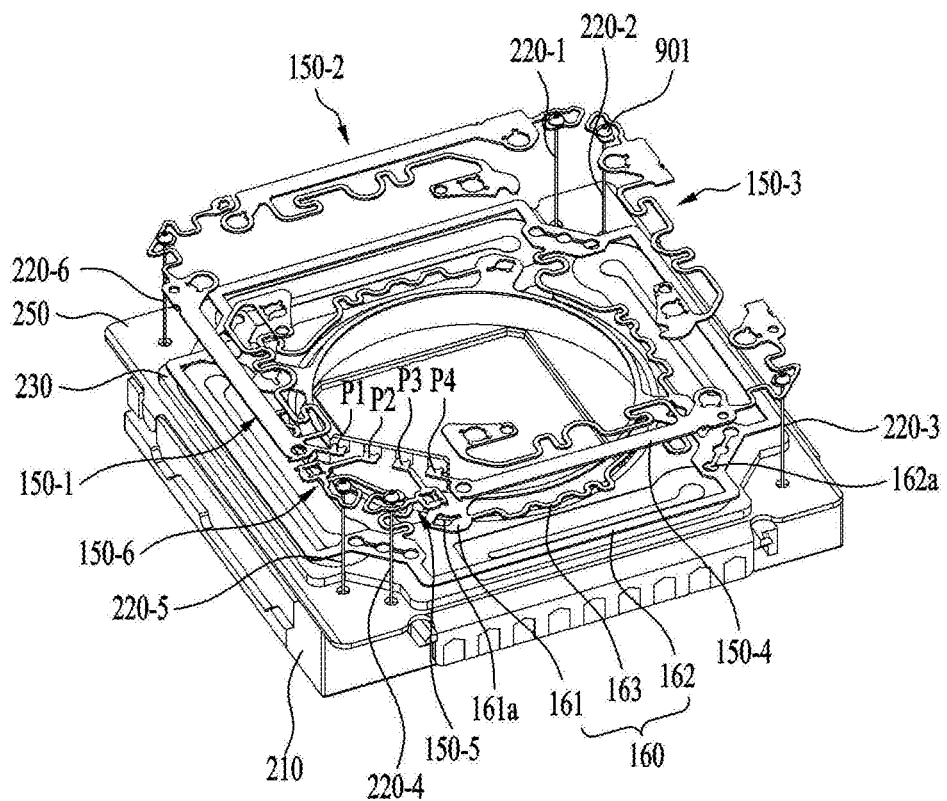
FIG. 10 is a perspective view of the upper elastic member, a lower elastic member, a second coil, a second circuit board, and the base, which are shown in FIG. 2.

FIG. 9 is a perspective view of the upper elastic member 150 shown in FIG. 1. FIG. 10 is a perspective view of the upper elastic member 150, the lower elastic member 160, the second coil 230, the second circuit board 250 and the base 210, which are shown in FIG. 2.

Referring to FIGS. 9 to 10, at least one of the upper and lower elastic members 150 and 160 may be divided or separated into two or more.

For example, the upper elastic member 150 may include first to sixth upper springs 150-1 to 150-6, which are spaced apart from one another.

Here, the term "elastic member" used to describe the upper elastic member and the lower elastic member may be referred to an "elastic unit". Furthermore, the term "spring" used in the upper spring and the lower spring may be referred to an "elastic unit".

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire or the like.

Each of the first to fourth upper springs 150-1 to 150-4 may include a first inner frame 151 coupled to the upper portion, the upper surface or the upper end of the bobbin 110, a first outer frame 152 coupled to the upper portion, the upper surface or the upper end of the housing 140, and a first frame-connector 153 connecting the first inner frame 151 to the first outer frame 152.

Each of the fifth and sixth upper springs 150-5 and 150-6 may include the first outer frame 152, which is coupled to the upper portion, the upper surface or the upper end of the housing 140. Although each of the fifth and sixth upper springs does not include the first inner frame or the first frame connector in FIG. 9, the disclosure is not limited thereto. In another embodiment, each of the fifth and sixth upper springs may include the first inner frame and the first frame connector.

The inner frame may be referred to an "inner portion", and the outer frame may be referred to an "outer portion".

The first outer frame 152 of each of the first to sixth upper springs 150-1 to 150-6 may include a first coupler 510, 510a to 510d coupled to a corresponding one of the corner portions 501a to 501d of the housing 140, a second coupler 520, 520a to 520d, and a connector 530, 530a to 530d connecting the first coupler 510, 510a to 510d to the second coupler 520, 520a to 520d.

The first coupler 510, 510a to 510d may include at least one coupling region, which is coupled to a corresponding one of the corner portions 501a to 501d of the housing 140.

For example, the first coupler 510, 510a to 510d may include at least one coupling region including a hole 152a, 152b, which is coupled to the second upper support protrusion 143a, 143b of the housing 140.

Although the coupling regions of the first couplers 510, 510a to 510d of the first to sixth upper springs 150-1 to 150-6 may be bilaterally symmetrical with respect to the reference line (for example, 501 to 504) in order to support the housing 140 in a balanced state without eccentricity, the disclosure is not limited thereto.

Although each of the coupling regions of the first couplers 510, 510a to 510d of the first to sixth upper springs 150-1 to 150-6 in the embodiment shown in FIG. 9 may be embodied so as to include a hole, the disclosure is not limited thereto. In another embodiment, the coupling regions may also be embodied as having various shapes suitable for being coupled to the housing 140, for example, grooves or the like.

For example, the holes 152a in the first couplers 510, 510a to 510d may have at least one slit 21 for allowing an adhesive member to be introduced into the gap between the second upper support protrusions 143a and the holes 152a.

The first coupler 510, 510b of each of the first and fourth upper springs 150-1 and 150-4 may include a first coupling region, which is positioned at one side of the reference line 501 to 504, and a second coupling region, which is positioned at the other side of the reference line.

For example, the first coupler 510a, 510c, 510d of each of the second, third, fifth and sixth upper springs 150-2, 150-3, 150-5 and 150-6 may include a coupling region, which is positioned at one side of the reference line 501 to 504.

Each of the second coupler 520, 520a to 520d may have a hole 52 through which a corresponding one of the support members 220-1 to 220-6 extends. One end of each of the support members 220-1 to 220-6 that has passed through the hole 52 may be coupled to a corresponding one of the second couplers 520, 520a to 520d via a conductive adhesive member or a solder 901, and the second couplers 520, 520a to 520d may be conductively connected to the support members 220-1 to 220-6.

The second coupler 510, 520a to 520d, at which the solder 901 is disposed, may include a hole 52 and a region near the hole 52.

The connector 530, 530a to 530d may connect the coupling region of the first coupler 510, 510a to 510d to the second coupler 520, 520a to 520d.

For example, the connector 530, 530d may include a first connecting region 530-1, 530b-1, connecting the first coupling region of the first coupler 510, 510b of each of the first to fourth upper springs 150-1 and 150-4 to the second coupler 520, 520b, and a second connecting region 530-3, 530b-2, connecting the second coupling region of the first coupler 510, 510b to the second coupler 520, 520b.

The connector 530a, 530c, 530d may include one connecting region 530a, 530c, 530d, connecting the coupling region of the first coupler 510a, 510c, 530d of each of the second, third, fifth and sixth upper springs 150-2, 150-3, 150-5, 150-6 to the second connector 520a, 520c, 520d.

Although each of the connecting regions 530-1, 530-2, 530b1, 530b2, 530c and 530d may include a bent portion, which is bent at least once, or a curved portion, which is curved at least once, the disclosure is not limited thereto. In another embodiment, they may be linear.

The width of the connectors 530, 530a to 530d may be smaller than the width of the first couplers 510, 510a to 510d. Accordingly, the connectors 530, 530a to 530d may be easily movable in the first direction, whereby it is possible to distribute the stress applied to the upper elastic member 150 and the stress applied to the support member 220.

Although the third couplers 530, 530a to 530d may be bilaterally symmetrical with respect to the reference line in order to support the housing 140 in a balanced state without eccentricity, the disclosure is not limited thereto. In another embodiment, the couplers may not be bilaterally symmetrical. The reference line 501 to 504 may be a line that extends through the center point 101 (see FIG. 9) and through a corresponding one of the corners of the corner portions 501a to 501d of the housing 140. Here, the center point 101 may be the center of the housing 140.

The first outer frame 152 of each of the first upper spring 150-1 and the fourth to sixth upper springs 150-4 to 150-6 may include a contact P1 to P4, which is brought into contact with or connected to a corresponding one of the pads 1 to 4 of the first circuit board 190.

Each of the fifth upper spring 150-5 and the sixth upper spring 150-6 may include the contact P2, P3, which extends from the first coupler 510c, 510d.

Each of the first spring 150-1 and the fourth upper spring 150-4 may include the contact P1, P4, which extends from one end of the first outer frame coupled to the first side portion of the housing 140.

Each of the contacts P1 to P4 may be directly brought into contact with a corresponding one of the pads 1 to 4 of the first circuit board 190, and each of the contacts P1 to P4 may be conductively connected to a corresponding one of the pads 1 to 4 of the first circuit board 190.

The lower elastic member 160 may include a second inner frame 161 coupled to the lower portion, the lower surface or the lower end of the bobbin 110, a second outer frame 162 coupled to the lower portion, the lower surface or the lower end of the housing 140, and a second frame-connector 163 connecting the second inner frame 161 to the second outer frame 162.

The lower elastic member 160 may have therein the hole 161a, which is formed in the second inner frame 161 and which is coupled to the first lower coupling groove 117 in the bobbin 110 via a solder or a conductive adhesive member, and the hole 162a, which is formed in the second outer frame 162 and which is coupled to the second lower support protrusion 147 of the housing 140.

Each of the first and second frame-connectors 153 and 163 of the upper and lower elastic members 150 and 160 may be bent or curved at least once so as to define a predetermined pattern. The upward and/or downward movement of the bobbin 110 in the first direction may be elastically (or flexibly) supported by virtue of positional variation and fine deformation of the first and second frame-connectors 153 and 163.

In order to absorb or buffer vibrations of the bobbin 110, the lens moving apparatus 100 may further include first damping members (not shown), each of which is disposed between a corresponding one of the upper springs 150-1 to 150-6 and the housing 140.

For example, each of the first damping members (not shown) may be disposed in the space between the first frame-connector 153 of a corresponding one of the upper springs 150-1 to 150-6 and the housing 140.

The lens moving apparatus 100 may further include second damping members (not shown), each of which is disposed between a corresponding one of the second frame-connectors 163 of the lower elastic members 160 and the housing 140.

The lens moving apparatus 100 may further include third damping members (not shown) disposed between the support members 220 and the holes 147a in the housing 140.

Furthermore, the lens moving apparatus 100 may further include fourth damping members (not shown), which are disposed at the second couplers 520, 520a to 520d and the first ends of the support members 220, and may further include fifth damping members (not shown), which are disposed at the other ends of the second support members 220 and the circuit board 250.

For example, a damping member (not shown) may also be disposed between the inner surface of the housing 140 and the outer peripheral surface of the bobbin 110.

Next, the support members 220 will be described.

The first ends of the support members 220 may be coupled to the upper elastic member 150 via a solder or a conductive adhesive member, and the second ends of the support members 220 may be coupled to the lower surface of the base 210 via a solder or a conductive adhesive member.

The support members 220 may include a plurality of support members. Each of the plurality of support members 220-1 to 220-6 may be coupled to a corresponding one of the second couplers 520, 520a to 520d of the upper springs 150-1 to 150-6 via the solder 901, and may be conductively connected to the second coupler 520. For example, the plurality of support members 220-1 to 220-6 may be disposed on the four second side portions 142.

The plurality of support members 220-1 to 220-6 may support the bobbin 110 and the housing 140 such that the bobbin 110 and the housing 140 are movable in a direction perpendicular to the first direction. Although one or two support members are disposed at each of the second side portions of the housing 140 in the embodiment shown in FIGS. 3 and 10, the disclosure is not limited thereto.

In another embodiment, two or more support members may be disposed at each of the second side portions of the housing 140, and one support member may be disposed on each of the second side portions of the housing 140.

Each of the plurality of support members 220-1 to 220-6 may be spaced apart from the housing 140, and may be directly connected to a corresponding one of the second couplers 520, 520a to 520d of the first outer frame 152 of each of the upper springs 150-1 to 150-6.

In another embodiment, the support members 220 may be embodied as leaf springs, and may be disposed at the first side portions 141 of the housing 140.

The drive signal from the second circuit board 250 may be transmitted to the first coil 120 through the plurality of support members 220-1 to 220-6 and the upper springs 150-1 to 150-6, and the drive signal from the second circuit board 250 may be applied to the first position sensor 170. The signal output from the first position sensor 170 may be transmitted to the second circuit board 250.

For example, the drive signal from the second circuit board 250 may be applied to the first coil 120 via the second and third springs 150-2 and 150-3 and the first and second support members 220-1, 220-2.

Furthermore, the drive signal from the second circuit board 250 may be applied to the first position sensor 170 via the fourth and fifth upper springs 150-4 and 150-5 and the third and fourth support members 220-4 and 220-5, and the output signal from the first position sensor 170 may be transmitted to the second circuit board 250 via the first and sixth upper springs 150-1 and 150-6 and the fifth and sixth support members 220-5 and 220-6.

The plurality of support members 220-1 to 220-6 may be made of additional members separated from the upper elastic member 1150, and may be embodied as members having elastic supporting ability, for example, leaf springs, coil springs, suspension wires or the like. In another embodiment, the support members 220-1 to 220-6 may be integrally formed with the upper elastic member 1150.

Next, the base 210, the second circuit board 250, the second coil 230 and the second position sensor 240 will be described.

The base 210 may have a hole corresponding to the hole in the bobbin 110 and/or the hole in the housing 140, and may be configured to have a shape that coincides with or corresponds to the shape of the cover member 300, for example, a rectangular shape.

Figure 11:
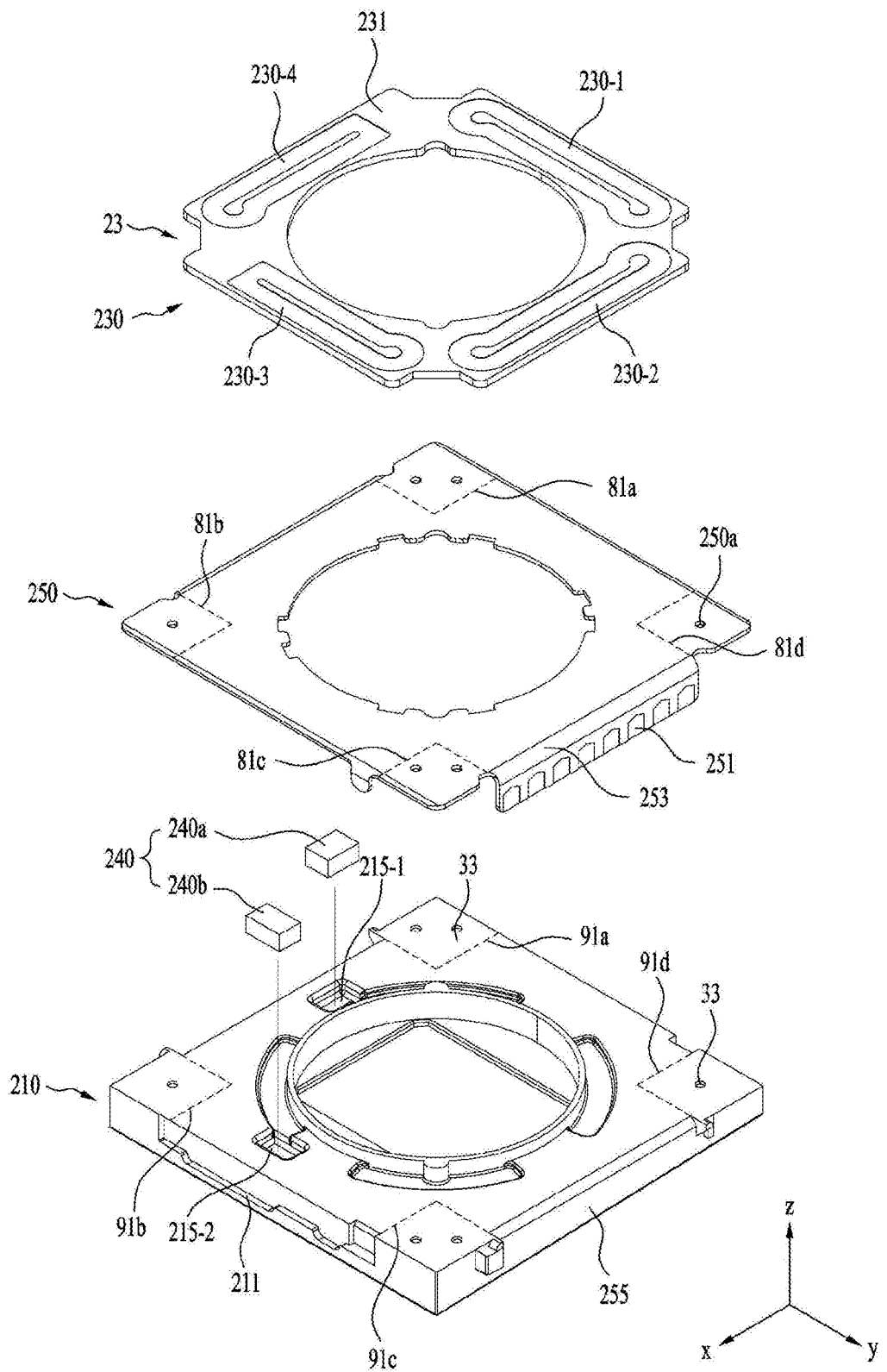
FIG. 11 is a perspective view of the second coil, the second circuit board, the base and the second position sensor.
Figure 12A:
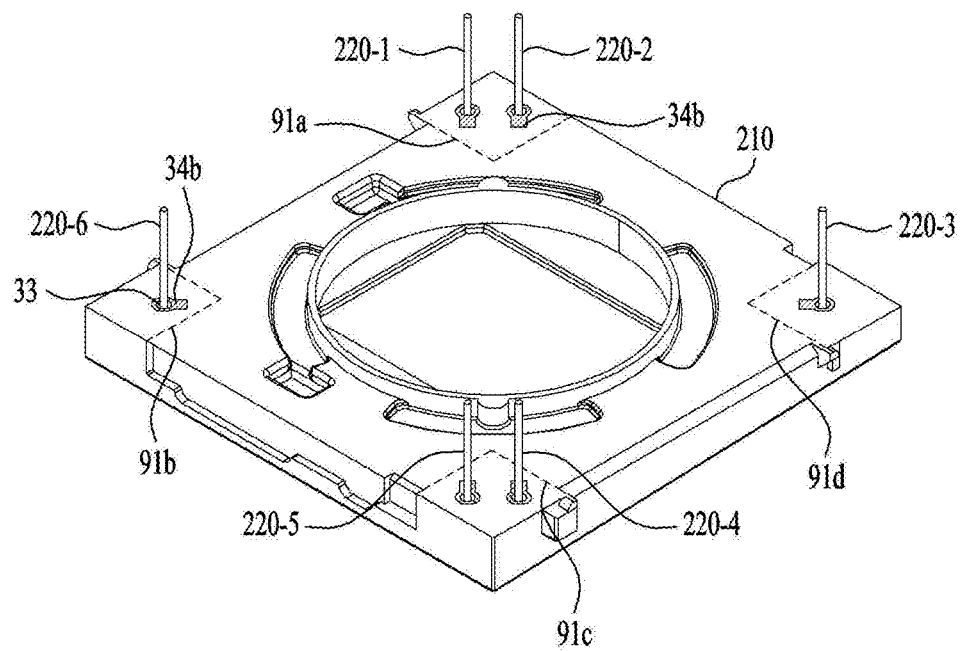
FIG. 12A is a perspective view of the base and the support members according to an embodiment.
Figure 13:
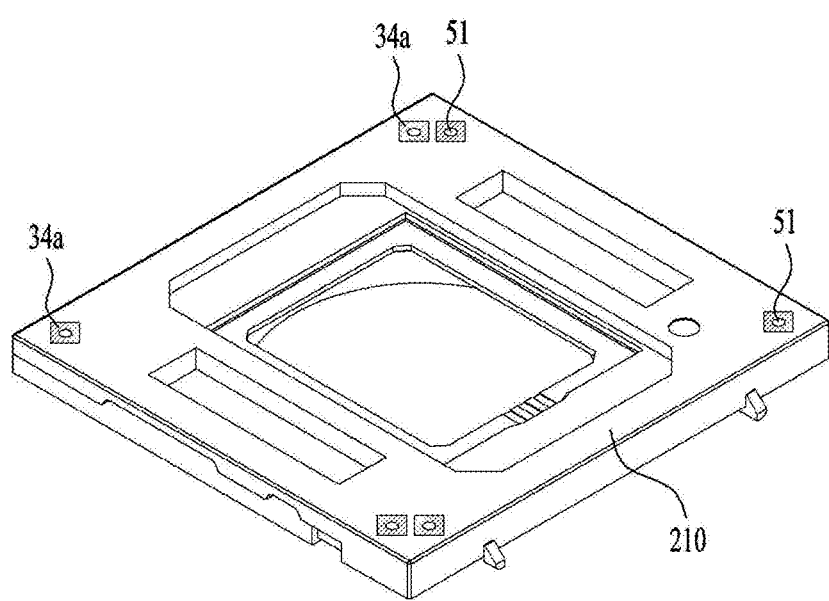
FIG. 13 is a bottom view of the base shown in FIG. 12A.
Figure 14:
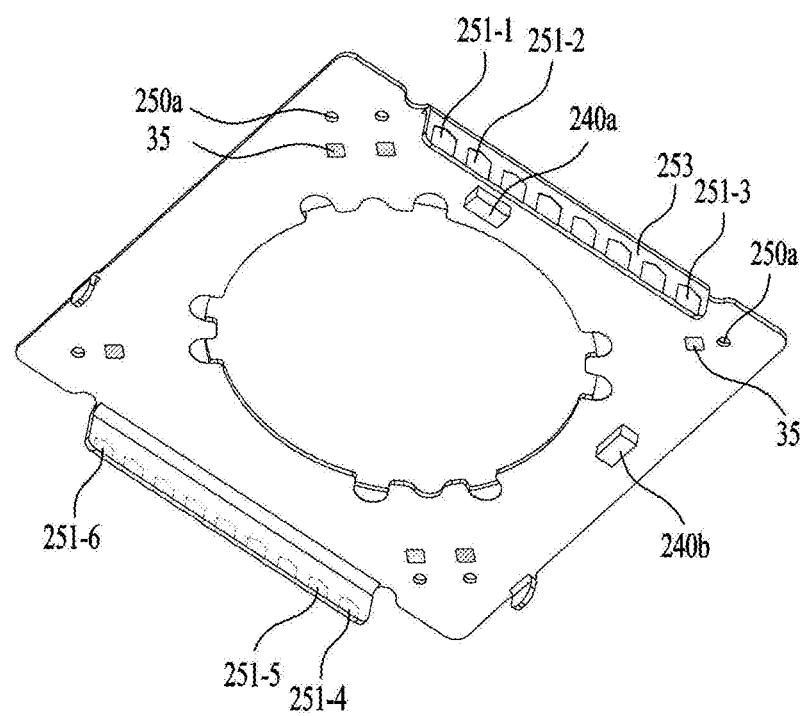
FIG. 14 is a bottom view of the second circuit board conductively connected to the support members shown in FIG. 12A.
Figure 15A:
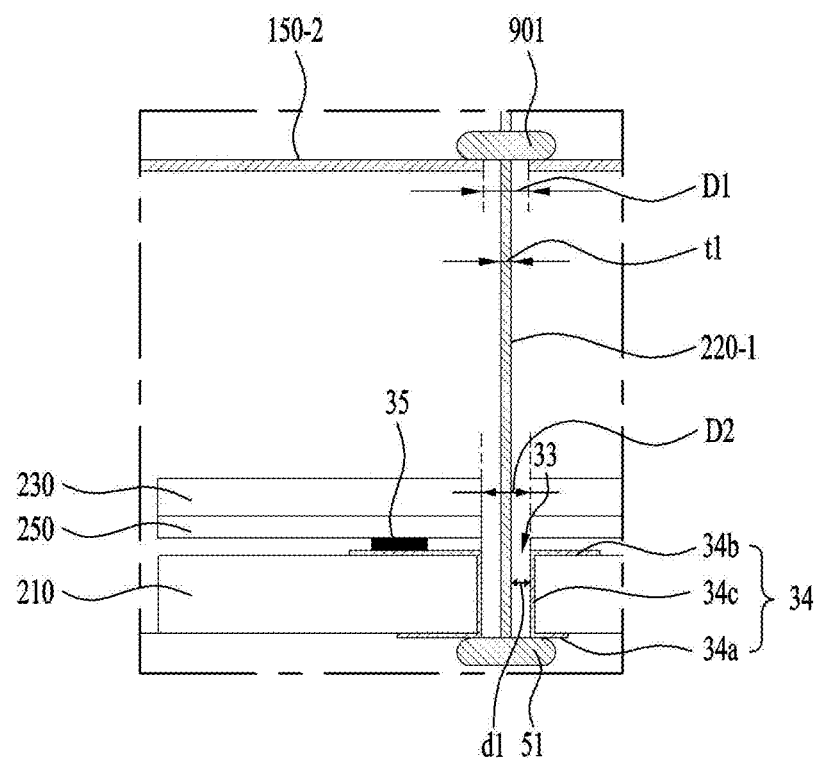
FIG. 15A is a cross-sectional view illustrating conductive connection among the base, the second circuit board and the first support member, which are shown in FIG. 14.

FIG. 11 is a perspective view of the second coil 230, the second circuit board 250, the base 210 and the second position sensor 240. FIG. 12A is a perspective view of the base 210 and the support members 220-1 to 220-6 according to an embodiment. FIG. 13 is a bottom view of the base 210 shown in FIG. 12A. FIG. 14 is a bottom view of the second circuit board 250 conductively connected to the support members 220-1 to 220-6 shown in FIG. 12A. FIG. 15A is a cross-sectional view illustrating conductive connection among the base 210, the second circuit board 250 and the first support member 220-2, which are shown in FIG. 14. Although only the first support member 220-1 is illustrated in FIG. 15A, the description of the first support member 220-1 may also be applied to the second to sixth support members 220-2 to 220-5.

Referring to FIG. 11, the base 210 may include a stepped portion 211, to which an adhesive is applied when the cover member 300 is adhesively attached to the base 210. The stepped portion 211 may guide the cover member 300, which is coupled to the upper side thereof, and may face the lower end of the side plate of the cover member 300.

The base 210 may include a support portion 255, which is formed on the surface thereof that faces the portion including the terminals 251 of the second circuit board 250 and which has a size corresponding to the size of the terminal 251. The support portion 255 of the base 210 may support the terminal member 253 of the second circuit board 250.

The base 210 may be provided in the upper surface thereof with mounting grooves 215-1 and 215-2, in which the second position sensors 240 mounted on the second circuit board 250 are disposed. According to the embodiment, the base 210 may be provided with two mounting grooves 215-1 and 215-2.

The imaginary lines, which connect the centers of the mounting grooves 215-1 and 215-2 to the center of the base 210, may intersect each other. Although the angle defined between the imaginary lines, which connect the centers of the mounting grooves 215-1 and 215-2 to the center of the base 210, may be, for example, an angle of 90 degrees, the disclosure is not limited thereto.

The base 210 may have first holes 33, through which the second ends of the support members 220 extend.

The corner portions 91a to 91d may be provided with the first holes 33 corresponding to the support members 220-1 to 220-6.

For example, the number of first holes 33 formed in the corner portions 91a to 91d of the base 210, may be the same as the number of support members disposed on the second side portion of the housing 140.

Each of the corner portions 91a to 91d of the base 210 may be provided with, for example, one or more first holes 33.

For example, the first holes 33, which are respectively formed in the corner portions 91a to 91d of the base 210, may be disposed so as to face each other in the diagonal direction of the base 210.

For example, the first holes 33 may not overlap the circuit board 250 in the optical-axis direction or in the first direction.

For example, the corner portions 91a to 91d of the base 210 may correspond to the corner portions 501a to 501d of the housing 140, and each of the corner portions may be defined within a predetermined range from the corner vertex.

The second end of each of the support members 220-1 to 220-6 may extend through a corresponding one of the first holes 33 formed in the corner portions 91a to 91d of the base 210, and may be coupled to the lower surface of the base 210.

The second coil 230 may be disposed above the second circuit board 250, and the second position sensor 240 may be disposed under the second circuit board 250.

For example, the second position sensor 240 may be mounted on the lower surface of the second circuit board 250, and the lower surface of the second circuit board 250 may face the upper surface of the base 210.

The second position sensor 240 may detect the intensity of the magnetic field of the first magnets 130 disposed on the housing 140 when the housing 140 is moved in a direction perpendicular to the optical-axis direction, and may output an output signal (for example, output voltage) according to the result of the detection.

Based on the output signal from the second position sensor 240, it is possible to detect displacement of the housing 140 relative to the base 210 in a direction (for example, in the X-axis direction or in the Y-axis direction) perpendicular to the optical axis (for example, in the Z-axis direction).

The second position sensor 240 may include two OIS position sensors 240a and 240b for detecting displacement of the housing 140 in the second direction (for example, in the X-axis direction) and in the third direction (for example, in the Y-axis direction) perpendicular to the optical axis.

The first OIS position sensor 240a may detect the intensity of the magnetic field of the first magnet 130 when the housing 140 is moved, and may output a first output signal according to the result of the detection. The second OIS position sensor 240b may detect the intensity of the magnetic field of the first magnet 130 when the housing 140 is moved, and may output a second output signal according to the result of the detection. The controller 830 of the camera module or the controller 780 of the portable terminal 200A may detect the displacement of the housing 140 based on the first and second output signals.

Imaginary lines, which are connected to the OIS position sensors 240a and 240b disposed on the base 210 and are connected to the center of the base, may intersect each other. Although the imaginary lines may be orthogonal to each other, the disclosure is not limited thereto.

The second circuit board 250 may be positioned under the housing 140, may be disposed on the upper surface of the base 210, and may have a hole corresponding to the hole in the bobbin 110, the hole in the housing 140 and/or the hole in the base 210. The shape of the outer periphery of the second circuit board 250 may have a shape that coincides with or corresponds to the shape of the upper surface of the base 210, for example, a square shape.

The second circuit board 250 may include at least one terminal member 253, which is bent from the upper surface thereof and which includes a plurality of terminals 251 or pins for conductive connection to the outside.

The terminal member 253 of the second circuit board 250 may be provided with a plurality of terminals 251. For example, a drive signal may be received from the outside through the plurality of terminals 251 provided at the terminal member 253 of the second circuit board 250, and may then be applied to the first and second coils 120 and 230 and the first and second position sensors 170 and 240. Furthermore, output signals output from the first and second position sensors 170 and 240 may be output to the outside through the plurality of terminals 251.

Although the circuit board 250 may be embodied as an FPCB according to the embodiment, the disclosure is not limited thereto. The terminals of the second circuit board 250 may be directly formed on the surface of the base 210 through a surface electrode technology or the like.

Although the second coil 230 is embodied as being provided on a circuit member 231, which is separate from the second circuit board 250, in FIG. 11, the disclosure is not limited thereto. In another embodiment, the second coil 230 may be embodied as a ring-shaped coil block or an FP coil.

In a further embodiment, the second coil 230 may be embodied as a circuit pattern formed on the second circuit board 250.

The second circuit board 250 may include holes 250a, through which the support members 220-1 extend. The positions and number of holes 250a may correspond to or coincide with the positions and number of support members 220-1 to 220-6. Each of the support members 220-1 to 220-6 may be disposed so as to be spaced apart from the inner surface of a corresponding hole 250a in the circuit board 250.

The holes 250a may be disposed at the corner portions 81a to 81d of the second circuit board 250, and the corner portions 81a to 81d may correspond to the corner portions 501a to 501d of the housing 140.

The circuit member 231, at which the second coil 230 is provided, may be provided at the corners thereof with escape grooves 23. The escape grooves 23 may have a shape such that the corners of the circuit board 231 are chamfered. In another embodiment, the corner portions of the circuit member 231 may be provided with holes, through which the support members 220 extend.

The second coil 230 may be disposed above the second circuit board 250 so as to correspond to the first magnets 130 disposed on the housing 140. In another embodiment, the circuit board 250 may include the second coil, which faces the first magnets 130.

Although the second coil 230 may include four OIS coils 230-1 to 230-4, which are disposed so as to correspond to the four sides of the circuit board 250, the disclosure is not limited thereto. Furthermore, only two coils, that is, one coil for the second direction and one coil for the third direction, may be provided, or four or more coils may be provided. Here, the OIS coils 230-1 to 230-4 may be referred to "coil units".

As described above, handshake correction may be performed by moving the housing 140 in the second and/or third direction by the interaction between the first magnets 130 and the second coil 230, which correspond to each other.

Each of the OIS position sensors 240a and 240b may be embodied as a hall sensor. Any sensor may be used, as long as the sensor is capable of detecting the intensity of a magnetic field. For example, each of the OIS position sensors 240 may be embodied as a driver including a hall sensor, or may be embodied as a position detection sensor, such as a hall sensor, alone.

Each of the OIS position sensors 240a and 240b may be mounted on the second circuit board 250, and the second circuit board 250 may include terminals conductively connected to the OIS position sensors 240a and 240b.

The upper surface of the base 210 may be provided with a coupling protrusion (not shown) for coupling between the second circuit board 250 and the base 210, and the second circuit board 250 may be provided with a hole (not shown), which is coupled to the coupling protrusion of the base 210 or is secured to the coupling protrusion by thermal fusion or an adhesive member such as epoxy.

Referring to FIGS. 12A and 13 to 15A, the support members 220 may extend through corresponding first holes 33, and may be coupled to a conductive pattern or a conductive layer provided on the lower surface of the base 210.

For example, the conductive pattern 34 may be provided on the inner surfaces (or the inner wall) of the first holes 33, the lower surface of the base 210 contacting first ends of the first holes 33 and the upper surface of the base 210 contacting the second ends of the first holes 33.

The conductive pattern 34 may include a first conductive pattern 34b disposed on the upper surface of the base 34b, a second conductive pattern 34a disposed on the lower surface of the base 210, and a third conductive pattern 34c disposed on the inner surfaces of the inner walls of the first holes 33 so as to connect the second conductive pattern 34a to the first conductive pattern 34b.

The support members 220 and the second circuit board 250 may be conductively connected to each other via the conductive pattern 34. For example, the first ends of the support members 220 may be coupled to the upper elastic member 150, and the second ends of the support members 220 may be coupled to the conductive pattern 34 through the first holes 33 in the base 210.

The second ends of the support members 220 may be coupled to the second conductive pattern 34a disposed on the lower surface of the base 210 via an adhesive member 51 such as solder.

The reason why the second ends of the support members 220 are coupled to the second conductive pattern 34a disposed on the lower surface of the base 210 is to increase the length of the support members 220 and thus to increase the resistance of the support members 220, thereby decreasing the amount of current flowing through the support members 220 and thus reducing power consumption.

Although the support members 220 may be spaced apart from the third conductive pattern 34c when there is no movement or flexion of the support members 220 attributable to OIS driving, the disclosure is not limited thereto. In another embodiment, the second ends of the support members 220 may be brought into contact with the third conductive pattern 34c. In this case, the portion to which the second ends of the support members 220 are attached may be the second conductive pattern 34a disposed on the lower surface of the base 210.

In another embodiment, the second ends of the support members 220 may be coupled to the third conductive pattern 34c.

The conductive pattern 34 may be disposed on the corner portions 91a to 91d of the base 210.

The diameter t1 of each of the support members 220-1 to 220-6 may be smaller than the diameter D2 of the first hole 33 (t1<D2).

The diameter t1 or thickness of each of the support members 220-1 to 220-6 may be within the range of 30 μm-70 μm. For example, t1 may be within the range of 36 μm-50 μm.

Although the diameter of the hole 250a in the circuit board 250 may be larger than the diameter of the hole 52 in the second couplers 520, 520a to 520d, the disclosure is not limited thereto. In another embodiment, the two diameters may be the same as each other. Although the diameter of the hole 250a in the circuit board 250 may be smaller than the diameter D2 of the first hole 33 in the base 210, the disclosure is not limited thereto.

The diameter D2 of the first hole 33 in the base 210 may be within the range of 0.1 mm-1 mm. For example, D2 may be within the range of 0.25 mm-0.6 mm.

The distance d1 between the inner surface of the first hole 33 and each of the support members 220-1 to 220-6 may be within the range of 0.015 mm-0.48 mm.

The diameter D1 of the hole 52 in the second coupler 520, 520a to 520d) of the first outer frame 152 may be smaller than the diameter D2 of the first hole 33 in the base 210 (D1<D2). In another embodiment, D1 and D2 may be the same as each other.

For example, the diameter D1 of the hole 52 may be within the range of 0.07 mm-0.5 mm so as to allow the support members 220-1 to 220-6 to be easily bonded.

In another embodiment, the first hole in the base 210 may have a portion in which the diameter of the first hole is increased moving toward the upper surface from the lower surface of the base 210.

In another embodiment, the hole in the base 210 may include an upper region abutting the upper surface of the base and a lower region positioned between the upper region and the lower surface of the base 210. The diameter of the upper region of the hole in the base 210 may be increased moving toward the upper surface from the lower surface of the base 210. The diameter of the lower region of the hole in the base 210 may be constant, and may be the same as the minimal diameter of the upper region of the hole in the base 210.

The second ends of the support members 220 and the conductive pattern 34 may be coupled to each other using a conductive adhesive member such as solder. For example, the support members 220 and the second conductive pattern 34a may be coupled and conductively connected to each other using the solder 51.

The second circuit board 250 may include pads 35 or bonding portions formed on the lower surface thereof for conductive connection to the conductive pattern 34 of the base 210.

The pads 35 may be disposed on the lower surface of the second circuit board 250 so as to correspond to the first conductive patterns 34b provided on the base 210.

Each of the pads 35 of the second circuit board 250 may be coupled to a corresponding one of the first conductive patterns 34b provided on the upper surface of the base 210 using a conductive adhesive member such as solder.

Each of the pads 35 of the second circuit board 250 may be conductively connected to a corresponding one of the terminals 251-1 to 251-6 of the second circuit board 250 via a circuit pattern, a conductive pattern or a wire provided on the second circuit board 250.

Although each of the support members 220-1 to 220-6 is illustrated in FIGS. 12A, 13 and 14 as being conductively connected to the conductive pattern 34 of the base 210 and the pad 35 of the second circuit board 250, the disclosure is not limited thereto.

When at least one of the support members (for example, two support members) is conductively connected to the second circuit board 250, at least one conductive pattern 34, for example, two conductive patterns, may be provided on the base 210 so as to correspond to the at least one support member (for example, two support members), and at least one pad 35, for example, two pads, may be provided on the second circuit board 250 so as to correspond to the at least one conductive pattern 34.

Generally, as the thickness of a cellular phone is decreased, the thickness of a camera module mounted on the cellular phone (for example, the length of the camera module in the optical-axis direction) is also decreased. In order to realize a camera module having a small thickness, it is required to decrease the length of the OIS wire corresponding to the support member 220.

When the length of the OIS wire, having a constant diameter is decreased, the resistance of the OIS wire is decreased, with the result that the amount of current flowing through the OIS wire is increased and power consumption is increased. Although it is possible to inhibit an increase in current attributable to the decrease in the length of the OIS wire by decreasing the diameter of the OIS wire, decreasing the diameter of the OIS wire may lower the reliability of OIS driving.

According to the embodiment, since the support members 220 are coupled to the second conductive pattern 34a provided on the lower surface of the base 210 through the base 210, it is possible to decrease the intensity of current flowing through the support members 220, thus reducing power consumption, and it is possible to inhibit deterioration in reliability in OIS driving attributable to a decrease in the diameter of the OIS wire.

Figure 12B:
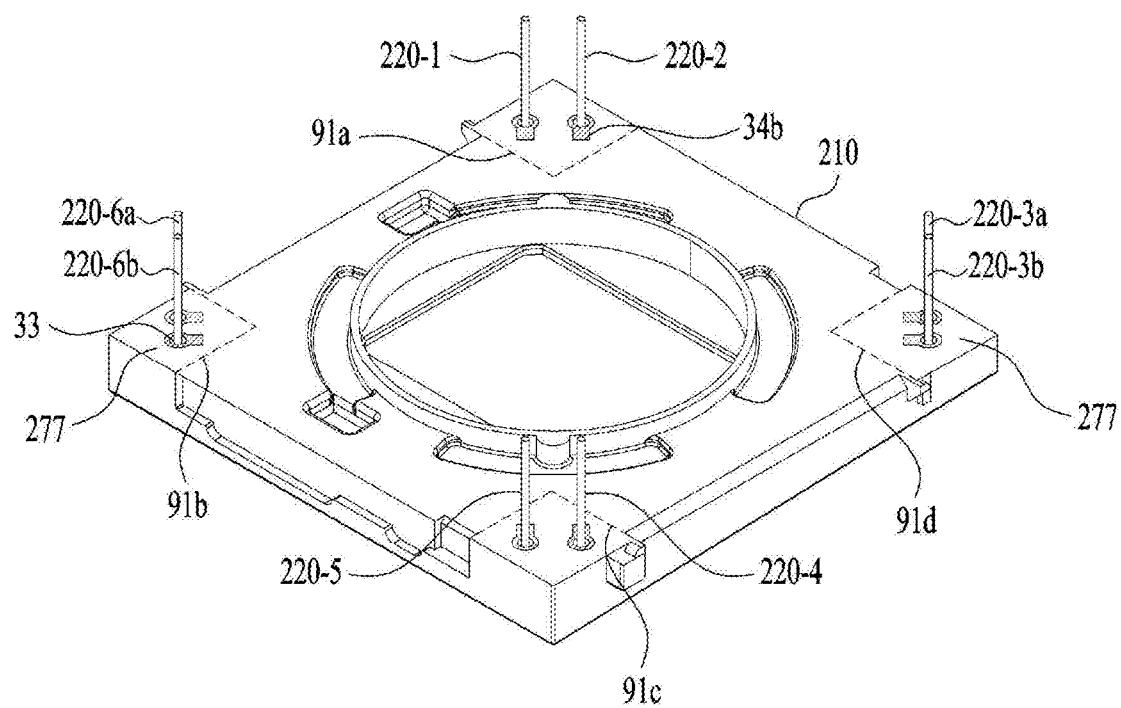
FIG. 12B is a perspective view of the base and the support members according to another embodiment.

FIG. 12B is a perspective view of the base and support members 220-1, 220-2, 220-3a, 220-3b, 220-4, 220-5, 220-6a and 220-6b according to another embodiment.

Referring to FIG. 12B, the outer frame of each of the first upper spring 150-1 and the fourth upper spring 150-4, which are shown in FIG. 9, may be separated into two frames, and each of the two separated outer frames may include a second coupler for coupling to the support member.

In the embodiment shown in FIG. 12B, two support members 220-1 and 220-2, 220-3a and 220-3b, 220-4 and 220-5, and 220-6a and 220-6b may be disposed on each of the corner portions of the housing 140, and each of the two support members 220-1 and 220-2, 220-3a and 220-3b, 220-4 and 220-5, and 220-6a and 220-6b may extend through a corresponding one of the corner portions 91a to 91d of the base 210.

The description of the first holes 33, the second conductive pattern 34a, the first conductive pattern 34b and the like may also be applied to the embodiment shown in FIG. 12B.

Figure 15B:
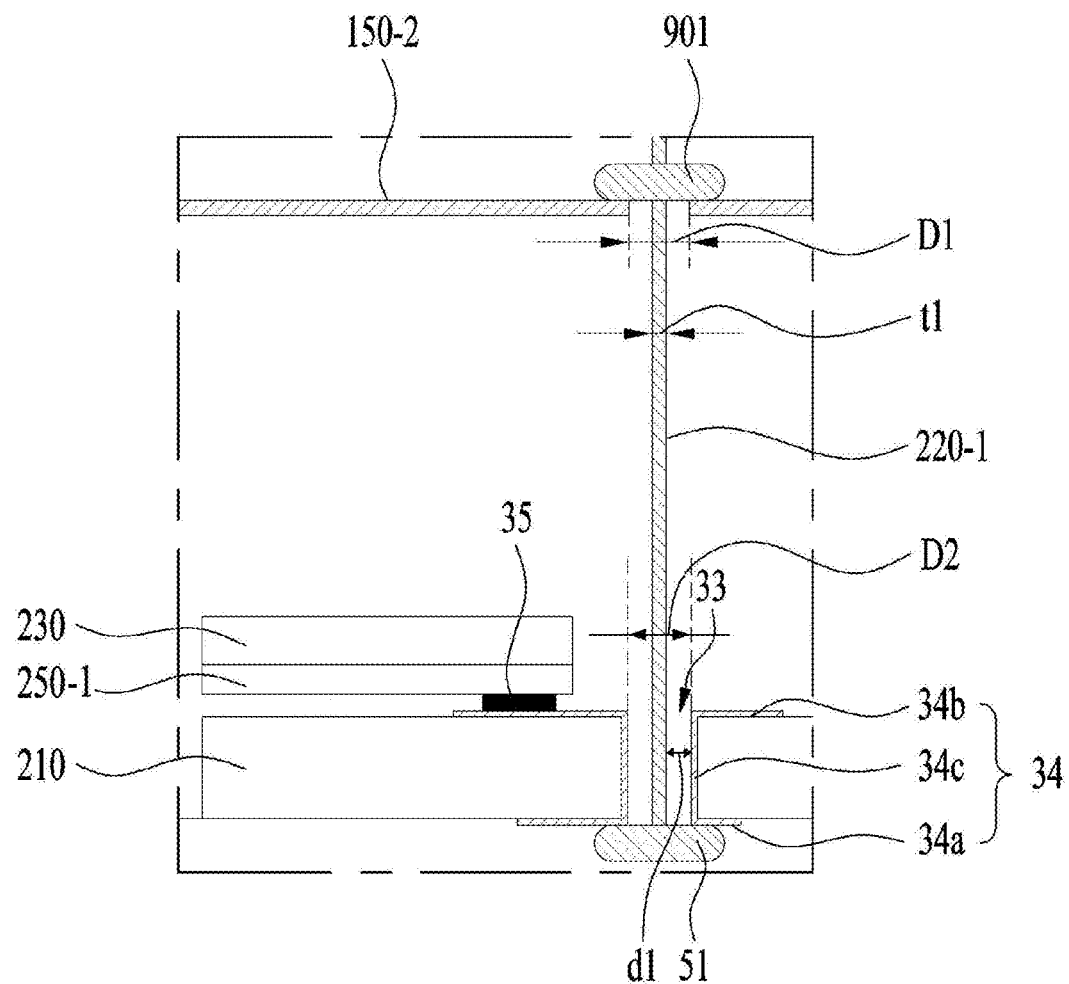
FIG. 15B illustrates a modification of FIG. 15A.

FIG. 15B illustrates a modification of FIG. 15A.

Referring to FIG. 15B, a second circuit board 250-1 according to another embodiment may be provided in the corner portions thereof with escape grooves so as to eliminate spatial interference with the support members 220. Here, each of the escape grooves in the second circuit board 250-1 may have a shape in which the corner is chamfered, that is, a shape the same as or similar to the escape groove 23 in the circuit member 231 shown in FIG. 11.

Each of the corner portions 91a to 91d of the base 210 may include a first region. The first regions of the corner portions 91a to 91d of the base 210 may be regions that do not overlap the second circuit board 250 in the optical-axis direction or in the first direction and in which the first holes 33 are formed.

For example, the first holes 33 in the base 210 may not overlap the circuit member 231 in the optical-axis direction or in the first direction. In other words, the first holes 33 in the base 210 may overlap the escape grooves in the circuit member 231 in the optical direction or in the first direction.

For example, the first holes 33 in the base 210 may not overlap the second circuit board 250 in the optical-axis direction or in the first direction. When the second circuit board 250 is provided with the above-mentioned escape grooves, the first holes 33 in the base 210 may overlap the escape grooves in the second circuit board 250 in the optical-axis direction or in the first direction.

Figure 16A:
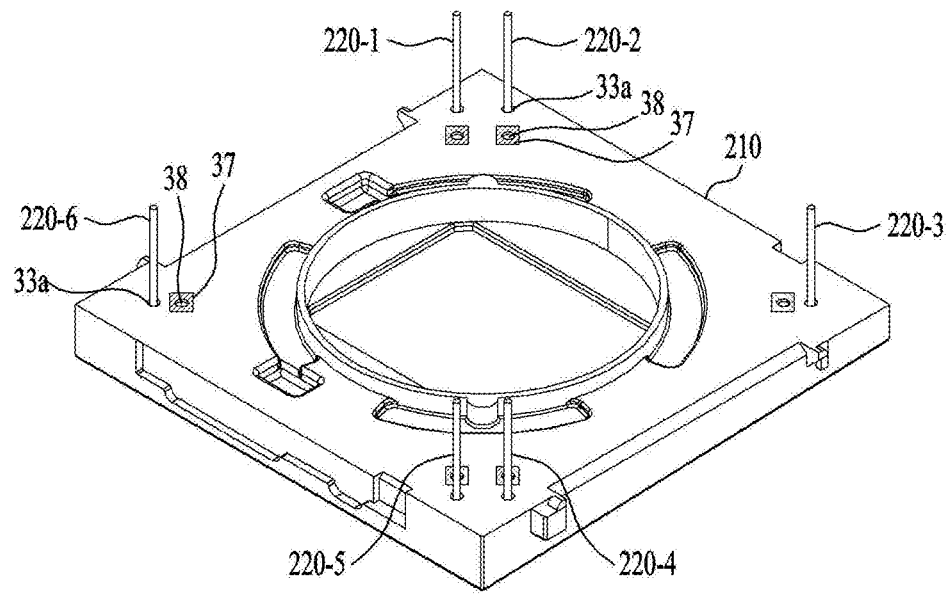
FIG. 16A is a perspective view of the base and support members according to a further embodiment.
Figure 17:
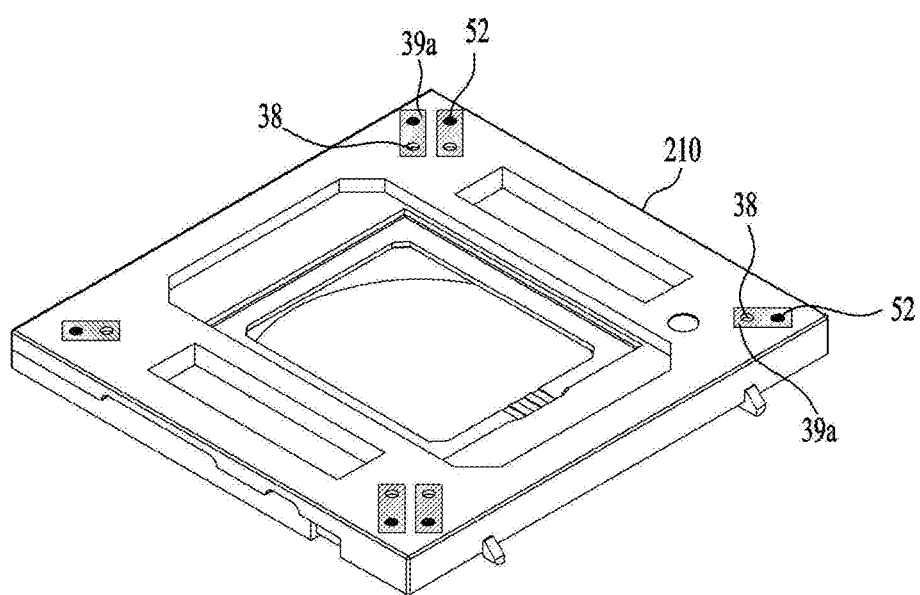
FIG. 17 is a bottom view of the base shown in FIG. 16A.
Figure 18A:
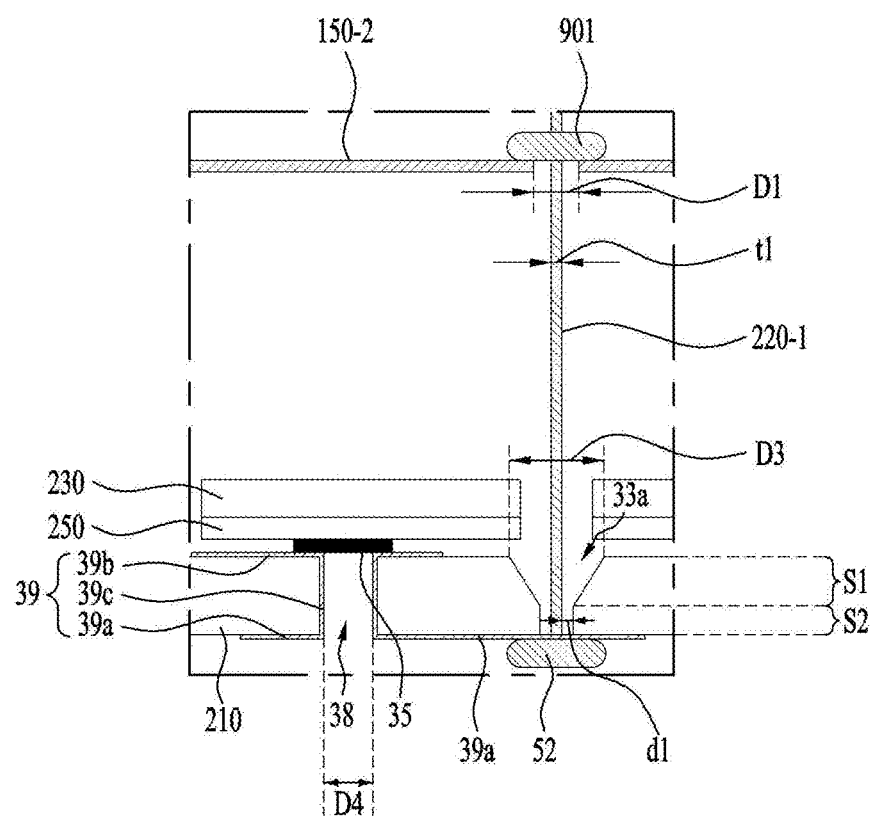
FIG. 18A is a cross-sectional view illustrating the conductive connection among the base, the second circuit board and the first support member shown in FIGS. 16A and 17.

FIG. 16A is a perspective view of the base 210 and support members 220-1 to 220-6 according to a further embodiment. FIG. 17 is a bottom view of the base 210 shown in FIG. 16A. FIG. 18A is a cross-sectional view illustrating the conductive connection among the base 210, the second circuit board 250 and the first support member 220-1 shown in FIGS. 16A and 17.

In the embodiment shown FIGS. 16A, 17 and 18A, the base 210 may have a first hole 33a and a second hole 38, which are spaced apart from each other. For example, each of the first hole 33a and the second hole 38 may be formed through the upper and lower surfaces of the base 210.

Although the second holes 38 may be disposed at the corner portions 91a to 91d of the base 210 so as to correspond to the first holes 33a, the disclosure is not limited thereto.

For example, the first holes 33a may not overlap the second circuit board 250 in the optical-axis direction or in the first direction, and the second holes 38 may overlap the second circuit board 250 in the optical-axis direction or in the first direction. In another embodiment, the second holes 38 may not overlap the second circuit board 250 in the optical-axis direction or in the first direction.

Unlike the conductive pattern 34 shown in FIGS. 14 and 15A, a conductive pattern 39 according to the embodiment shown in FIGS. 17 to 18A is not disposed on the inner surface of the first holes 33a.

For example, the conductive pattern 39 may be disposed on the upper surface of the base 210, the lower surface of the base 210 and the inner surfaces (or the inner walls) of the second holes 38. The support members 220 and the second circuit board 250 may be conductively connected to each other via the conductive pattern 39.

For example, the conductive pattern 39 may include a first conductive pattern 39b, the second conductive pattern 39a and a third conductive pattern 39c.

The first conductive pattern 39b may be disposed on the upper surface of the base 210 around the second hole 38.

The second conductive pattern 39a may be disposed on the lower surface of the base 210 around the second hole 38, and may be coupled to the second end of the support member 220, which extends through the first hole 33a, using a conductive adhesive member 52 such as solder.

The third conductive pattern 39c may be disposed on the inner surface (or the inner wall) of the second hole 38 so as to connect the first conductive pattern 39b to the second conductive pattern 29a.

The first conductive pattern 39b may be coupled to the pad 35 of the second circuit board 250 using a conductive adhesive member such as solder.

Each of the pads 35 of the second circuit board 250 may be coupled to a corresponding one of the first conductive patterns 39b provided on the upper surface of the base 210.

The size of the first hole 33a in the base may be larger at the upper portion thereof than at the lower portion thereof.

The first hole 33a in the base 210 may include a portion that increases in diameter moving toward the upper surface from the lower surface of the base 210.

For example, the first hole 33a in the base 210 may include an upper zone S1 abutting the upper surface of the base 210 and a lower zone S2 positioned between the upper zone S1 and the lower surface of the base 210.

The diameter D3 of the upper zone S1 of the first hole 33a in the base 210 may be increased moving toward the upper surface from the lower surface of the base 210.

The lower zone S2 of the first hole 33a in the base 210 may be constant, and may be the same as the diameter or the minimal diameter of the lower end of the upper zone S1 of the first hole 33a in the base 210.

In order to absorb or buffer vibrations or movement of the support members 220, the first hole 33a in the base 210 may be filled with a damper (not shown).

The diameter t1 of the support members, the diameter D1 of the hole 52 and the distance d1 may be the same as those explained in FIG. 15A.

The diameter D4 of the second hole 38 in the base 210 may be within the range of 0.1 mm
1 mm. For example, D4 may be within the range of 0.25 mm-0.6 mm.

The diameter D3 of the upper zone S1 of the first hole 33a in the base 210 is larger than the diameter D2 of the first hole 33 of FIG. 15A. The reason for this is to inhibit contact between the support members and the base and thus to suppress deformation and disconnection of the support members when the support members 220-1 to 220-6 are moved by OIS driving. For example, the diameter D3 of the first hole 33a may be equal to or larger than 0.05 mm but smaller than 1 mm. For example, D3 may be within the range of 0.05 mm-0.5 mm.

Figure 16B:
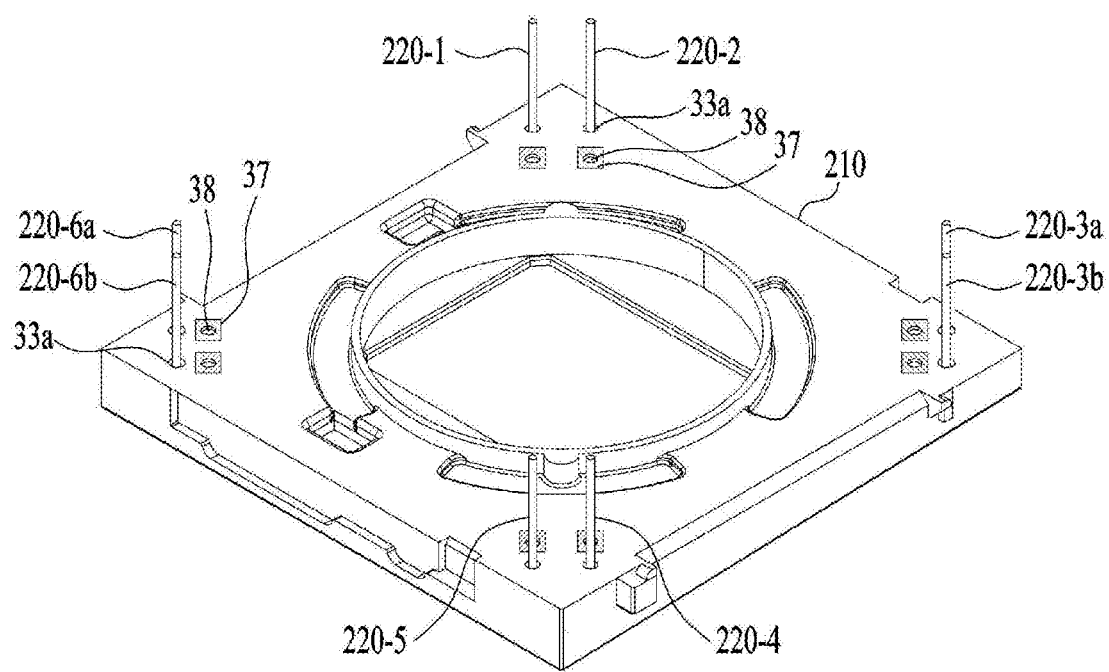
FIG. 16B is a perspective view of the base and support members according to a further embodiment.

FIG. 16B is a perspective view of the base 210 and support members 220-1, 220-2, 220-3a, 220-3b, 220-4, 220-5, 220-6a and 220-6b according to a further embodiment.

In the embodiment shown in FIG. 16B, two support members 220-1 and 220-2, 220-3a and 220-3b, 220-4 and 220-5, and 220-6a and 220-6b may be disposed on each of the corner portions of the housing 140, and each of the two support members 220-1 and 220-2, 220-3a and 220-3b, 220-4 and 220-5, and 220-6a and 220-6b may extends through a corresponding one of the corner portions 91a to 91d of the base 210.

The description of the first holes 33a, the second holes 38, the first conductive pattern 39b, the second conductive pattern 39a and the third conductive pattern 39c may also be applied to those shown in FIG. 16A.

Figure 18B:
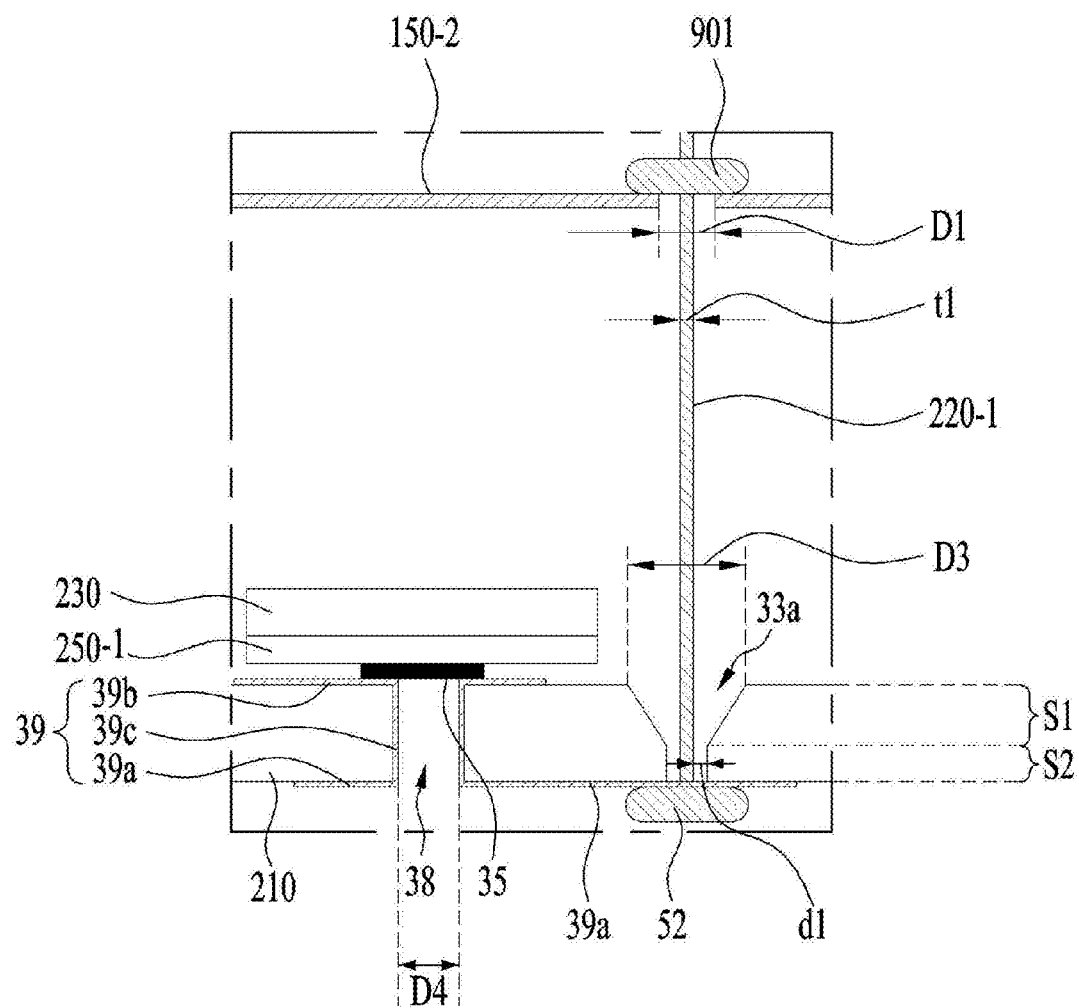
FIG. 18B illustrates a modification of FIG. 18A.

FIG. 18B illustrates a modification of FIG. 18A. As specifically described in FIG. 15B, chamfered escape grooves may be formed in the corner portions of the circuit board 250-1 shown in FIG. 18B.

Figure 19:
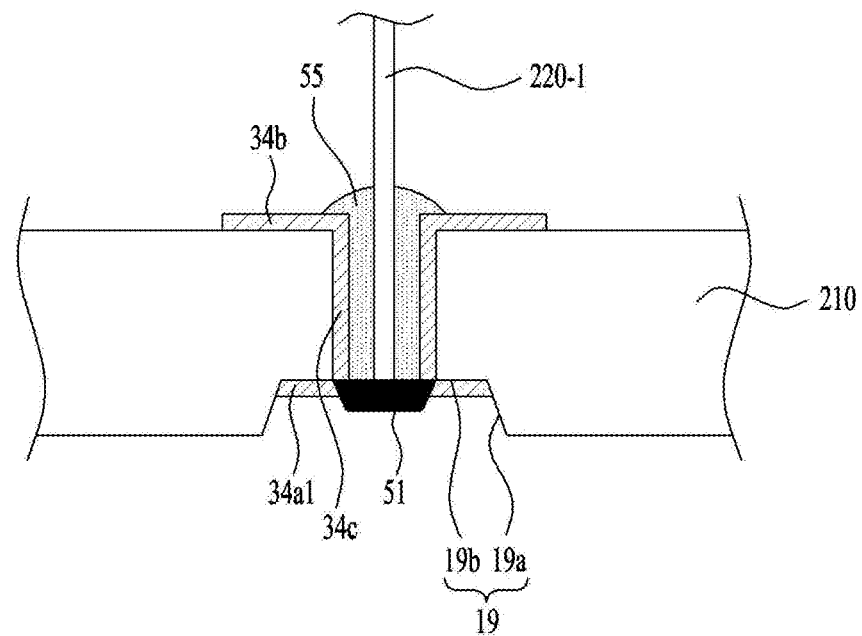
FIG. 19 illustrates a modification of the base and the conductive pattern shown in FIG. 15A.

FIG. 19 illustrates a modification of the base 210 and the conductive pattern 34 shown in FIG. 15A.

Referring to FIG. 19, the base 210 may have grooves 19 formed in the lower surface of the base 210 around the first holes 33. For example, the base 210 may have the grooves 19 communicating with the lower portion of the first holes 33. A portion of the conductive pattern 34 may be disposed in the groove 19.

Each of the grooves 19 may be depressed from the lower surface of the base 210. The groove 19 may include a side wall 19a abutting the lower surface of the base 210 and an upper surface 19b positioned between the side wall 19a and the first hole 33.

The conductive pattern 34 may include a first conductive pattern 34b disposed on the upper surface of the base 210 around the first hole 2033, a second conductive pattern 34a1 disposed in the groove 19 and a third conductive pattern 34c disposed on the inner surface (or the inner wall) of the first hole 2033 so as to connect the first conductive pattern 34b to the second conductive pattern 34a1.

The solder 51 may be disposed on the second conductive pattern 34a1 disposed in the groove 19, and the lower end of the solder 51 may be positioned above the lower surface of the base 210.

Specifically, since the solder 51 does not project downwards from the lower surface of the base 210, it is possible to inhibit a conductive short between the solder and other components, for example, a circuit board of a camera module or devices mounted on the circuit board, when the lens moving apparatus 100 is mounted on the camera module.

In order to absorb or buffer vibrations or movement of the support members 220, the first hole 33 in the base 210 may be filled with a damping member or a damper 55. Although the damper 55 projects outwards from the first hole 33 and is also disposed on the upper surface of the first conductive pattern 34b, the disclosure is not limited thereto.

In the embodiment, since the second ends of the support members 220 are coupled to the lower surface of the base 210 via the conductive adhesive members 51, 52 such as solder and the second ends of the support member 220 are conductively connected to the second circuit board 250 via the conductive pattern 34, 39, it is possible to increase the length of the support member 220 mounted on the lens moving apparatus 100 and thus to decrease the intensity of current flowing through the support members 220, thereby reducing power consumption, and it is possible to inhibit deterioration of reliability in OIS driving attributable to a decrease in the diameter of the OIS wires (for example, 220-1 to 220-6).

Figure 20:
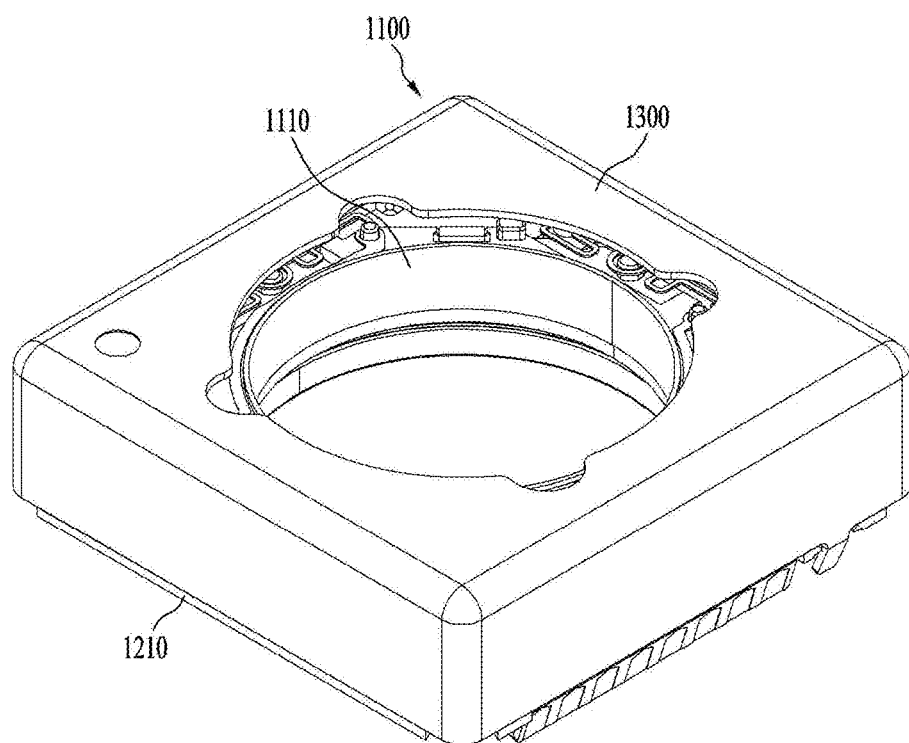
FIG. 20 is a perspective view of a lens moving apparatus according to an embodiment.
Figure 21:
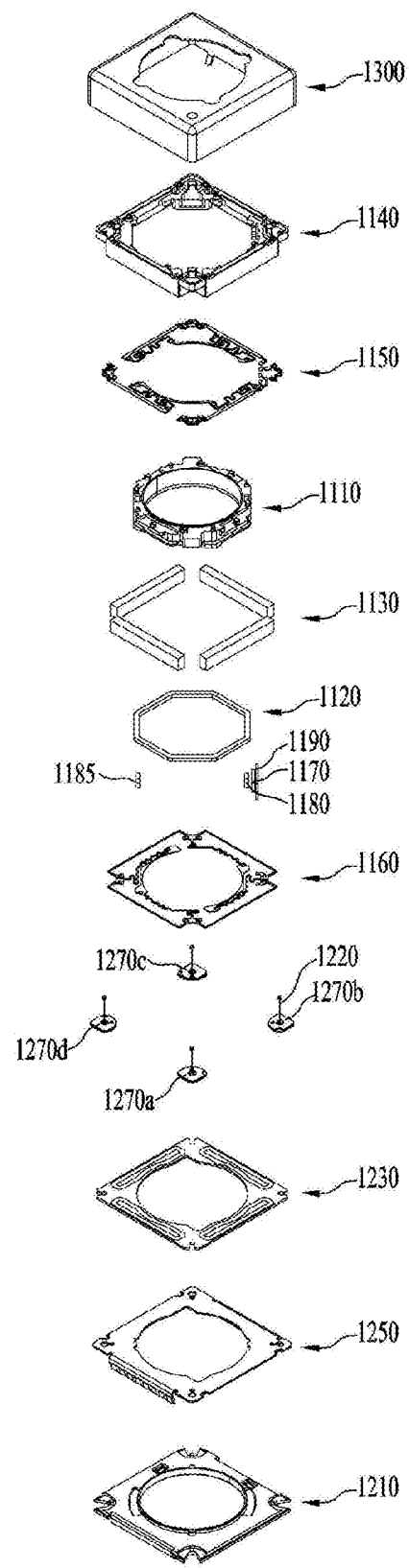
FIG. 21 is an exploded view of the lens moving apparatus shown in FIG. 20.
Figure 22:
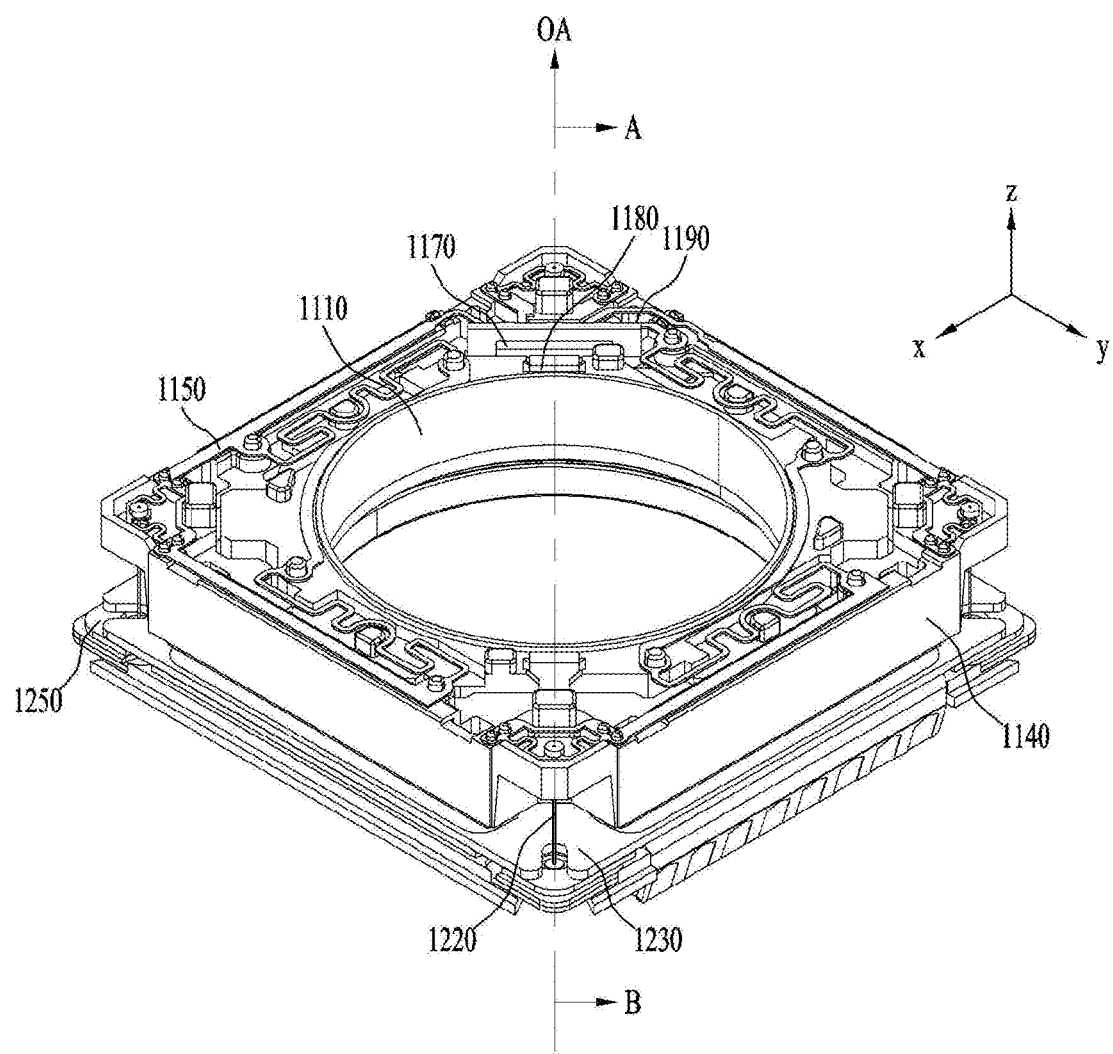
FIG. 22 is an assembled perspective view of the lens moving apparatus shown in FIG. 20, from which a cover member is removed.

FIG. 20 is a perspective view of a lens moving apparatus 1100 according to an embodiment. FIG. 21 is an exploded view of the lens moving apparatus 1100 shown in FIG. 20. FIG. 22 is an assembled perspective view of the lens moving apparatus 1100 shown in FIG. 20, from which a cover member 1300 is removed.

Referring to FIGS. 20 to 22, the lens moving apparatus 1100 includes a bobbin 1110, a first coil 1120, first magnets 1130, a housing 1140, an upper elastic member 1150, support members 1220, a circuit board 1250, a base 1210 and terminal portions 1270a to 1270d.

The lens moving apparatus 1100 may further include a circuit board 1190 and a first position sensor 1170 for AF feedback driving, and may additionally include a second magnet 1180 and a third magnet 1185.

The lens moving apparatus 1100 may further include a second coil 1230 for optical image stabilizer (OIS) driving, and may additionally include a second position sensor 1240 for OIS feedback driving.

The lens moving apparatus 1100 may further include a lower elastic member 1160 and a cover member 1300. The lens moving apparatus 1100 may further include a yoke (not shown), which is coupled to the housing 1140 in order to increase the electromagnetic force between the first coil 1120 and the first magnet 1130.

The cover member 1300 will be described.

The cover member 1300 accommodates the components 1110, 1120, 1130, 1140, 1150, 1160, 1170, 1190, 1220, 1230, 1250 and 1270a to 1270d in the space defined between the cover member 1300 and the base 1210.

The description of the cover member 300 shown in FIG. 1 may be applied to the cover member 1300.

Next, the bobbin 1110 will be described.

The bobbin 1110 may be provided with a lens or a lens barrel mounted therein, and may be disposed in the housing 1140. The bobbin 1110 may be configured to have an opening for mounting a lens or a lens barrel. Although the opening may have a circular shape, an elliptical shape or a polygonal shape, the disclosure is not limited thereto.

Figure 23A:
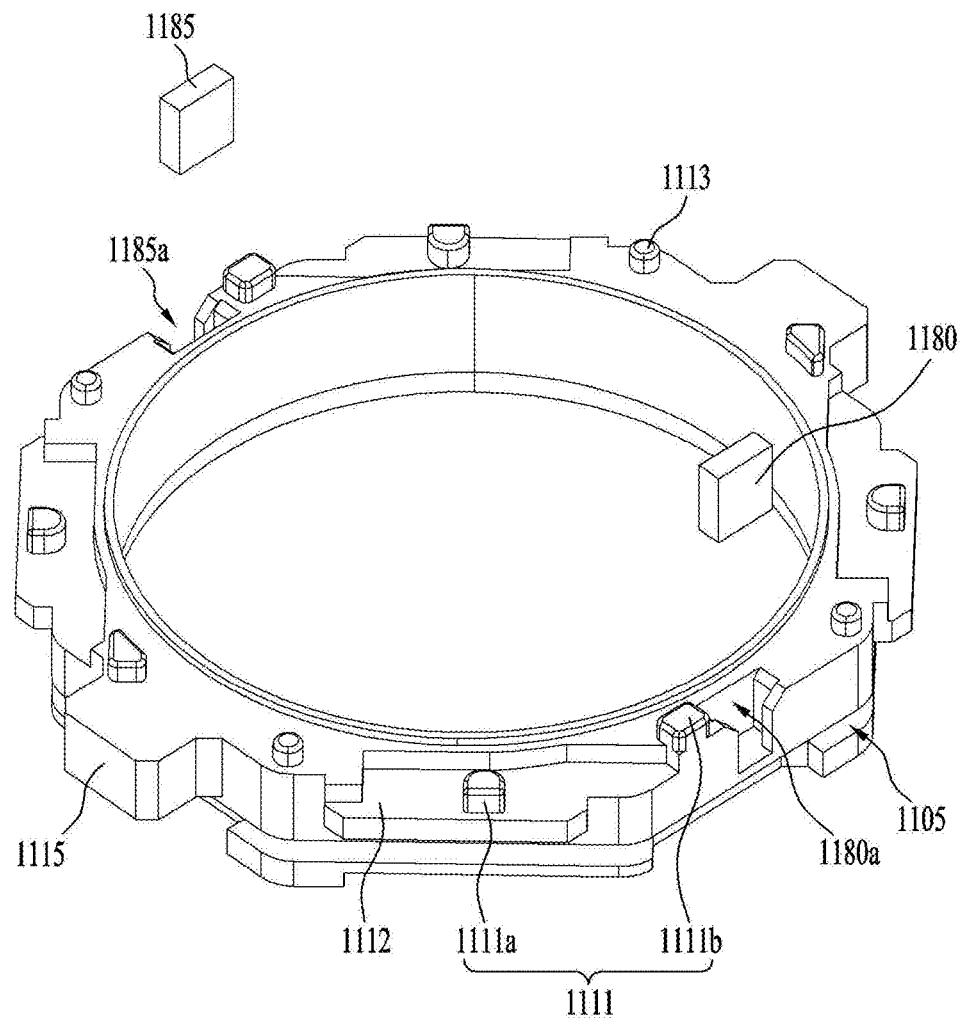
FIG. 23A is a perspective view of the bobbin shown in FIG. 21.

FIG. 23A is a perspective view of the bobbin 1110 shown in FIG. 21. FIG. 23B is a bottom perspective view of the bobbin 1110 and the first coil 1120.

Referring to FIGS. 23A and 23B, the bobbin 1110 may include first projections 111, which project from the upper surface thereof in the optical-axis direction or in the first direction, and second projections 1112, which project from the outer surface 1110b of the bobbin 1110 in a direction perpendicular to the optical-axis direction or in the second and/or third direction.

The bobbin 1110 may include first side portions 1110b-1 and second side portions 1110b-2.

The first side portions 1110b-1 of the bobbin 1110 may correspond to or face the first magnets 1130. Each of the second side portions 1110b-2 of the bobbin 1110 may be disposed between two adjacent first side portions.

Each of the first projections 1111 of the bobbin 1110 may include a guide portion 1111a and a first stopper 1111b. The guide portion 1111a of the bobbin 1110 may serve to guide positioning of a first frame connector 1153 of the upper elastic member 1150, or may serve to support a damper positioned between the first frame connector 1153 and the bobbin 1110.

The second projections 1112 of the bobbin 1110 may project from the outer surface of the first side portions 1110b-1 of the bobbin 1110 in a direction perpendicular to the optical axis or in the second and/or third direction.

The first stoppers 1111b and the second projections 1112 of the bobbin 1110 may inhibit the upper and/or side surfaces of the bobbin 1110 from directly colliding with the inner surface of the cover member 1300 even though the bobbin 1110 is moved beyond a specified range due to external impact or the like when the bobbin 1110 is moved in the first direction in order to perform an autofocus function.

The bobbin 1110 may include third projections 1115, which project from the outer surfaces of the second side portions 1110b-2 in a direction perpendicular to the optical axis OA. For example, the bobbin 1110 may include two third projections 1115, which are provided at two second side portions 1110b-2 that face each other.

The third projections 1115 of the bobbin 1110 may correspond to grooves 1025a in the housing 1140 and may be fitted or disposed in the grooves 1025a in the housing so as to inhibit the bobbin 1110 from rotating beyond a predetermined range about the optical axis.

The bobbin 1110 may include a second stopper (not shown), which projects from the lower surface thereof. The second stopper of the bobbin may inhibit the lower surface of the bobbin 1110 from directly colliding with the base 1210, the second coil 1230 or the circuit board 1250 even though the bobbin 1110 is moved beyond a specified range due to external impact when the bobbin 1110 is moved in the first direction in order to perform an autofocus function.

The bobbin 1110 may include at least one first coil groove 1105 formed in the outer surface 1110b in which the first coil 1120 is disposed or mounted. For example, although the first coil groove 1105 may be formed in the first side portions 1110b-1 and the second side portions 1110b-2 of the bobbin 1110, the disclosure is not limited thereto.

The shape and number of first coil groove 1105 may correspond to The shape and number of first coil 1120 disposed on the outer surface 1110b of the bobbin 1110. For example, although the coil groove 1105 formed in the first side portions 1110b-1 and the second side portions 1110b-2 of the bobbin 1110 may have a ring shape, the disclosure is not limited thereto.

In another embodiment, the bobbin 1110 may not include the first coil groove, and the first coil 1120 may be directly wound around the outer surface 1110b of the bobbin 1110 and may be secured thereto.

The bobbin 1110 may include a mounting groove 1180a, in which the second magnet 1180 is mounted, fitted, secured or disposed, and a mounting groove 1185a, in which the third magnet 1185 is mounted, fitted, secured or disposed.

The mounting grooves 1180a and 1185a may be formed in two of the first side portions 1110b-1 of the bobbin 1110.

For example, the mounting grooves 1180a and 1185a may be disposed so as to face each other.

A line that connects the center of the mounting groove 1185a to the center of the mounting groove 1180a may extend through the center of the bobbin 1110. The reason for this is to dispose or arrange the second magnet 1180 and the third magnet 1185 in a balanced state with respect to the first position sensor 1170, thereby accurately performing autofocus (AF) driving.

Although the mounting groove 1180a and 1185a may be positioned above the first coil groove 1105, the disclosure is not limited thereto.

Furthermore, the bobbin 1110 may be provided on the upper surface thereof with first couplers 1113, which are fitted into holes 1151a in first inner frames 1151.

Although each of the first couplers 1113 of the bobbin 1110 has the shape of a protrusion in FIG. 13, the disclosure is not limited thereto, and the first coupler may have a groove shape or a flat surface shape.

The bobbin 1110 may include second couplers 1117, which are coupled and secured to holes 1161a in the lower elastic member 1160. Although each of the second couplers 1117 of the bobbin 1110 may have a flat surface shape, the disclosure is not limited thereto, and the second coupler may have the shape of a groove or a protrusion.

Although the inner surface of the bobbin 1110 is not provided with a treaded portion for coupling with a lens or a lens barrel in FIG. 13, the disclosure is not limited thereto. In another embodiment, the threaded line for coupling with a lens or a lens barrel may be formed in the inner surface of the bobbin 1110.

Next, the first coil 1120 will be described.

The first coil 1120 may be a drive coil, which is disposed on the outer surface 1110b of the bobbin 1110 so as to electromagnetically interact with the first magnets 1130 disposed on the housing 1140.

In order to create electromagnetic force resulting from the interaction with first magnets 1130, a drive signal (for example, drive current or voltage) may be applied to the first coil 1120.

The drive signal applied to the first coil 1120 may be a DC signal or an AC signal. For example, the drive signal may be a current or voltage type. Here, the AC signal may be a sinusoidal wave or a pulse signal (for example, a pulse width modulation (PWM) signal).

In another embodiment, the drive signal applied to the first coil 1120 may include an AC signal and a DC signal.

The AF movable unit may be moved in the first direction by the electromagnetic force resulting from the interaction between the first coil 1120 and the magnets 1130. For example, the AF movable unit may be moved from the initial position of the AF movable unit only in an upward direction (for example, in the +z-axis direction) (referred to as "unidirectional AF driving") or may be moved from the initial position of the AF movable unit in an upward direction (in the +z-axis direction) and in a downward direction (in the −z-axis direction) (referred to as "bidirectional AF driving") due to the electromagnetic force resulting from the interaction between the first coil 1120 and the magnets 1130.

By controlling the intensity and/or polarity (for example, the direction in which current flows) of a drive signal applied to the first coil 1120 and thus controlling the intensity and/or direction of the electromagnetic force resulting from the interaction between the first coil 1120 and the magnets 1130, it is possible to control the movement of the AF movable unit in the first direction and thus to perform an autofocus function.

The AF movable unit may include the bobbin 1110, which is elastically supported by the upper elastic member 1150 and the lower elastic member 1160, and the associated components, which are mounted on the bobbin 1110 and are moved together with the bobbin 1110. For example, the AF movable unit may include the bobbin 1110 and the first coil 1120. The AF movable unit may further include the second magnet 1180 and the third magnet 1185. The AF movable unit may further include a lens (not shown) mounted on the bobbin 1110.

The first coil 1120 may be disposed on the bobbin 1110 so as to have a closed-loop shape. For example, the first coil 1120 may be wound or disposed around the outer surface 1110b of the bobbin 1110 so as to be wound in a clockwise or counterclockwise direction about the optical axis. In another embodiment, the first coil 1120 may be embodied as a coil ring, which is wound in a clockwise or counterclockwise direction about an axis perpendicular to the optical axis OA. Although the number of coil ring may be the same as the number of first magnets 1130, the disclosure is not limited thereto.

The first coil 1120 may be conductively connected to at least one of the upper elastic member 1150 and the lower elastic member 1160, and may be conductively connected to the circuit board 1250 via the upper elastic member 1150, the lower elastic member 1160 and the support member 1220.

For example, the first coil 1120 may be connected to the second inner frames 1161 of the first and second lower springs 1160-1 and 1160-2 via a conductive adhesive member such as solder.

Although the second magnet 1180 and the third magnet 1185, which are disposed on the bobbin 1110, may be spaced apart from the first coil 1120 disposed on the bobbin 1110 in a direction perpendicular to the optical axis OA, the disclosure is not limited thereto. In another embodiment, each of the second magnet 1180 and the third magnet 1185, which are disposed on the bobbin 1110, may be brought into contact with the first coil 1120.

Next, the housing 1140 will be described.

The housing 1140 accommodates therein the bobbin 1110, on which the first coil 1120 is mounted or disposed.

Figure 24A:
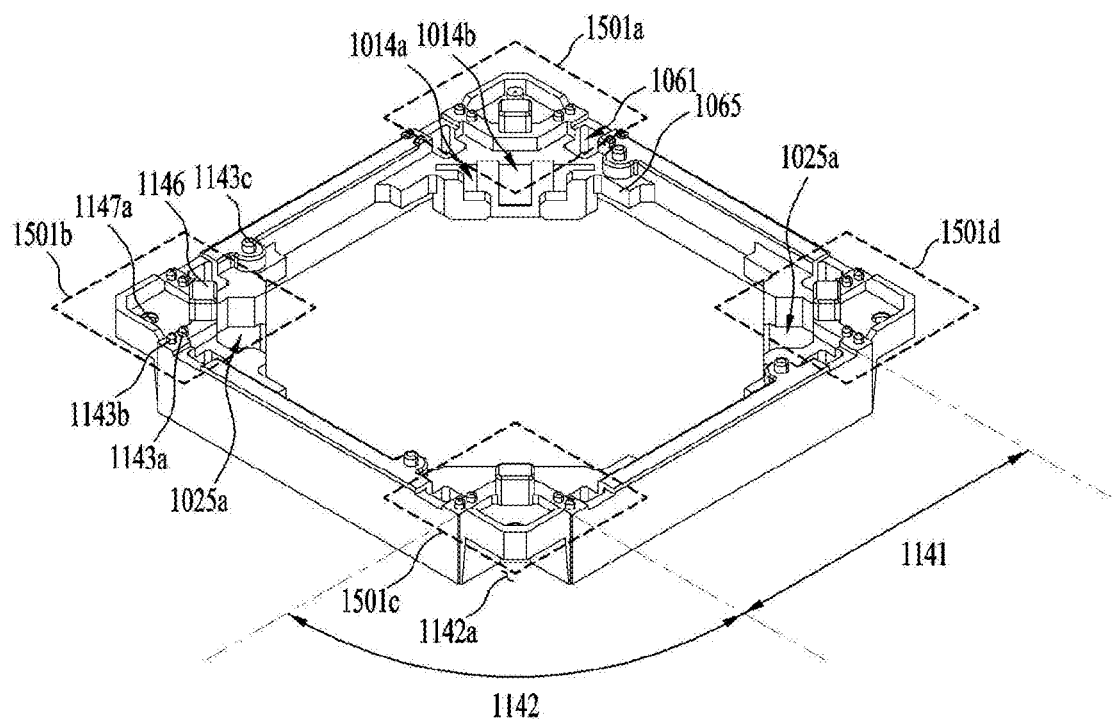
FIG. 24A is a first perspective view of the housing shown in FIG. 21.
Figure 24B:
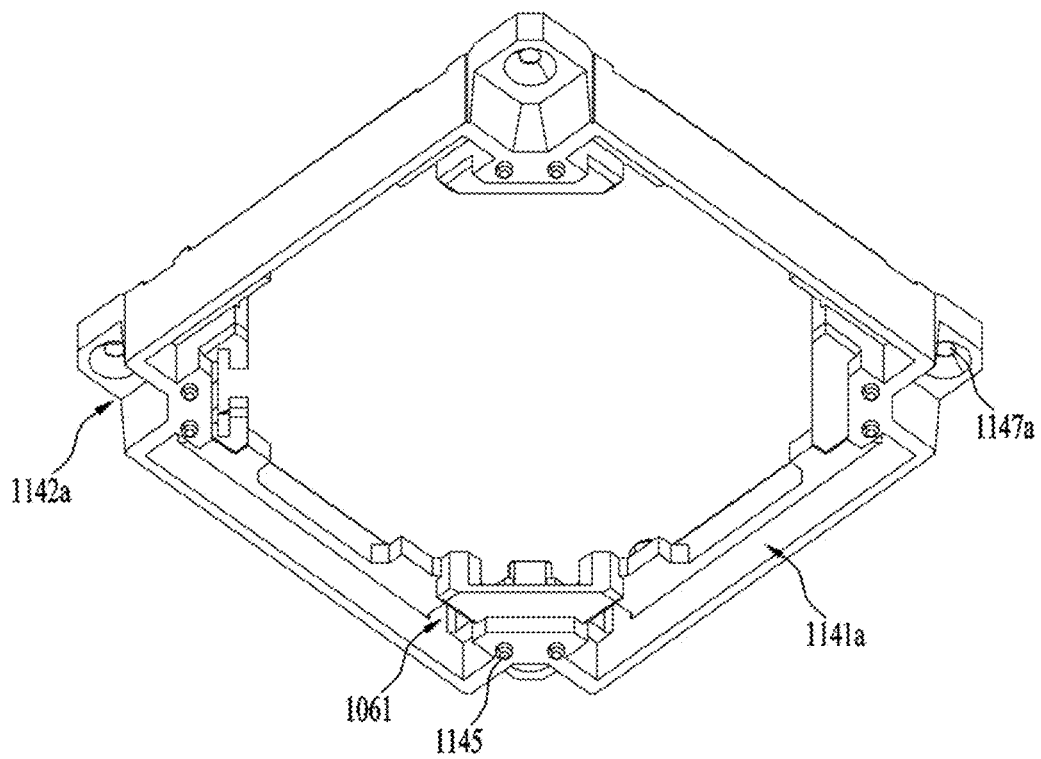
FIG. 24B is a second perspective view of the housing shown in FIG. 21.
Figure 26:
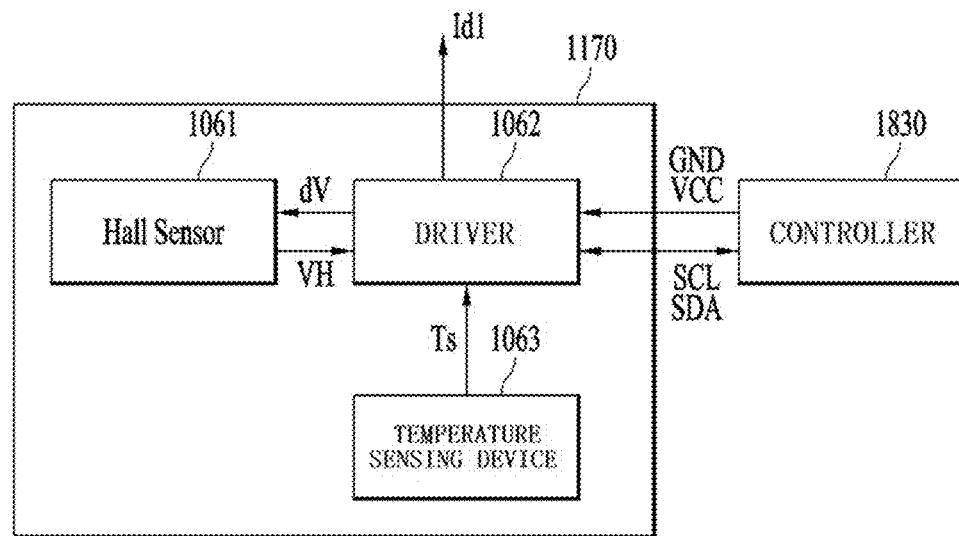
FIG. 26 is a view illustrating the first position sensor shown in FIG. 25A.
Figure 27:
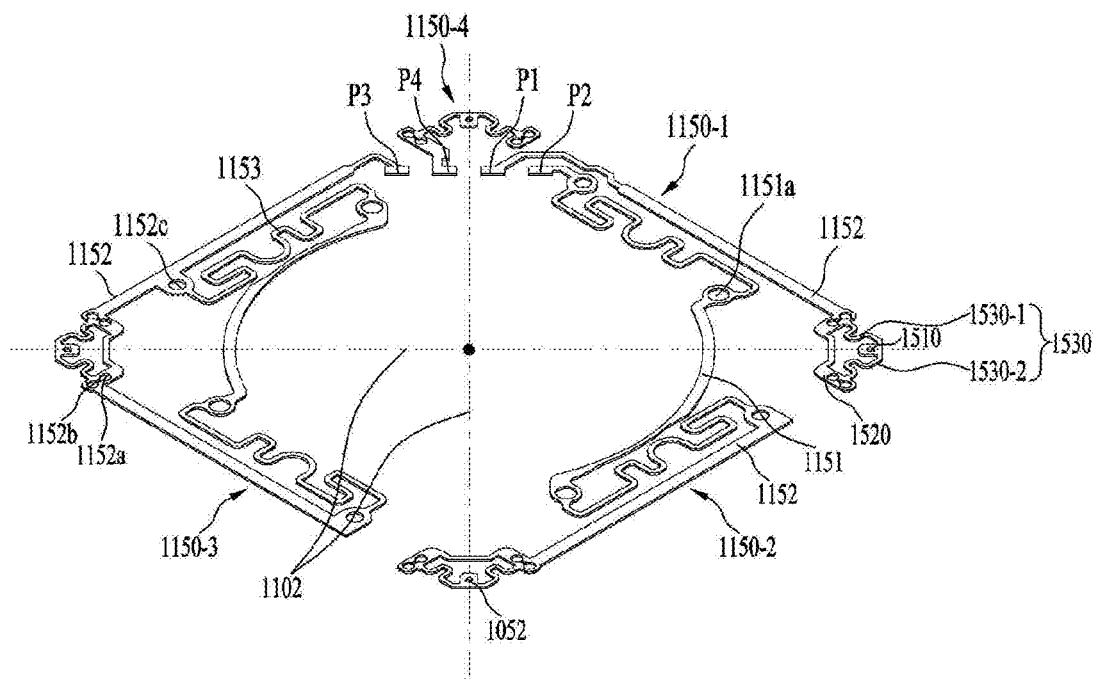
FIG. 27 is a perspective view of the upper elastic member shown in FIG. 21.
Figure 28:
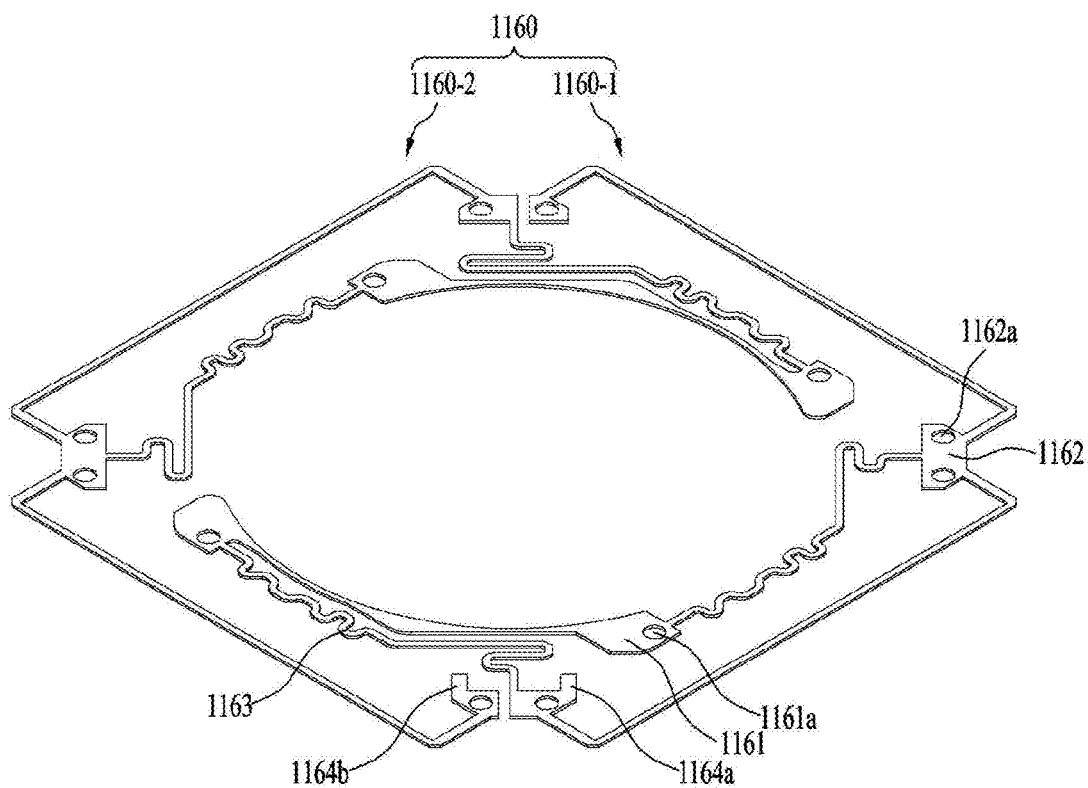
FIG. 28 is a perspective view of the lower elastic member shown in FIG. 21.
Figure 29:
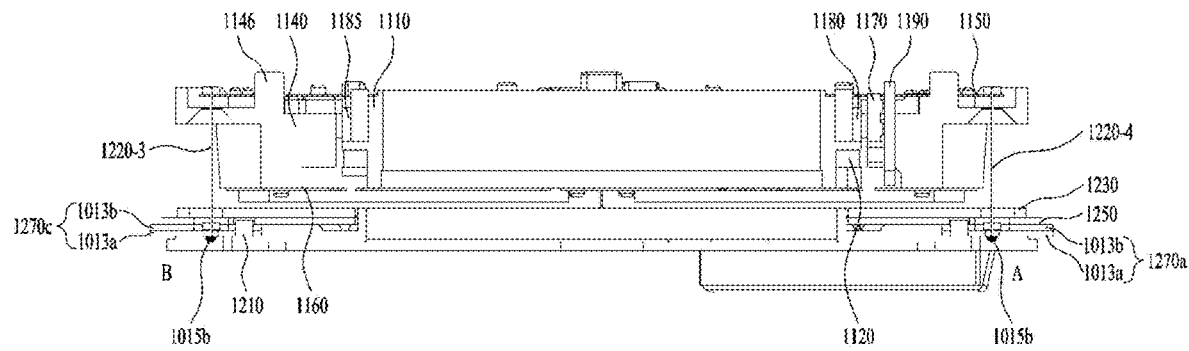
FIG. 29 is a cross-sectional view of the lens moving apparatus taken along line A-B in FIG. 22.
Figure 30:
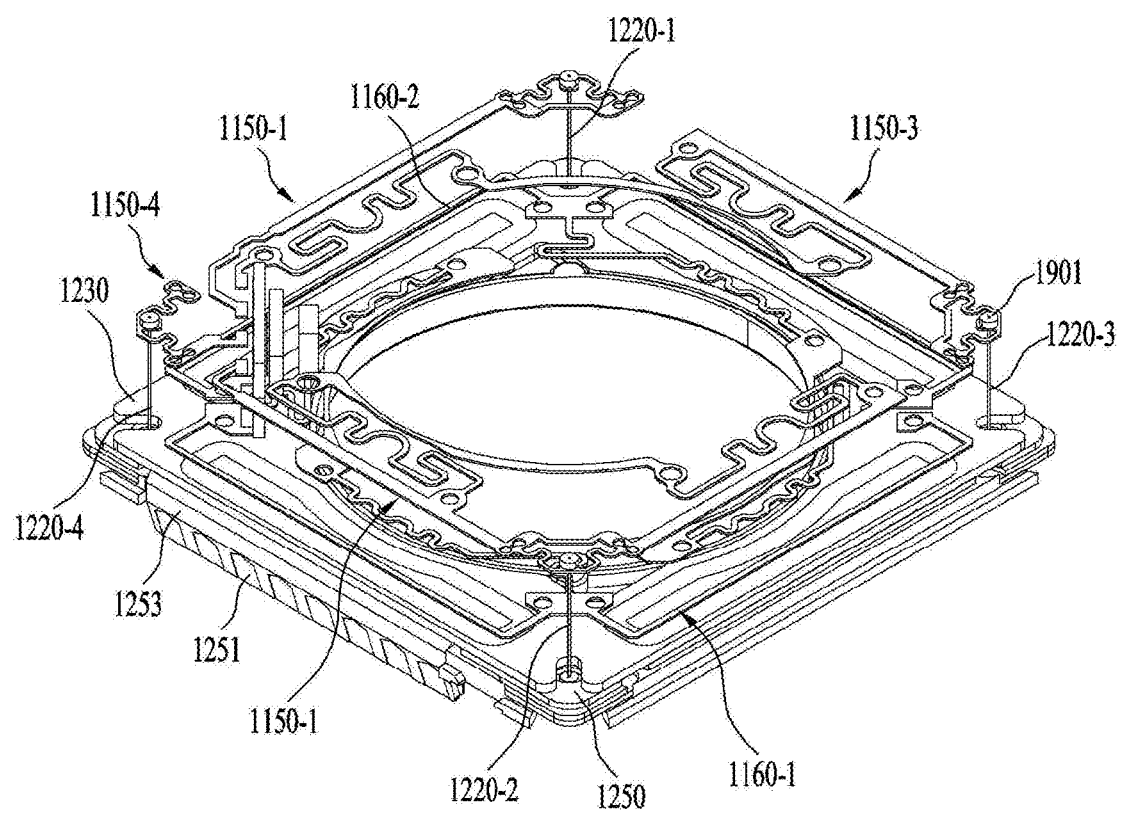
FIG. 30 is a perspective view of the upper elastic member, the lower elastic member, the first position sensor, the circuit board, the second coil, and the base, which are shown in FIG. 21.

FIG. 24A is a first perspective view of the housing 1140 shown in FIG. 21. FIG. 24B is a second perspective view of the housing 1140 shown in FIG. 21. FIG. 25A is a perspective view of the housing 1140, the first position sensor 1170, the circuit board 1190 and the first magnets 1130, which are shown in FIG. 21. FIG. 25B is a perspective view of the housing 1140 and the circuit board 1190, which are shown in FIG. 21. FIG. 26 is a view illustrating the first position sensor 1170 shown in FIG. 25A. FIG. 27 is a perspective view of the upper elastic member 1150 shown in FIG. 21. FIG. 28 is a perspective view of the lower elastic member 1160 shown in FIG. 21. FIG. 29 is a cross-sectional view of the lens moving apparatus 1100 taken along line A-B in FIG. 22. FIG. 30 is a perspective view of the upper elastic member 1150, the lower elastic member 1160, the first position sensor 1170, the circuit board 1190, the second coil 1230, the circuit board 1250 and the base 1210, which are shown in FIG. 21.

Referring to FIGS. 24A and 24B, the housing 1140 may have the overall shape of a cylinder having an opening therein, and may include a plurality of first side portions 1141 and a plurality of second side portions 142, which define the opening.

For example, the housing 1140 may include the first side portions 1141, which are spaced apart from each other, and the second side portions 1142, which are spaced apart from each other. Each of the first side portions 1141 may be disposed or positioned between two adjacent second side portions 1142 so as to connect the two second side portions 1142 to each other.

Since the second side portions 1142 of the housing 1140 correspond to the corner regions of the housing 1140, the second side portions 1142 of the housing 1140 may be referred to "corner portions".

In the embodiment shown in FIG. 24A, the first side portions 1141 of the housing 1140 may include a first side portion, a second side portion, a third side member and a fourth side member, and the corner portions of the housing 1140 may include a first corner portion 1501a, a second corner portion 1501b, a third corner portion 1501c and a fourth corner portion 1501d.

Although the first side portions 1141 of the housing 1140 may correspond to the first side portions 1110b-1 of the bobbin 1110 and the second side portions 1142 of the housing 1140 may correspond to the second side portions 1110b-2 of the bobbin 1110, the disclosure is not limited thereto.

The first magnets 1130; 1130-1 to 1130-4 may be disposed or mounted on the first side portions 1141 of the housing 1140, and the support members 1220; 1220-1 to 1220-4 may be disposed on the second side portions 1141 or the corner portions 1501a to 1501d of the housing 1140.

The housing 1140 may include mounts 1141a, which are provided on the inner surfaces of the first side portions 1141 so as to support or receive the first magnets 1130-1 to 1130-4.

The first side portions 1141 of the housing 1140 may be provided with grooves or holes 1061, into which an adhesive for attaching the first magnets 1130 to the mounts 1141a of the housing 1140 is introduced. For example, the holes 1061 may be through holes.

The side members 1141 of the housing 1140 may be disposed parallel to the side plates of the cover member 1300. The second side portions 1142 of the housing 1140 may have holes 1147a, through which the support members 1220 extend.

For example, although the hole 1147a may be configured to increase in diameter moving toward the lower surface from the upper surface of the housing 1140 in order to facilitate the application of a damper, the disclosure is not limited thereto. In another embodiment, the diameter of the hole 1147a may be constant.

In order to inhibit the housing 1140 from directly colliding with the inner surface of the cover member 1300, the upper surface of the housing 1140 may be provided with second stopper 1146. For example, although the second stoppers 1146 may be respectively disposed on the corners of the first to fourth corner portions 1501a to 1501d of the housing 1140, the disclosure is not limited thereto.

When the upper elastic member 1150 is disposed on the upper surface of the housing 1140, the housing 1140 may include stoppers 1146 on the upper surface thereof in order to inhibit the housing 1140 from directly colliding with the inner surface of the cover member 1300.

The stoppers 1146 may be disposed on the corner portions 1501a to 1501d of the housing 1140. For example, the stoppers may face each other in a diagonal direction. Here, the diagonal direction may be a direction which is directed toward the corner portion from the center of the housing 1140.

The housing may include one or more protrusions 1143a, 1143b and 1143c, which are disposed on each of the upper surfaces of the first side portions 1141 and/or the second side portions 1142 for coupling with holes 1152a and 1152b in first outer frames 1152 of the upper elastic member 1150.

The protrusions 1143a and 1143b of the housing 1140 may be disposed on at least one of both sides of the stopper 1146 of the housing 1140. The protrusion 1143c of the housing 1140 may be disposed on the upper surface of the first side portion of the housing 1140.

Furthermore, the housing 1140 may include one or more protrusions 1145, which are provided on the lower surfaces of the second side portions 1142, for coupling and securing to holes 1162a in second outer frames 1162 of the lower elastic member 1160. For example, although the protrusions 1145 of the housing 1140 may be disposed on one or more lower surfaces of the first to fourth corner portions 1501a to 1501d of the housing 1140, the disclosure is not limited thereto.

In order not only to ensure paths, through which the support members 1220 extend, but also to ensure spaces, in which silicone capable of performing a damping function is charged, the housing 1140 may have recesses 1142a formed in lower portions of the second side portions 1142 or the corner portions 1501a to 1501d. For example, the recesses 1142a in the housing 1140 may be filled with damping silicone.

In order to inhibit the bottom surface of the housing 1140 from colliding with the base 1210, the second coil 1230 and/or the circuit board 1250, which will be described later, the housing 1140 may further include a lower stopper (not shown) projecting from the lower surface of the housing 1140.

The housing 1140 may have therein a first groove 1014a for receiving the circuit board 1190 and a second groove 1014b for receiving the first position sensor 1170.

The first groove 1014a may be formed in the upper portion or the inner surface of one of the second side portions 1142 of the housing 1140. To facilitate mounting of the circuit board 1190, the first groove 1014a may have a groove shape, which is open at the upper surface and has side surfaces and a bottom, and the side surfaces of the first groove 1014a may be configured to correspond to or coincide with the shape of the circuit board 1190.

The second groove 1014b may be formed in the inner surface of one of the second side portions 1142, and may have an opening, which is open toward the inside of the housing 1140.

For example, although the second groove 1014b may be configured to be depressed from the side surface of the first groove 1014a, the disclosure is not limited thereto.

For the purpose of easy mounting of the first position sensor 1170, the second groove 1014b may have an opening, which is open at the upper and side surfaces thereof. The second groove 1014b may be configured to have a shape that corresponds to or coincides with the shape of the first position sensor 1170.

Although each of the first magnets 1130 and the circuit board 1190 may be secured to a corresponding one of the mounts 1141a of the housing 1140 and the second groove 1014b using an adhesive, the disclosure is not limited thereto, and they may be secured using an adhesive member such as a double-sided adhesive tape.

The housing 1140 may have grooves 1025a, which are formed in the inner sides of the second side portions 1141 or the corner portions 1501a to 1501d so as to correspond to the projections 1115 of the bobbin 1110.

For example, the grooves 1025a in the housing 1140 may be respectively formed in the inner surfaces of two corner portions 1501b and 1501d that face each other among the corner portions 1501a to 1501d. The grooves 1025a in the housing 1140 may be formed in corner portions other than the corner in which the grooves 1014a and 1014b in the housing 1140 are formed.

Next, the first magnets 1130 will be described.

When the bobbin 1110 is in the initial position, the first magnets 1130 may be disposed on the first side portions 1141 of the housing 1140 so as to overlap the first coil 1120 at at least a portion thereof in a direction perpendicular to the optical axis OA or in the second or third direction. For example, the first magnets 1130 may be fitted or disposed in the mounts 1141a of the housing 1140.

Here, the description of the initial position of the bobbin 110 shown in FIG. 2 may be applied to the initial position of the bobbin 1110.

In another embodiment, the first magnets 1130 may be disposed on the outer surfaces of the first side portions 1141 of the housing 1140. In a further embodiment, the first magnets 1130 may also be disposed both on the inner surfaces and on the outer surfaces of the second side portions 1142.

Although the shape of each of the first magnets 1130 may be a rectangular shape corresponding to the first side portion 1141 of the housing 1140, the disclosure is not limited thereto. The surface of the first magnet 1130 that faces the first coil 1120 may have a curvature that corresponds to or coincides with the curvature of the corresponding surface of the first coil 1120.

Although each of the first magnets 1130 may be a monopole-magnetized magnet which is constructed such that a first surface thereof that faces the first coil 1120 is an N pole and the opposite second surface thereof is an S pole or a bipole-magnetized magnet, the disclosure is not limited thereto, and the reverse disposition is also possible.

In another embodiment, each of the first and second surfaces of each of the first magnets 1130 may be divided into an N pole and an S pole.

For example, each of the first magnets 1130 may be a bipole-magnetized magnet, which is divided into two poles in a direction perpendicular to the optical axis. Here, the first magnets 1130 may be embodied by ferrite magnets, alnico magnets, rare-earth magnets or the like.

For example, each of the first magnets 1130 may include a first magnet portion, a second magnet portion and a non-magnetic partition wall. The first and second magnet portions may be spaced apart from each other, and the non-magnetic partition wall may be positioned between the first and second magnet portions.

The non-magnetic partition wall is a portion that has almost no magnetic property and which may include a zone having almost no polarity. The non-magnetic partition wall may be filled with air or a non-magnetic material.

Although the number of first magnets 1130 is four in the embodiment, the disclosure is not limited thereto, and the number of first magnets 1130 may be at least two. Although a first surface of the first magnet 1130, which faces the first coil 1120, may be a flat surface, the disclosure is not limited thereto, and the first surface may be a curved surface.

At least two first magnets 1130 may be disposed on the first side portions 1141 of the housing 1140 that face each other, and may be disposed so as to face each other.

For example, the first side portions 1141 of the housing 1140 may be provided with the first magnets 1130-1 to 1130-4. Two pairs of first magnets 1130-1 to 1130-4, each pair of first magnets facing each other, may be disposed on the first side portions 1141 of the housing 1140 so as to intersect each other. Here, although the flat surface of each of the first magnets 1130-1 to 1130-4 may have an approximately rectangular shape, the shape may also be a triangular shape or a rhombic shape.

Although the first magnets 1130-1 to 1130-4 are disposed on the housing 1140 in the embodiment shown in FIG. 22, the disclosure is not limited thereto.

In another embodiment, the housing 1140 may be omitted, and the first magnets 1130-1 to 1130-4 may be disposed on the cover member 1300. In a further embodiment, the housing 1140 is not omitted, and the first magnets 1130-1 to 1130-4 may be disposed on the cover member 1300.

In another embodiment, the first magnets 1130-1 to 1130-4 may be disposed on the side plates of the cover member 1300, for example, the inner surfaces of the side plates.

Next, the second magnet 1180 and the third magnet 1185 will be described.

The second magnet 1180 may be disposed in the mounting groove 1180a in the bobbin 1110. The third magnet 1185 may be disposed in the mounting groove 1185a in the bobbin 1110.

Although a portion of a surface of the second magnet 1180 mounted in the mounting groove 1180a and a portion of a surface of the third magnet 1185 mounted in the mounting groove 1185a may be exposed from the outer surface of the bobbin 1110, the disclosure is not limited thereto. In another embodiment, the portions may not be exposed from the outer surface of the bobbin 1110.

Although each of the second magnet 1180 and the third magnet 1185 may be configured such that the boundary plane between the N pole and the S pole is parallel to a direction perpendicular to the optical axis, the disclosure is not limited thereto. In another embodiment, the boundary plane between the N pole and the S pole may be parallel to the optical axis.

By virtue of the interaction between the first coil 1120 and the first magnets 1130, the second magnet 1180 may be moved together with the bobbin 1110 in the optical-axis direction OA. The first position sensor 1170 may detect the intensity of the magnetic field of the second magnet 1180, which is moved in the optical-axis direction, and may output an output signal according to the result of the detection. For example, the controller 830 of the camera module or the controller 780 of the terminal may detect the displacement of the bobbin 1110 in the optical-axis direction of the bobbin 1110 based on the output signal output from the first position sensor 1170.

The magnetic field of the second magnet 1180 may have an influence on the interaction between the first magnet 1130 and the second coil 1230. The third magnet 1185 may serve to reduce or eliminate the influence on the interaction between the first magnet 1130 and the second coil 1230 caused by the magnetic field of the second magnet 1180.

By disposing the third magnet 1185 and the second magnet 1180 in a symmetrical state, it is possible to balance the weight of the AF movable unit and thus to perform accurate AF motion.

In another embodiment, the second magnet 1180 and the third magnet 1185 may be omitted, and the first position sensor may be mounted on the bobbin 1110 rather than the housing. When the bobbin 1110 and the first position sensor are moved in the optical-axis direction by the interaction between the first coil 1120 and the first magnet 1130, the first position sensor may detect the intensity of the magnetic field of the first magnet, and may output an output signal according to the result of the detection.

Next, the first position sensor 1170 and the circuit board 1190 will be described.

The first position sensor 1170 and the circuit board 1190 may be disposed on one of the second side portions or the corner portions 1501a to 1501d of the housing 1140 so as to correspond to the second magnet 1180. For example, the first position sensor 1170 may face and overlap the second magnet 1180 in a direction perpendicular to the optical axis at the initial position of the bobbin 1110.

For example, the circuit board 1190 may be disposed in the first groove 1014a in the housing 1140. The first position sensor 1170 may be mounted on the circuit board 1190 disposed in the housing 1140, and may be positioned in the second groove 1014b in the housing 1140.

When the bobbin 1110 is moved, the first position sensor 1170 may detect the intensity of the magnetic field of the second magnet 1180 mounted on the bobbin 1110, and may output an output signal (for example, output voltage) according to the result of the detection. In another embodiment, the second and third magnets 1180 and 1185 may be omitted, and the first position sensor 1170 may output an output signal according to the result of detection of the intensity of the magnetic field of the first magnet 1130.

The first position sensor 1170 may be disposed on the first surface of the circuit board 1190. The first surface of the circuit board 1190 may be the surface opposite a second surface that faces the inner surface of the corner portion of the housing 1140 on which the circuit board 1190 is mounted. In another embodiment, the first position sensor 1170 may be disposed on the second surface of the circuit board 1190.

Referring to FIG. 26, the first position sensor 1170 may include a hall sensor 1061 and a driver 1062.

For example, the hall sensor 1061 may be made of a silicone-based material, and the output VH of the hall sensor 1061 may increase as the ambient temperature increases.

In another embodiment, the hall sensor 1061 may be made of GaAs, and the output VH of the hall sensor 1061 may have an inclination of about −0.06%/° C.

The first position sensor 1170 may further include a temperature-sensing device 1063 capable of detecting an ambient temperature. The temperature-sensing device 1063 may output a temperature-detecting signal Ts, based on the result of measurement of ambient temperature around the first position sensor 1170, to the driver 1062.

For example, the hall sensor 1061 of the first position sensor 1170 may generate output according to the result of detection of the intensity of the magnetic field of the second magnet 1180.

The driver 1062 may output a drive signal dv for driving the hall sensor 1061 and a drive signal Id1 for driving the first coil 1120.

For example, the driver 1062 may receive a clock signal SCL, a data signal SDA and a power signal VCC, GNd from the controller 830 of the camera module or the controller 780 of the optical instrument through data communication using a protocol such as, for example, I2C communication.

The driver 1062 may create the drive signal dV for driving the hall sensor 1061 and the drive signal Id1 for driving the first coil 1120 using the clock signal SCL and the power signal VCC, GND.

Furthermore, the driver 1062 may receive the output VH of the hall sensor 1061, and may transmit the clock signal SCL and the data signal SDA relating to the output VH of the hall sensor 1061 to the controller 830 or 780 using a data communication protocol such as, for example, I2C communication.

The driver 1062 may receive the temperature-detecting signal Ts measured by the temperature-sensing device 1063, and may transmit the temperature-detecting signal Ts to the controller 830 or 780 through data communication using a protocol such as, for example, I2C communication.

The controller 830 or 780 may perform temperature compensation for the output VH of the hall sensor 1061 based on variation in ambient temperature measured by the temperature-sensing device 1063 of the first position sensor 1170.

The first position sensor 1170 may include first to third terminals for receiving the clock signal and two power signals VCC, GND, a fourth terminal for transmitting and receiving the data SDA, and fifth and sixth terminals for supplying a drive signal to the first coil 1120.

In another embodiment, the first position sensor 1170 may be embodied as a position detection sensor, such as a hall sensor, alone.

The circuit board 1190 may include first to sixth pads 1001 to 1006 conductively connected to the first to sixth terminals of the first position sensor 1170.

For example, each of the first to fourth terminals of the first position sensor 1170 may be conductively connected to a corresponding one of the first to fourth pads 1001 to 1004 of the circuit board 190, and the fifth and sixth terminals of the first position sensor 1170 may be conductively connected to the fifth and sixth pads 1005 and 1006 of the circuit board 1190, respectively.

The circuit board 1190 may include an upper end, at which the first to fourth pads 1001 to 1004 are provided, and a lower end, which is positioned under the upper end and at which the fifth and sixth pads 1005 and 1006 are provided.

The first to fourth pads 1001 to 1004 may be positioned on the upper end of the circuit board 1190 in order to facilitate connection or bonding of the contacts P1 to P4 of the first to fourth upper springs 1150-1 to 1150-4, and the fifth and sixth pads 1005 and 1006 may be positioned at the lower end of the circuit board 1190 in order to facilitate connection or bonding to the first and second lower springs 1160-1 and 1160-2.

For example, the horizontal length of the upper end of the circuit board 1190 may be larger than or equal to the horizontal length of the lower end thereof.

Although the first to fourth pads 1001 to 1004 may be provided on the second surface of the circuit board 1190, the disclosure is not limited thereto. In another embodiment, the pads may also be provided on the first surface of the circuit board 1190.

The circuit board 1190 may include circuit patterns or wires (not shown) for conductively connecting the first to fourth pads 1001 to 1004 to two input terminals and two output terminals of the first position sensor 1170. For example, the circuit board 1190 may be a printed circuit board or an FPCB.

In another embodiment, the first position sensor 1170 may be disposed on the lower surface of the first circuit board, and the first to fourth pads may be provided on the upper surface of the first circuit board.

The first to fourth pads 1001 to 104 of the circuit board 1190 may be conductively connected to the circuit board 1250 via the upper springs 1150-1, 1150-4 to 1150-4 and the support members 1220-3 to 1220-6, and the first position sensor 1170 may be conductively connected to the circuit board 1250.

The fifth and sixth pads 1005 and 1006 of the circuit board 1190 may be conductively connected to the first coil 1120 via the lower springs 1160-1 and 1160-2.

Next, the upper elastic member 1150, the lower elastic member 1160 and the support members 1220 will be described.

The upper elastic member 1150 and the lower elastic member 1160 may be coupled both to the bobbin 1110 and to the housing 1140 so as to support the bobbin 1110.

For example, the upper elastic member 1150 may be coupled to the upper portion, the upper surface or the upper end of the bobbin 1110 and the upper portion, the upper surface or the upper end of the housing 1140, and the lower elastic member 1160 may be coupled to the lower portion, the lower surface or the lower end of the bobbin 1110 and the lower portion, the lower surface or the lower end of the housing 1140.

The support members 1220 may support the housing 1140 with respect to the base 1210, and may conductively connect at least one of the upper elastic member 1150 and the lower elastic member 1160 to the circuit board 1250.

Referring to FIGS. 27 and 28, at least one of the upper elastic member 1150 and the lower elastic member 1160 may be divided or separated into two or more members.

For example, the upper elastic member 1150 may include first to fourth upper springs 1150-1 to 1150-4, which are spaced apart or separated from each other, and the lower elastic member 1160 may include first and second lower springs 1160-1 and 1160-2, which are spaced apart or separated from each other.

Although each of the upper elastic member 1150 and the lower elastic member 1160 may be embodied as a leaf spring, the disclosure is not limited thereto, and the member may also be embodied as a coil spring, a suspension wire or the like.

At least one of the first to fourth upper springs 1150-1 to 1150-4 may include a first inner frame 1151 coupled to the upper portion, the upper surface or the upper end of the bobbin 1110, a first outer frame 1152 coupled to the upper portion, the upper surface or the upper end of the housing 1140, and a first frame connector 1153 connecting the first inner frame 1151 to the first outer frame 1152.

The first inner frame 1151 may be provided with a hole 1151a for coupling with the first coupler 1113 of the bobbin 1110, and the hole 1151a may have at least one slit (not shown) into which an adhesive member or a damper is introduced.

In the embodiment shown in FIG. 27, although each of the first to third upper springs 1150-1 to 1150-3 may include the first inner frame 1151, the first outer frame 1152 and the first frame connector 1153 and the fourth upper spring 1150-4 may include only the first outer frame 1152, the disclosure is not limited thereto.

The first outer frame 1152 of each of the first to fourth upper springs 1150-1 to 1150-4 may include a first coupler 1510 coupled to the support members 1220-1 to 1220-6, a second coupler 1520 coupled to at least one the corner portions 1501a to 1501d of the housing 1140 and/or the side members adjacent to the corner portions, and a connector 1530 connecting the first coupler 1510 to the second coupler 1520.

The second coupler 1520 may include at least one coupling region coupled to the corner portions 1501a to 1501d of the housing 1140 (for example, the protrusions 1143a, 1143b and 1143c of the housing 1140). For example, the at least one coupling region may include holes 1152a, 1152b and 1152c.

For example, although the second coupler 1520 may include at least one of a first coupling region positioned at one side of the stopper 1146 of the housing 1140 and a second coupling region positioned at the other side of the stopper 1146, the disclosure is not limited thereto.

In the embodiment shown in FIG. 27, although each of the coupling regions of the second coupler 1520 of the first to fourth springs 1150-1 to 1150-4 is embodied as including a hole, the disclosure is not limited thereto. In another embodiment, the coupling regions may be embodied as having various shapes suitable for being coupled to the housing 1140, for example, grooves or the like.

For example, the holes 1152a, 1152b and 115c in the second coupler 520 may have at least one slit (not shown), which allows an adhesive member or a damper to be introduced between the protrusions 1143a, 1143b and 1143c of the housing 1140 and the holes 1152a, 1152b and 1152c.

The first coupler 1510 may have holes 1052, through which the support members 1220-1 to 1220-4 extend. The first ends of the support members 1220-1 to 1220-4, which extend through the holes 1052, may be coupled to the first coupler 1510 using a conductive adhesive member (for example, conductive epoxy) or a solder 1901, and the first couplers 1510 and the support members 1220-1 to 1220-4 may be conductively connected to each other.

The first coupler 1510, which is a region at which the solder 1901 is disposed, may include the hole 1052 and a region around the hole 1052.

For example, although the diameter of the hole 1052 in the first coupler 1510 may be within the range of 0.07 mm-0.5 mm so as to allow the support members 1220-1 to 1220-4 to be easily bonded, the disclosure is not limited thereto.

The connector 1530 may connect the coupling region of the second coupler 1520, disposed on the corner portions 1501a to 1501d, to the first coupler 1510.

For example, the coupler 1530 may include a first connector 1530-1 connecting the first coupling region of the second coupler 1520 of each of the first to fourth upper springs 1150-1 to 1150-4 to the first coupler 1510, and a second connector 1530-2 connecting the second coupling region of the second coupler 1520 to the first coupler 1510.

Although the connector 1530 may include a bent portion, which is bent at least once, or a curved portion, which is curved at least once, the disclosure is not limited thereto. In another embodiment, the connector 1530 may be linear.

Since the width of the connector 1530 may be smaller than the width of the second coupler 1520, the connector 1530 may be easily movable in the first direction, whereby it is possible to distribute the stress applied to the upper elastic member 1150 and the stress applied to the support member 1220.

Although the connector 1530 may be bilaterally symmetrical with respect to the reference line 1102 in order to support the housing 1140 in a balanced state without eccentricity, the disclosure is not limited thereto. In another embodiment, the connector may not be bilaterally symmetrical.

The reference line 1102 may be a line, which extends through the center point 1101 (see FIG. 27) and a corresponding one of the corner portions of the housing 1140. Here, the center point 1101 may be the center of the housing 1140.

The first outer frame 1152 of each of the first to fourth upper springs 1150-1 to 1150-4 may include contacts P1 to P4, which are brought into contact with or connected to a corresponding one of the first to fourth pads 1001 to 1004 of the circuit board 1190.

The contacts P1 to P4 may extend toward the first corner portion 1501-1 of the housing 1140 or the first position sensor from one end of the first outer frame 1152 of each of the first to fourth upper springs 1150-1 to 1150-4. The first corner portion may be a corner portion of the housing 1140 on which the first position sensor 1170 is disposed.

Each of the contacts P1 to P4 may be brought into direct contact with a corresponding one of the first to fourth pads 1001 to 1004 of the circuit board 1190, and the contacts P1 to P4 and corresponding pads 1001 to 1004 of the circuit board 1190 may be conductively connected to each other via a solder or the like.

Each of the lower springs 1160-1 to 1160-2 may include a second inner frame 1161, which is coupled to the lower portion, the lower surface or the lower end of the bobbin 1110, a second outer frame 1162, which is coupled to the lower portion, the lower surface or the lower end of the housing 1140, and a second frame connector 1163 connecting the second inner frame 1161 to the second outer frame 1162.

Each of the lower springs 1160-1 and 1160-2 may have therein a hole 1161a, which is formed in the second inner frame 1161 and is coupled to the second coupler 1117 of the bobbin 1110 using a solder or a conductive adhesive member, and a hole 1162a, which is formed in the second outer frame 1162 and is coupled to the protrusion 1147 of the housing 1140.

The first outer frame 1162 of each of the first and second lower springs 1160-1 and 1160-2 may include bonding portions 1164a and 1164b, which are bonded to the fifth and sixth pads 1005 and 1006 of the circuit board 1190 via a solder or a conductive adhesive member.

Each of the first and second frame connectors 1153 and 1163 of the upper and lower elastic members 1150 and 1160 may be bent or curved (or rounded) at least once so as to define a predetermined pattern. The upward and/or downward movement of the bobbin 1110 in the first direction may be elastically (or flexibly) supported by virtue of positional variation and fine deformation of the first and second frame connectors 1153 and 1163.

In order to absorb or buffer vibrations of the bobbin 1110, the lens moving apparatus 1100 may further include a first damper (not shown), which is disposed between each of the upper springs 1150-1 to 1150-4 and the housing 1140.

For example, a first damper (not shown) may be disposed in the space between the first frame connector 1153 of each of the upper springs 1150-1 to 1150-4 and the housing 1140.

The lens moving apparatus 1100 may further include a second damper (not shown), which is disposed between the second frame connector 1163 of the lower elastic member 1160 and the housing 1140.

The lens moving apparatus 1100 may further include a third damper (not shown), which is disposed between the support member 1220 and the hole 1147a in the housing 1140.

The lens moving apparatus 1100 may further include a fourth damper (not shown), which is disposed on the first coupler 1510 and the first end of the support member 1220, and a fifth damper (not shown), which is disposed on the second end of the support member 1220 and the circuit board 1250.

Furthermore, a damper (not shown) may also be disposed between the inner surface of the housing 1140 and the outer peripheral surface of the bobbin 1110.

Next, the support members 1220 will be described.

The first ends of the support members 1220 may be coupled to the first outer frames 1151 of the upper elastic member 1150 via a solder or a conductive adhesive member 1901, and the second ends of the support members 1220 may be coupled to the lower surface of the terminal portions 1270a to 1270d via a solder or a conductive adhesive member 1901.

The support members 1220 may include a plurality of support members 1220-1 to 1220-4. Each of the plurality of support members 1220-1 to 1220-4 may be coupled to a first coupler 1510 of a corresponding one of the upper springs 1150-1 to 1150-4, and may be conductively connected to the first coupler 1510 via the solder 1901. For example, each of the plurality of support members 1220-1 to 1220-4 may be disposed on a corresponding one of the four corner portions 1501a to 1501d.

The plurality of support members 1220-1 to 1220-4 may support the bobbin 1110 and the housing 1140 so as to allow the bobbin 1110 and the housing 1140 to be moved in a direction perpendicular to the first direction. Although only one support member is disposed on each of the second side portions 1142 or the corner portions 1501a to 1501d of the housing 1140 in FIGS. 29 and 30, the disclosure is not limited thereto.

In another embodiment, two or more support members may also be disposed on at least one of the second side portions of the housing 1140.

Each of the plurality of support members 1220-1 to 1220-4 may be spaced apart from the housing 1140. The first end of each of the support members 1220-1 to 1220-4 may not be secured to the housing 1140 but may be directly connected to the first coupler 1510 of the first outer frame 1152 of each of the upper springs 1150-1 to 1150-4.

The second end of each of the support members 1220-1 to 1220-4 may be coupled to the lower surface of a corresponding one of the terminal portions 1270a to 1270d.

In another embodiment, the support members 1220 may be disposed as leaf springs on the first side portions of the housing 1140.

The signals (for example, GNS, VCC, SCL and SDA) may be transmitted and received between the circuit board 1250 and the first position sensor 1220 via the plurality of support members 1220-1 to 1220-4 and the upper springs 1150-1 to 1150-4.

The plurality of support members 1220-1 to 1220-4 may be formed separately from the upper elastic member 1150, and may be embodied as members capable of elastically supporting an object, for example, leaf springs, coil springs, suspension wires or the like. In another embodiment, the support members 1220-1 to 1220-4 may be integrally formed with the upper elastic member 1150.

Next, the base 1210, the circuit board 1250, the second coil 1230 and the second position sensor 1240 will be described.

Figure 31:
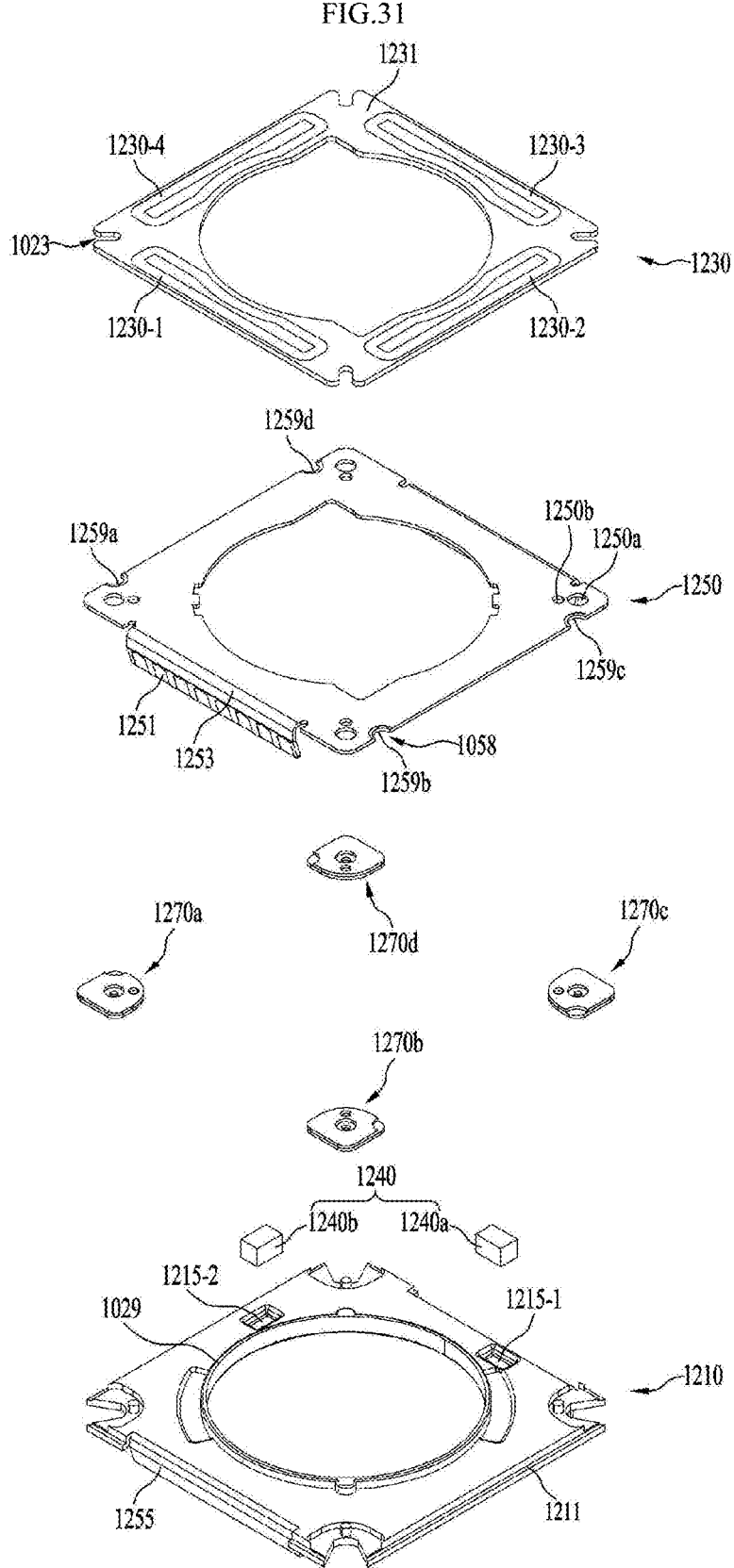
FIG. 31 is a perspective view of the base, the terminal portions, the second position sensor, the circuit board and the second coil.
Figure 32:
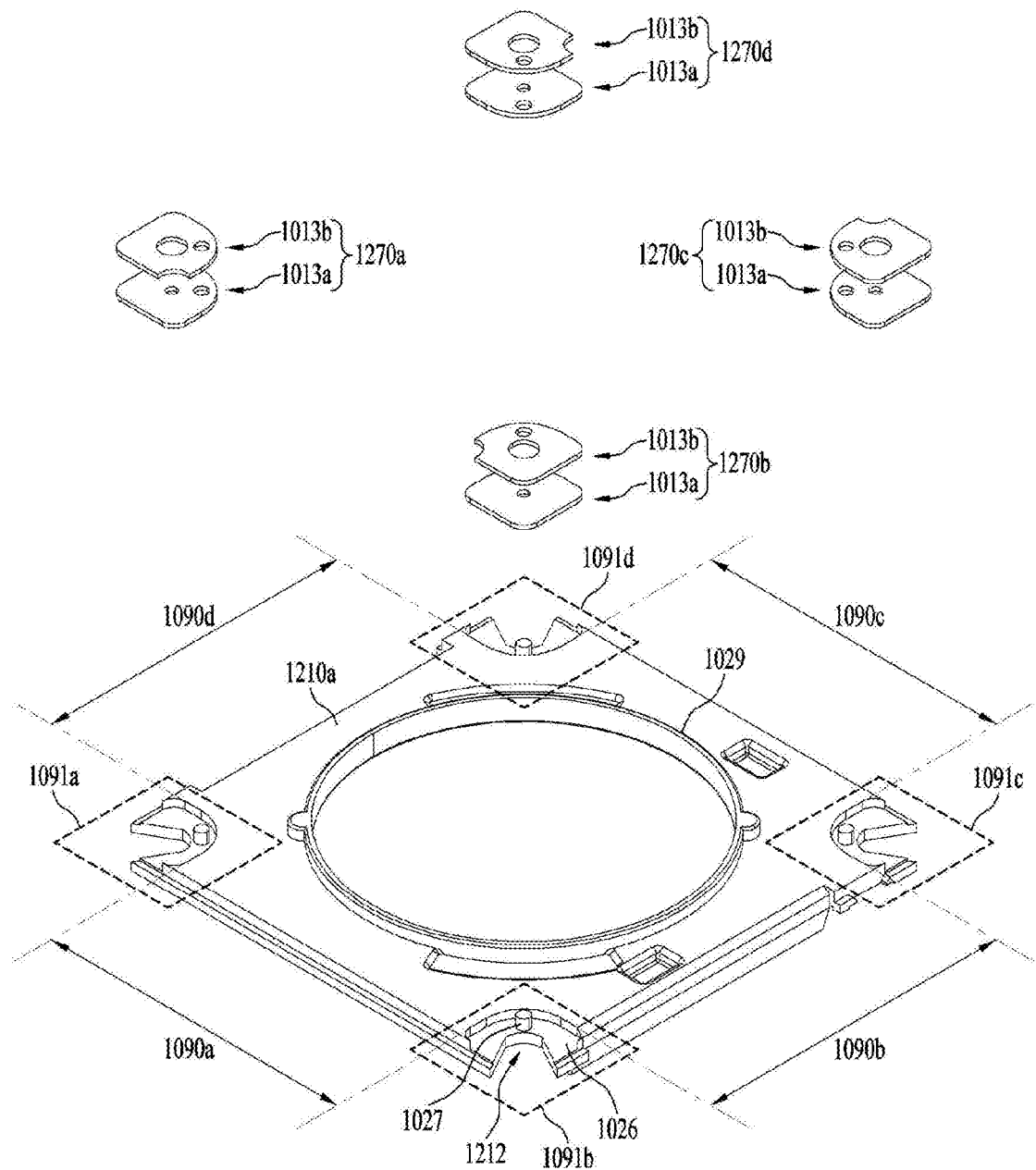
FIG. 32 is a perspective view of the base and the terminal portions shown in FIG. 31.
Figure 33:
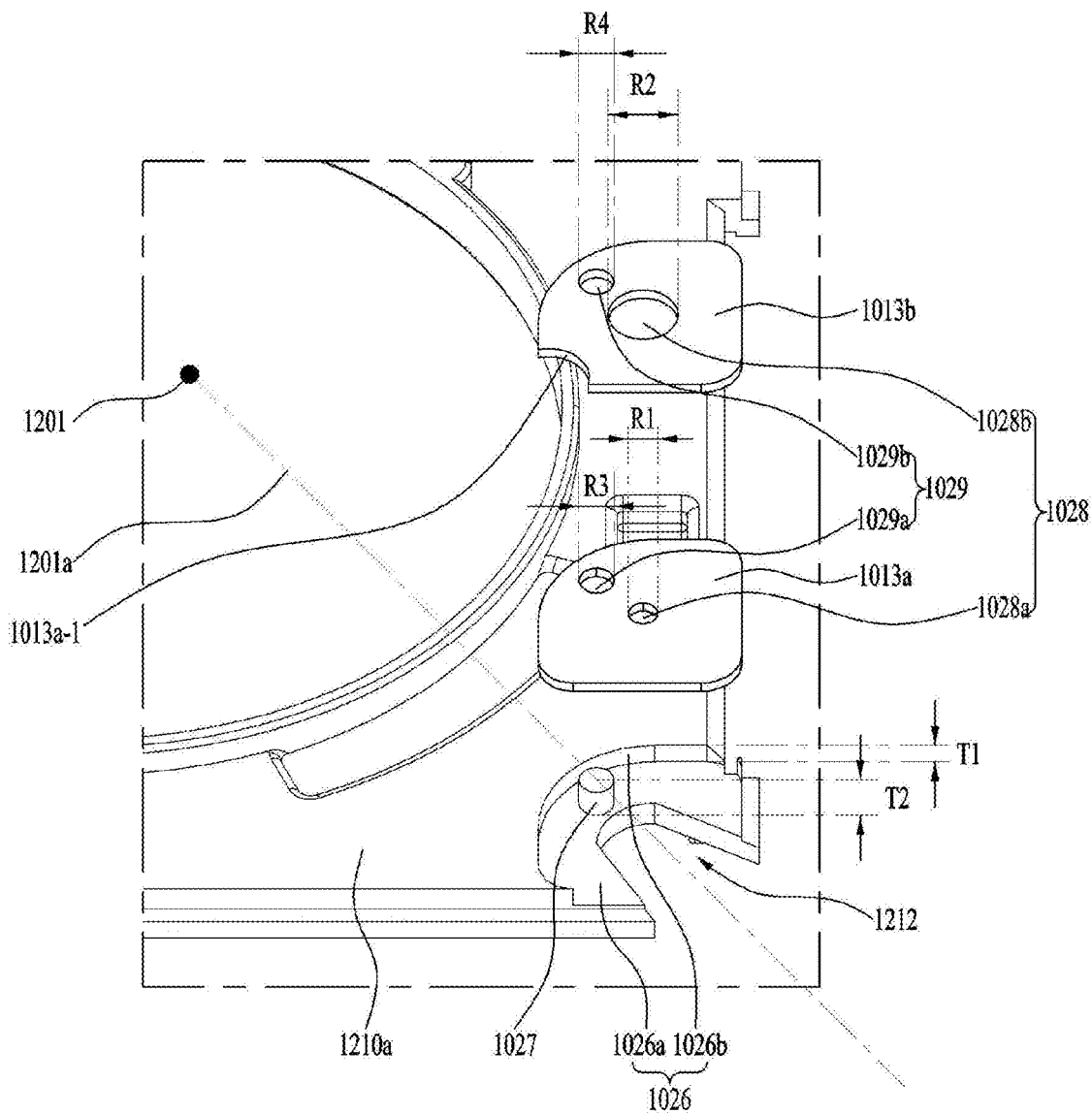
FIG. 33 is an enlarged view of the terminal portion and a stepped portion of the base shown in FIG. 32.
Figure 34:
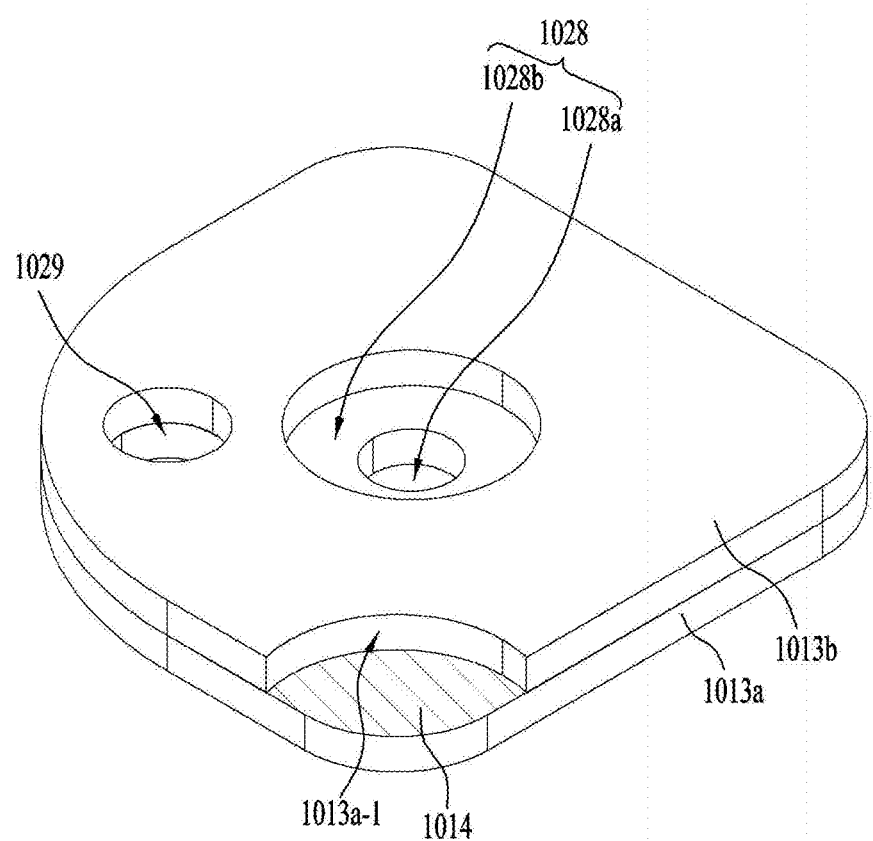
FIG. 34 is an enlarged view of the stepped portion shown in FIG. 33.

FIG. 31 is a perspective view of the base 1210, the terminal portions 1270a to 1270d, the second position sensor 1240, the circuit board 1250 and the second coil 1230. FIG. 32 is a perspective view of the base 1210 and the terminal portions 1270a to 1270d shown in FIG. 31. FIG. 33 is an enlarged view of the terminal portion 1270a and a stepped portion of the base 1210 shown in FIG. 32. FIG. 34 is an enlarged view of the stepped portion 1026 shown in FIG. 33.

Referring to FIGS. 31 and 32, the base 1210 may have an opening corresponding to the opening in the bobbin 1110 and/or the opening in the housing 1140, and may be configured to have a shape that coincides with or corresponds to that of the cover member 1300, for example, a square shape.

The base 1210 may include the stepped portion 1211, to which an adhesive is applied when the cover member 1300 is adhesively attached to the base 1210. The stepped portion 1211 may guide the cover member 1300, which is coupled to the upper side thereof, and may face the lower end of the side plate of the cover member 1300.

The base 1210 may be disposed under the bobbin 1110 and the housing 1140, and a support groove or a support portion 1255 may be formed in the side surface of the base 1210 that faces the portion of the circuit board 1250 at which the terminals 1251 are formed. The support portion 1255 of the base 1210 may support a terminal member 1253 of the circuit board 1250.

The corners of the base 1210 may be provided with grooves 1212 in order to avoid spatial interference with the second ends of the support members 1220 coupled to the lower surfaces of the terminal portions 1270a to 1270d.

The base 1210 may be provided in the upper surface thereof with mounting grooves 1215-1 and 1215-2, in which the second position sensor 1240 mounted on the circuit board 1250 is disposed or mounted. According to the embodiment, the base 1210 may be provided with two mounting grooves 1215 and 1215-2.

The second coil 1230 may be disposed above the circuit board 1250, and the second position sensor 1240 may be disposed under the circuit board 1250.

For example, the second position sensor 1240 may be mounted on the lower surface of the circuit board 1250, and the lower surface of the circuit board 1250 may be the face that faces the upper surface of the base 1210.

The circuit board 1250 may be positioned under the housing 1140 and on the upper surface of the base 1210, and may have an opening corresponding to the opening in the bobbin 1110, the opening in the housing 1140 and/or the opening in the base 1210. The shape of the outer peripheral surface of the circuit board 1250 may be a shape that coincides with or corresponds to that of the upper surface of the base 1210, for example, a square shape.

The circuit board 1250 may include at least one terminal member 1253, which is bent from the upper surface thereof and which includes a plurality of terminals 1251 or pins for conductive connection to the outside.

The terminal member 1253 of the circuit board 1250 may be provided with a plurality of terminals 1251. For example, a drive signal for driving the first coil 1120, the second coil 1230 and the second position sensor 1240 may be received through the plurality of terminals 1251 provided at the terminal member 1253 of the second circuit board 1250, and the output from the first position sensor 1170 and the output from the second position sensor 1240 may be output to the outside through the terminals 1251.

Although the circuit board 1250 may be embodied as an FPCB according to the embodiment, the disclosure is not limited thereto. The terminals of the circuit board 1250 may also be directly formed on the surface of the base 1210 through a surface electrode technology.

The circuit board 120 may have therein holes 1250a, through which the support members 1220-1 to 1220-4 extend. The position and number of holes 1250a may correspond to or coincide with the position and number of support members 1220-1 to 1220-4. The metal pattern or the copper pattern of the circuit board may not be provided at the regions of the circuit board 1250 in which the holes 1250a are formed. The reason for this is to inhibit solder from adhering to the holes 1250a in the circuit board 1250 during a soldering process of coupling the lower ends of the terminal portions 1270a to 1270d to the support member 1220.

In another embodiment, the circuit board 1250 may be provided with escape grooves for avoiding spatial interference with the support members, in place of the holes 1250a.

Each of the support members 1220-1 to 1220-4 may be disposed so as to be spaced apart from the inner surfaces of the holes 1250a in the circuit board 1250.

The support members 1220-1 to 1220-4 may be connected to the lower surfaces of the terminal portions 1270a to 1270d through grooves 1212 in the second coil 1230, the holes 1250a in the circuit board 1250 and holes 1028a and 1029a in the terminal portions 1270a to 1270d through soldering.

The second coil 1230 may be positioned under the housing 1140, and may be disposed above the circuit board 1250 so as to correspond to the first magnets 1130 disposed on the housing 1140.

Although the second coils 1230 may include, for example, four OIS coils 1230-1 to 1230-4, which are disposed so as to correspond to four sides of the circuit board 1250, the disclosure is not limited thereto. Only two OIS coils, one coil for the second direction and one coil for the third direction, may be provided, or four or more coils may be provided.

Although the second coil 1230 is embodied as being provided on an additional circuit member 1231 separately from the circuit board 1250 in FIG. 31, the disclosure is not limited thereto. In another embodiment, the second coil 1230 may be embodied as a circuit pattern formed on the circuit board 1250.

In a further embodiment, the circuit member 1231 may be omitted, and the second coil 1230 may be embodied as a ring-shaped coil block or an FP coil separately from the circuit board 1250.

The circuit member 1231, on which the second coil 1230 is provided, may be provided in the corners thereof with escape grooves 1023 for avoiding spatial interference with the support members 1220. Although the escape grooves 1023 may be formed in the corner portions of the circuit board 1231, the disclosure is not limited thereto. In another embodiment, each of the escape grooves 1023 may be a chamfered portion in which the corner portion of the circuit member 1231 is chamfered or a through hole, which is formed through the circuit member 1231.

As described above, handshake correction may be performed by moving the housing 1140 in the second and/or third direction by the interaction between the first magnets 1130 and the second coil 1230, which correspond to each other.

When the housing 1140 is moved in a direction perpendicular to the optical axis, the second position sensor 1240 may detect the intensity of the magnetic field of the first magnets 1130 disposed on the housing 1140, and may output an output signal (for example, an output voltage) according to the result of the detection.

Displacement of the housing 1140 with respect to the base 1210 in a direction (for example, in the X-axis direction or in the Y-axis direction) perpendicular to the optical axis (for example, the Z-axis) may be detected based on the output signal from the second position sensor 1240.

The second position sensor 1240 may include two OIS position sensors 1240a and 1240b in order to detect displacement of the housing 140 in the second direction (for example, in the X-axis direction) perpendicular to the optical axis and in the third direction (for example, in the Y-axis direction) perpendicular to the optical axis.

The OIS position sensor 1240a may detect the intensity of the magnetic field of the first magnet 1130 when the housing 1140 is moved, and may output a first output signal according to the result of the detection. The OIS position sensor 1240*b* may detect the intensity of the magnetic field of the first magnet 1130 when the housing 1140 is moved, and may output a second output signal according to the result of the detection. The controller 830 of the camera module or the controller 780 of the portable terminal 200A may detect the displacement of the housing 1140 based on the first output signal from the OIS position sensor 1240*a* and the second output signal from the OIS position sensor 1240*b*, and may perform OIS feedback driving based on the detected displacement of the housing 1140.

Each of the OIS position sensors 1240*a* and 1240*b* may be embodied as a hall sensor. Any sensor may be used, as long as the sensor is capable of detecting the intensity of a magnetic field. For example, each of the OIS position sensors 1240*a* and 1240*b* may be embodied as a driver including a hall sensor, or may be embodied as a position detection sensor, such as a hall sensor, alone.

Each of the OIS position sensors 1240*a* and 1240*b* may be mounted on the circuit board 1250, and the circuit board 1250 may include terminals that are conductively connected to the OIS position sensors 1240*a* and 1240*b*.

For the purpose of coupling between the circuit board 1250 and the base 1210, the base 1210 may be provided on the upper surface thereof with protrusions or coupling protrusions 1027.

The circuit board 1250 may be provided with holes 1250*b* for coupling with the coupling protrusions 1027 of the base 1210, or the coupling protrusions and the holes may be secured to each other using thermal fusion or an adhesive member such as epoxy.

The base 1210 may be provided around the opening thereof with a projection 1029. The projection 1029 may be fitted into the opening in the circuit board 1250 and the opening in the circuit member 123*a*.

Referring to FIGS. 32 to 34, the base 1210 may include side members 1090*a* to 19090*d* and corner portions 1091*a* to 1091*d* positioned between the side members 1090*a* to 1090*d*.

The corner portions 1091*a* to 1091*d* of the base 1210 may correspond to or be aligned with the corner portions 1501*a* to 1501*d* of the housing 1140 in the optical-axis direction.

Each of the corner portions 1091*a* to 1091*d* of the base 1210 may be provided with a stepped portion 1026. The stepped portion 1026 may be referred to a "groove".

The stepped portions 1026 of the base 1210 may be positioned at the corners of the base 1210, and may have a height difference T from the upper surface 1210*a* of the base 1210 toward the lower surface thereof.

For example, the stepped portion 1026 may be configured to be depressed from the surface of the base 1210, on which the circuit board 1250 is disposed.

The stepped portion 1026 may include a first surface 1026*a* and a second surface 1026*b*.

The first surface 1026*a* of the stepped portion 1026 may have a height difference T from the upper surface of the base 1210 and may be parallel to the upper surface of the base 1210. For example, the first surface 1026*a* may be the lower surface of the stepped portion 1026.

The height difference T of the stepped portion 1026 may be greater than or equal to the thickness of the terminal portions 1270*a* to 1270*d*.

The second surface 1026*b* of the stepped portion 1026 may be an inclined surface, which connects the upper surface 1210*a* of the base 1210 to the first surface 1026*a* of the stepped portion 1026 and which is inclined at a predetermined angle (for example, a right angle) with respect to the first surface 1026*a*. For example, the second surface 1026*b* may be the side surface of the stepped portion 1026.

The first surface 1026*a* of the stepped portion 1026 may be provided with a protrusion 1027, which projects from the lower surface of the base 1210 toward the upper surface 1210*a*.

The first surface 1026*a* of the stepped portion 1026 may be provided with the above-mentioned groove 1212 or through hole. Although the groove 1212 may be configured such that the width of the groove 1212 or the distance between the inner surfaces of the groove that face each other is increased moving toward the corner of the base 1210 from the center of the base 1210 in order to avoid coupling between the support members 1220-1 to 1220-4 and the terminal portions 1270*a* to 1270*d* or spatial interference with the bonded portions, the disclosure is not limited thereto.

The groove 1212 may be formed through the first surface 1026*a*, and may have an opening which is open at the outer surface of the base 1210.

For example, the groove 1212 may expose a solder 1015*b*, which couples the support member 1220 to the lower surface of the pad 1013*a*, from the lower surface of the base 1210.

In order to avoid spatial interference between the solder 1015*b* and the base 1210, the grooves 1212 may overlap the holes 1028 in the terminal portions 1270*a* to 1270*d* in the optical-axis direction or in a direction toward the upper surface from the lower surface of the base 1210.

For coupling between the holes 1028*b* and 1029*b* in the terminal portions 1270*a* to 1270*d* and the holes 1250*b* in the circuit board 1250, the protrusion 1027 of the base 1210 may be configured such that the height of the protrusion 1027 from the first surface 1026*a* of the stepped portion 1026 is larger than the height or height difference T1 between the first surface 1026*a* of the stepped portions 1026 and the upper surface 1210*a* of the base 1210 (T2>T1).

For example, the height of the protrusion 1027 of the base 1210 may be larger than the height of one surface of the base 1210 (for example, the upper surface), on which the circuit board 1250 is disposed.

Although the protrusion 1027 of the base 1210 may be positioned so as to be aligned with an imaginary line 1201*a*, which extends both through the center 1201 of the base 1210 and through the center of the corner portion (for example, 1091*b*) of the base 1210, at which the protrusion 1027 is positioned, the disclosure is not limited thereto.

The terminal portions 1270*a* to 1270*d* may be positioned between the lower surface of the circuit board 1250 and the stepped portions of the base 1210.

Each of the terminal portions 1270*a* to 1270*d* may have a first hole 1028, through which the support members 1220-1 to 1220-4 extend, and a second hole 1029 for coupling with the protrusion 1027 of the base 1210. Each of the first holes 1028 and the second holes 1029 in the terminal portions 1270*a* to 1270*d* may be a through hole.

Although the diameter of each of the first holes 1028 in the terminal portions 1270*a* to 1270*d* may be increased moving toward the upper surface from the lower surface of the base 1210, the disclosure is not limited thereto. In other words, the diameter of the lower end of the first hole 1028 may be larger than the diameter of the upper end of the first hole 1028. The reason for this is to enable the lower end of the first hole 1028 to have a diameter such that the support members 1220-1 to 1220-4 are able to be coupled or bonded to the lower surface of the terminal portions 1270*a* to 1270*d* and to cause the diameter of the upper end of the first hole 1028 to be smaller than the diameter of the lower end of the first hole 1028, thereby maximally inhibiting spatial interference or contact with the support members 1220-1 to 1220-4.

Although the diameter of each of the second holes 1029 in the terminal portions 1270a to 1270d may be constant, the disclosure is not limited thereto.

Each of the terminal portions 1270a to 1270d may include a lower end part made of a conductive material or a conductive member, and an upper end part positioned on the lower end part and made of an insulation material or an insulation member.

Each of the first hole 1028 and the second hole 1029 may be formed through the lower end part and the upper end part.

Each of the upper end parts of the terminal portions 1270a to 1270d may have a groove, which exposes a portion of the lower end part therethrough. For example, each of the upper end parts of the terminal portions 1270a to 1270d may have formed in a corner thereof a groove, which exposes a portion of a marginal area of the upper surface of the lower end part therethrough.

Referring to FIG. 33, each of the terminal portions 1270a to 1270d may include an insulation part 1013b and a pad part 1013a.

The pad part 1013a may be disposed at the periphery of the circuit board 1250.

The pad part 1013a may be positioned on the first surface 1026a of the stepped portion 1026 of the base 1210, and the lower surface of the pad part 1013a may be brought into contact with the first surface 1026a of the stepped portion 1026.

The pad part 1013a may have therein a hole 1028a, through which a corresponding one of the support members 1220-1 to 1220-4 extends, and a hole 1029a, to which the protrusion 1027 of the base 1210 is fitted or coupled.

The pad part 1013a may be made of a conductive material, for example, an electrical conductive material (for example, copper, aluminum, gold, silver or the like).

For example, the pad part 1013a may have a semicircular shape, a semi-elliptical shape or a sector shape.

The insulation part 1013b may be disposed on the pad part 1013a, and may expose a portion of the pad part 1013a. For example, the insulation part 1013b may expose a portion of the upper surface of the pad part 1013a, for example, a portion of a marginal area of the upper surface of the pad part 1013a.

The pad part 1013a may include an exposure region 1014, which is exposed through the insulation part 1013b. For example, the upper surface of the pad part 1013a may have the exposure region 1014, which is exposed through the insulation part 1013b.

The insulation part 1013b may include the hole 1028b, through which a corresponding one of the support members 1220-1 to 1220-4 extends, and the hole 1029b, into which the protrusion 1027 of the base 1210 is fitted or coupled.

The hole 1028b in the insulation part 1013b may be aligned with the hole 1028a in the pad part 1013a in the optical-axis direction or in a direction toward the upper surface from the lower surface of the base 1210, and the hole 1029b in the insulation part 1013b may be aligned with the hole 1029a in the pad part 1013a in the optical-axis direction or in a direction toward the upper surface from the lower surface of the base 1210.

The hole 1028b in the insulation part 1013b and the hole 1028a in the pad part 1013a may constitute the first hole 1028 in each of the terminal portions 1270a to 1270d, and the hole 1029b in the insulation part 1013b and the hole 1029a in the pad part 1013a may constitute the second hole 1029 in each of the terminal portions 1270a to 1270d.

The insulation part 1013b may be made a plastic or resin (for example, polyimide) material, and may include an adhesive or bond layer for coupling with the lower surface of the circuit board 1250. For example, the adhesive or bond layer may include at least one of acryl, epoxy and silicone.

For example, the insulation part 1013b may be embodied as polyimide tape including an adhesive.

The insulation part 1013b may have a groove 1013a-1, through which a portion of the pad part 1013a is exposed. For example, the groove 1013a-1 may be formed in one corner of the insulation part 1013b so as to expose a portion of a marginal area of the upper surface of the pad part 1013a.

Although the thickness of the insulation part 1013b may be larger than the thickness of the pad part 1013a, the disclosure is not limited thereto. In another embodiment, the thickness of the insulation part 1013b may be equal to or smaller than the thickness of the pad part 1013a.

For example, the thickness of the insulation part 1013b may be within the range of 0.025 mm-1 mm. Furthermore, the thickness of the insulation part 1013b may also be within the range of 0.025 mm-0.3 mm.

If the thickness of the insulation part 1013b is smaller than 0.025 mm, the increase in length of the support member 1220 is not so great, thereby making it impossible to realize an effect of reducing power consumption. If the thickness of the insulation part 1013b is larger than 1 mm, the thickness of the lens moving apparatus may be increased.

For example, the thickness of the pad part 1013a may be within the range of 0.025 mm-1 mm. Furthermore, the thickness of the pad part 1013a may also be within the range of 0.025 mm-0.3 mm.

The diameter R2 of the hole 1028b in the insulation part 1013b may be the same as the diameter of the hole 1250a in the circuit board 1250.

The diameter R2 of the hole 1028b in the insulation part 1013b may be larger than the diameter R1 of the hole 1028a in the pad part 13a (R2>R1). The reason for this is to inhibit contact between the support members 1220-1 to 1220-4 and the insulation part 1013b and thus to suppress deformation and disconnection of the support members 1220-1 to 1220-4 when the support members 1220-1 to 1220-4 are moved by OIS driving.

The diameter R2 of the hole 1028b in the insulation part 1013b may be within the range of 0.25 mm-2 mm.

If the diameter R2 of the hole 1028b in the insulation part 1013b is smaller than 0.25 mm, the support members 1220 may be damaged due to contact with the hole 1028b in the insulation part 1013b, and the solder coupled to the pad part 1013a may come into contact with the support members 1220 through the hole 1028b in the insulation part 1013b upon soldering. If the diameter R2 of the hole 1028b in the insulation part 1013b is larger than 2 mm, the size of each of the terminal portions 1270a to 1270d may be increased.

Although the diameter of the hole 1028b in the insulation part 1013b may be constant from the upper end to the lower end of the hole, the disclosure is not limited thereto.

In another embodiment, the diameter of the hole 1028b in the insulation part 1013b may be increased toward the upper end from the lower end of the insulation part 1013b.

The diameter R1 of the hole 1028a in the pad part 1013a may be within the range of 0.08 mm-0.5 mm.

If the diameter R1 of the hole 1028a in the pad part 1013a is smaller than 0.08 mm, it may be difficult for the support member 1220 to pass through the hole 1028a.

If the diameter R1 of the hole 1028a in the pad part 1013a is larger than 0.5 mm, defective soldering may occur between the support member 1220, which extends through the hole 1028a in the pad part 1013a, and the pad part 1013a.

Although the diameter R3 of the hole 1029a in the pad part 1013a may be larger than the diameter R1 of the hole 1028a in the pad part 1013a (R3>R1), the disclosure is not limited thereto.

The diameter R4 of the hole 1029b in the insulation part 1013b may be smaller than the diameter (R2) of the hole 1028b in the insulation part 1013b (R4<R2).

Although the diameter R3 of the hole 1029a in the pad part 1013a may be the same as the diameter R4 of the hole 1029b in the insulation part 1013b (R3=R4), the disclosure is not limited thereto.

The diameter R3 of the hole 1029a in the pad part 1013a and the diameter R4 of the hole 1029b in the insulation part 1013b may be within the range of 0.2 mm-1 mm.

Although at least one of the first hole 1028 and the second hole 1029 in the terminal portions 1270a to 1270d may be aligned with the line 1201a, the disclosure is not limited thereto.

Figure 35:
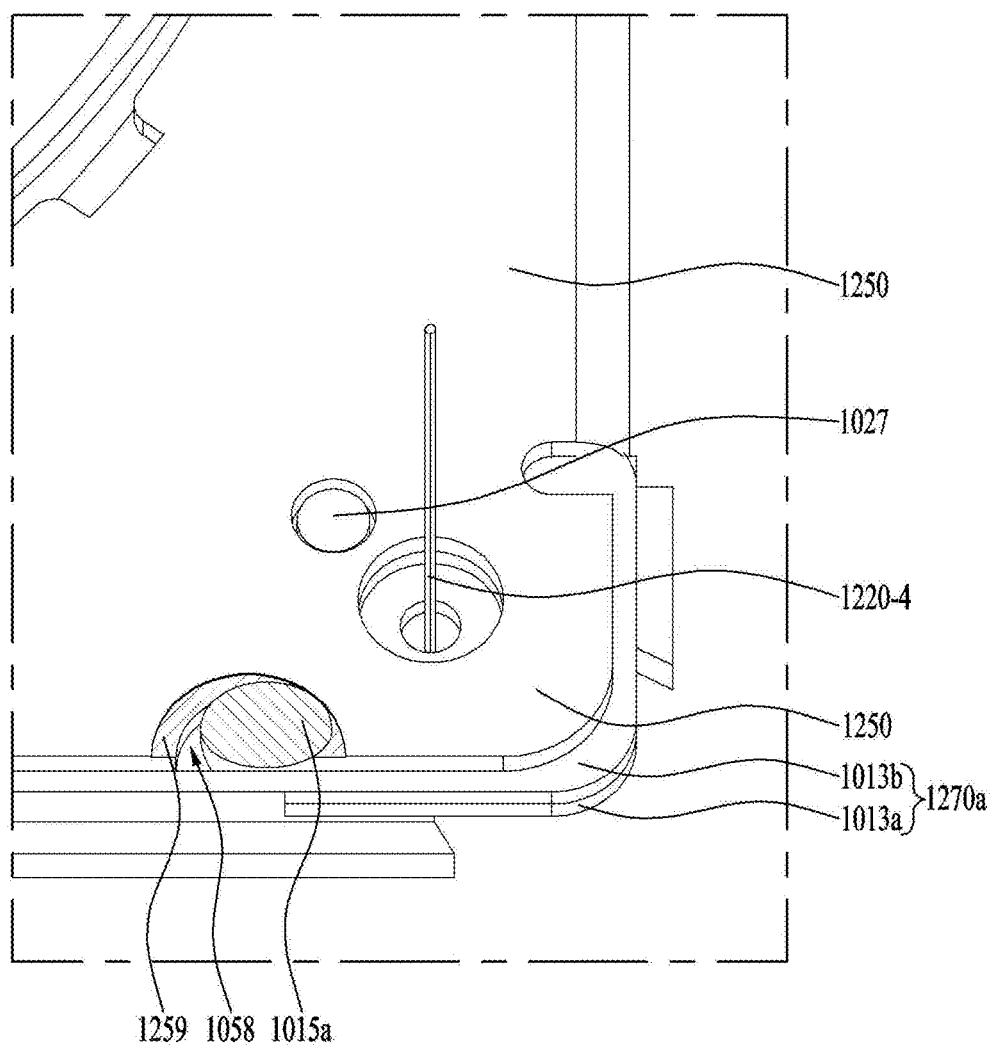
FIG. 35 is a first perspective view illustrating the protrusion of the base, the terminal portion, the circuit board and the support member in an assembled state.
Figure 36:
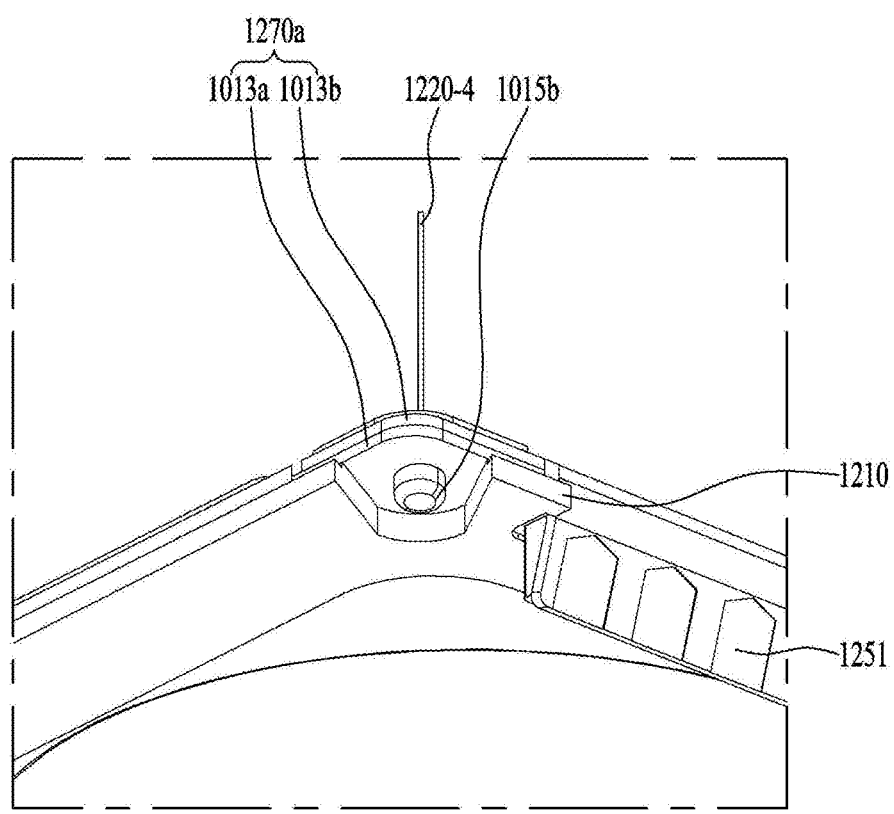
FIG. 36 is a second perspective view illustrating the protrusion of the base, the terminal portion, the circuit board and the support member in an assembled state.

FIG. 35 is a first perspective view illustrating the protrusion 1027 of the base 1210, the terminal portion 1270a, the circuit board 1250 and the support member 1220-4, which are assembled. FIG. 36 is a second perspective view illustrating the protrusion 1027 of the base 1210, the terminal portion 1270a, the circuit board 1250 and the support member 1220-4, which are assembled.

Referring to FIGS. 35 and 36, the circuit board 1250 may include bonding portions 1259a to 1259d, which are conductively connected to the terminal portions 1270a to 1270d via a solder or a conductive adhesive member (for example, conductive epoxy). Here, the bonding portions 1259a to 1259d of the circuit board 1250 may be referred to "pad portions, electrode portions, lead portions or terminal portions".

The bonding portions 1259a to 1259d may be disposed on the upper surface of the circuit board 1250, and may be soldered to at least a portion of the terminal portions 1270a to 1270d.

At least a portion of the terminal portions 1270a to 1270d may not overlap the circuit board in the optical-axis direction or in the vertical direction.

The bonding portions 1259a to 1259d may be positioned adjacent to the holes 1250a in the circuit board 1250, and may be aligned with the exposure regions 1014 of the pad parts 1013a in the optical-axis direction or in a direction toward the upper surface from the lower surface of the base 1210.

For example, the bonding portions 1259a to 1259d may be connected to the exposure regions 1014 of the pad parts 1013a via a solder or a conductive adhesive member.

The circuit board 1250 may have grooves 1058, which correspond to the pad parts 1013a of the terminal portions 1270a to 1270d and which expose the exposure regions 1014 of the pad parts.

The grooves 1058 in the circuit board 1250 may overlap, at at least a portion thereof, the exposure region of the pad parts 1013a in the optical-axis direction or in a direction toward the upper surface from the lower surface of the base 1210.

Although each of the grooves 1058 in the circuit board 1250 may have a groove shape, which is open at the side surface of the circuit board 1250, the disclosure is not limited thereto.

Each of the bonding portions 1259a to 1259d may be positioned around a corresponding one of the grooves 1058 in the circuit board 1250.

Figure 37:
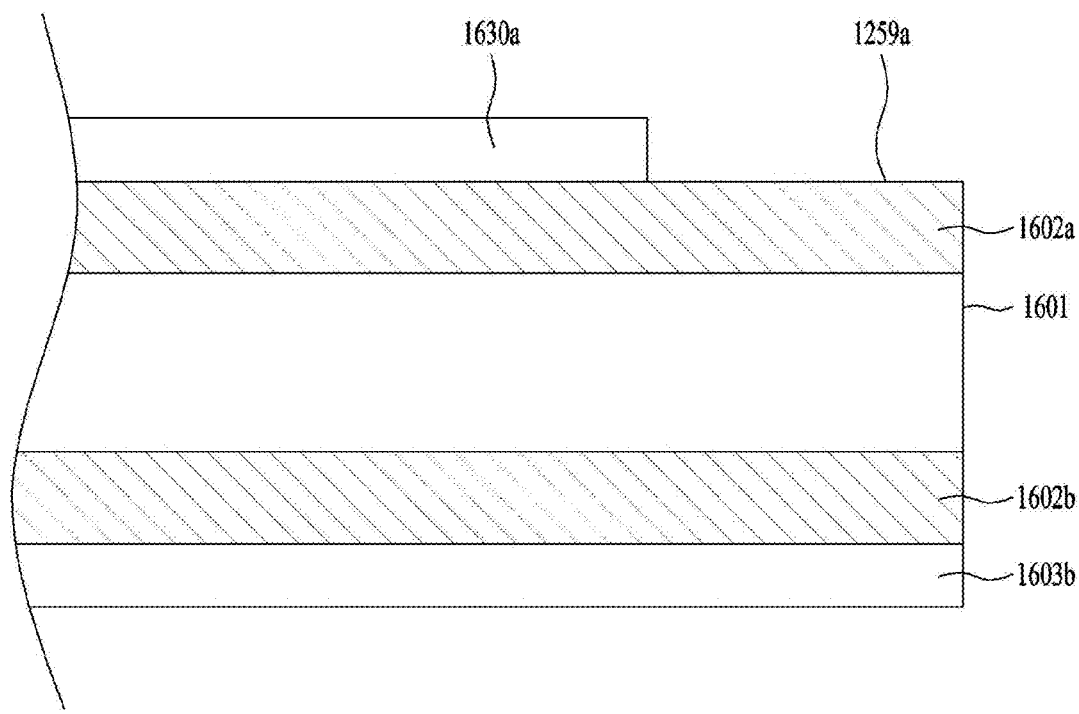
FIG. 37 is a cross-sectional view of a portion of the circuit board shown in FIG. 35.

FIG. 37 is a cross-sectional view of a portion of the circuit board 1250 shown in FIG. 35.

Referring to FIG. 37, the circuit board 1250 may include an insulation layer 1601, a first conductive layer 1602a disposed on the upper surface of the insulation layer 1601, a first coating layer 1603a disposed on the upper surface of the first conductive layer 1602a, a second conductive layer 1602b disposed on the lower surface of the insulation layer 1601, and a second coating layer 1603a disposed on the lower surface of the second conductive layer 1602b.

The first conductive layer 1602a may be a patterned metal layer, for example, a Cu-plated layer.

The second conductive layer 1602b may be a metal layer (for example, a Cu layer) or a patterned metal layer.

For example, the first conductive layer 1602a may be patterned so as to include wires and pads, which are conductively connected to the support members 1220-1 to 1220-4, the second coil 1230 and the second position sensor 1240.

The insulation layer 1601 and the first and second coating layer 1603a and 1603b may be made of resin, for example, polyimide, without being limited thereto.

Each of the bonding portions 1259a to 1259d may be a portion of the upper surface of the first conductive layer 1602a, which is exposed through the first coating layer 1603a.

Each of the bonding portions 1259a to 1259d may be conductively connected to a corresponding one of the terminals 1251 of the circuit board 1250 via the first patterned conductive layer 1602a.

Referring to FIG. 36, the second end of the support member (for example, 1220-4) may be coupled or bonded to the lower surface of the pad 1013a via the solder 1015b.

The solder 1015b may avoid spatial interference with the base 1210 and may not project downwards from the lower surface of the base 1210 by virtue of the groove 1212 in the base 1210.

The description of the terminal portion (for example, 1270a), disposed on the stepped portion 1026 of one corner portion (for example, 1091a) of the base 1210, and the bonding portion 1259a of the circuit board 1250 and the support member 1220-1, corresponding to the terminal portion, which are shown in FIGS. 35 and 36, may be applied to the terminal portions (for example, 1270b to 1270d) disposed on other corner portions (for example, 1091b to 1091d) of the base 1210, and the bonding portions 1259b to 1259d of the second circuit board and the support members 1220-2 to 1220-4, corresponding to the terminal portions.

Figure 38:
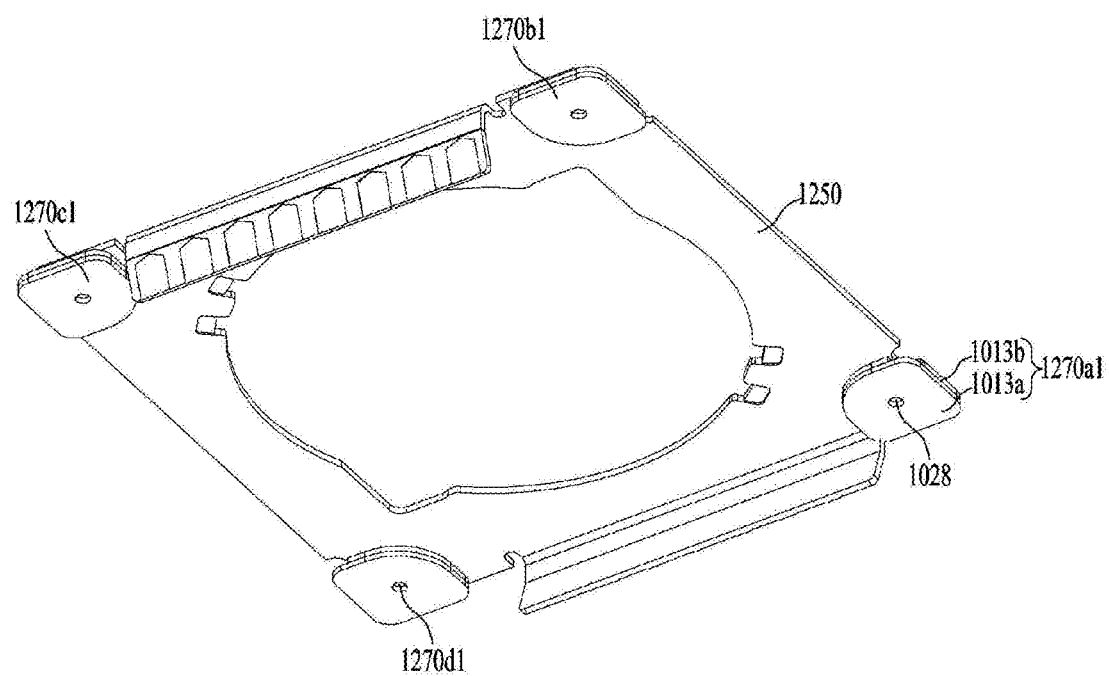
FIG. 38 illustrates terminal portions according to another embodiment.
Figure 39:
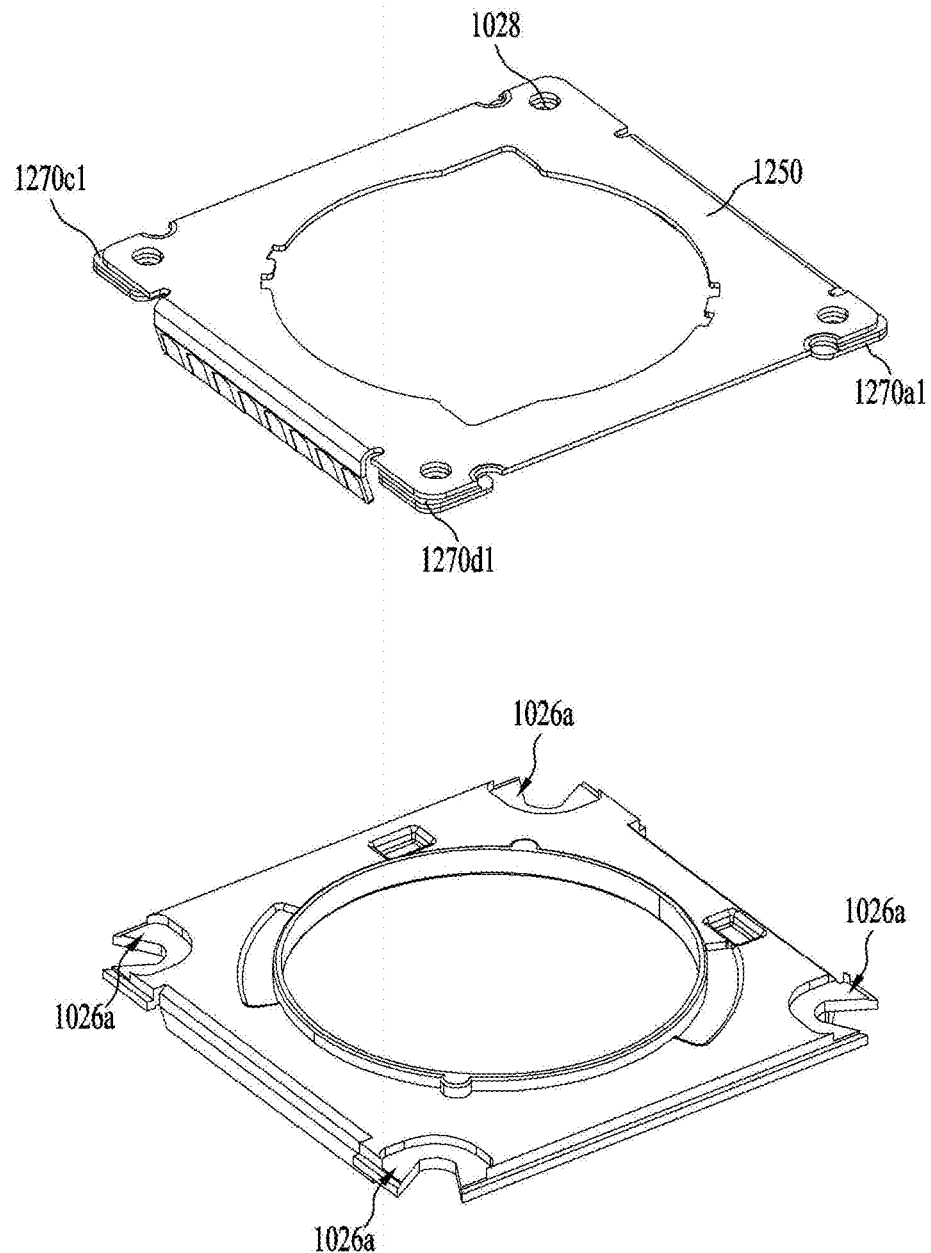
FIG. 39 illustrates stepped portions of the base, to which the terminal portions shown in FIG. 38 are mounted.

FIG. 38 illustrates terminal portions 1270a1 to 1270d1 according to another embodiment. FIG. 39 illustrates stepped portions 1026a of the base 1210, to which the terminal portions shown in FIG. 38 are mounted.

Referring to FIGS. 38 and 39, the terminal portions 1270a1 to 1270d1 may be disposed, mounted, coupled or secured to the lower surface of the circuit board 1250.

Although the terminal portions 1270a1 to 1270d1 and the base 1210 are coupled to each other by means of the protrusions 1027 of the base 1210 in the embodiment shown in FIG. 33, the terminal portions 1270a1 to 1270d1 may be bonded or attached to the lower surface of the circuit board 1250 by means of an adhesive member in the embodiment shown in FIGS. 38 and 39. Furthermore, the protrusions 1027 shown in FIG. 33 may be omitted from the stepped portions 1026a of the base 1210. Except for omission of the protrusions 1027, the description of the stepped portions 1026 shown in FIG. 33 may be applied to the terminal portions 1026a shown in FIG. 39.

The terminal portions 1270a1 to 1270d1 coupled to the circuit board 1250 may be mounted on the stepped portions 1026a of the base 1210.

Generally, as the thickness of a cellular phone is decreased, the height of a camera module is also decreased. Furthermore, as the height of the camera module is decreased, the length of the OIS wire (for example, the above-mentioned support member) of the lens moving apparatus is decreased, and thus power consumption may be increased due to the decreased length of the OIS wire. Decreasing the diameter of the OIS wire in order to inhibit the increase in power consumption entails concerns about disconnection of the OIS wire and deterioration in reliability of OIS driving.

According to the embodiment, since additional terminal portions 1270a to 1270d are disposed on the lower surface of the circuit board 1250 and the support members 1220 are coupled to the lower surfaces of the terminal portions, it is possible to increase the length of the support members 1220. Consequently, it is possible to reduce power consumption by reducing the intensity of current flowing through the support members 1220-1 to 1220-4 and to inhibit deterioration in reliability of OIS driving attributable to the decreased diameter of the support members.

Figure 40:
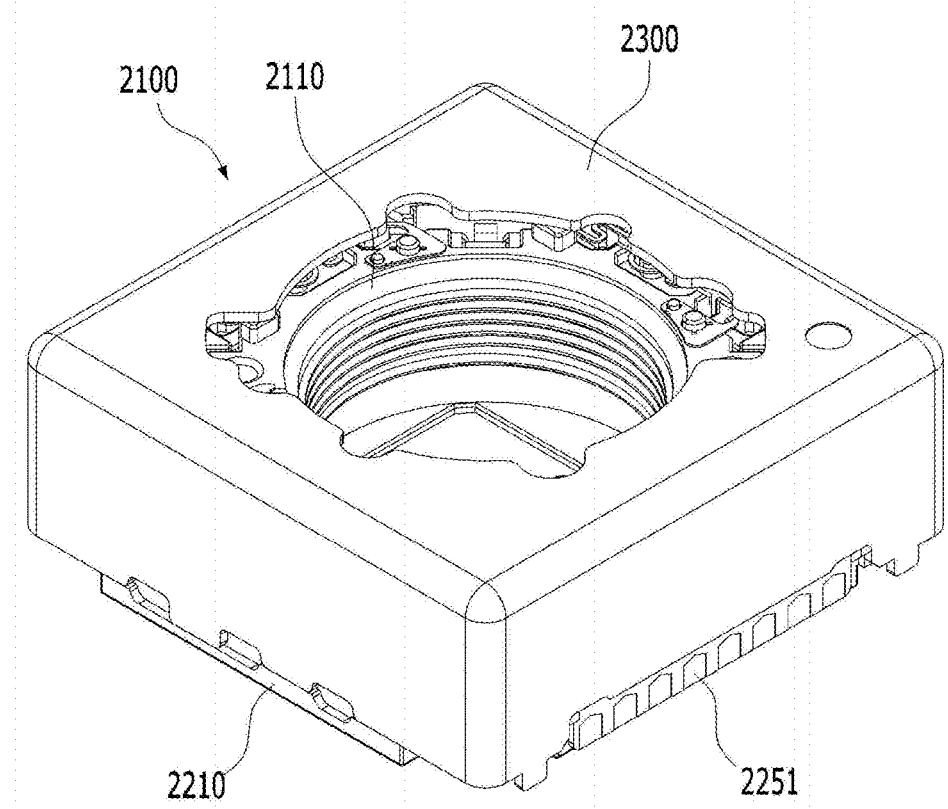
FIG. 40 is a perspective view of a lens moving apparatus according to a further embodiment.
Figure 41:
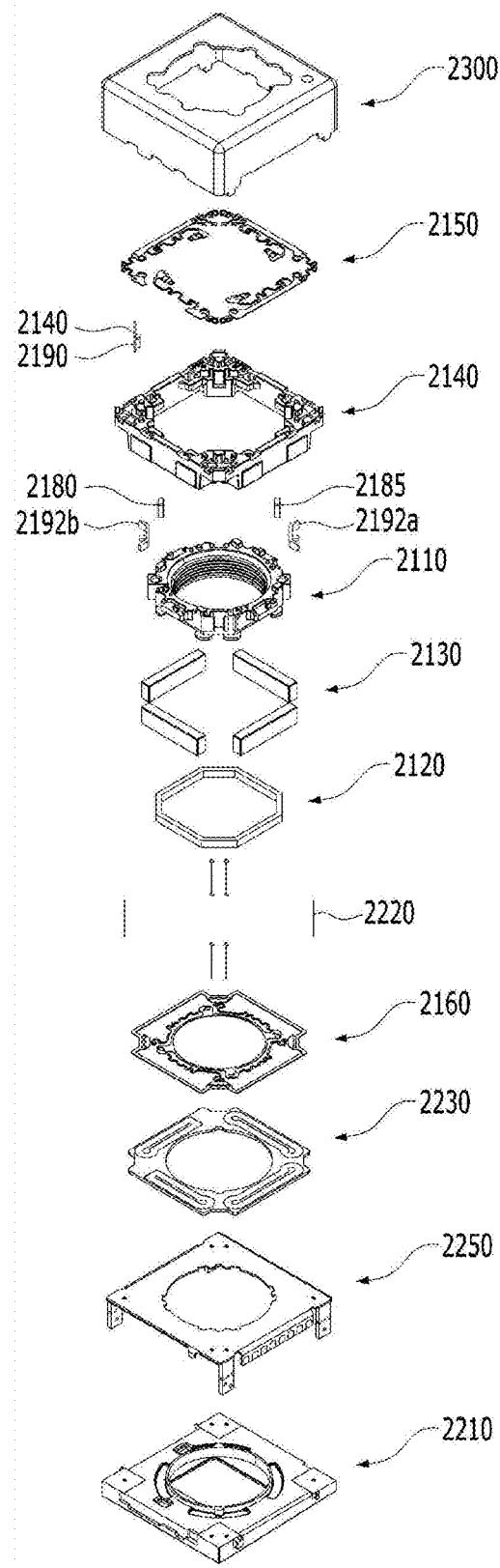
FIG. 41 is an exploded view of the lens moving apparatus shown in FIG. 40.
Figure 42:
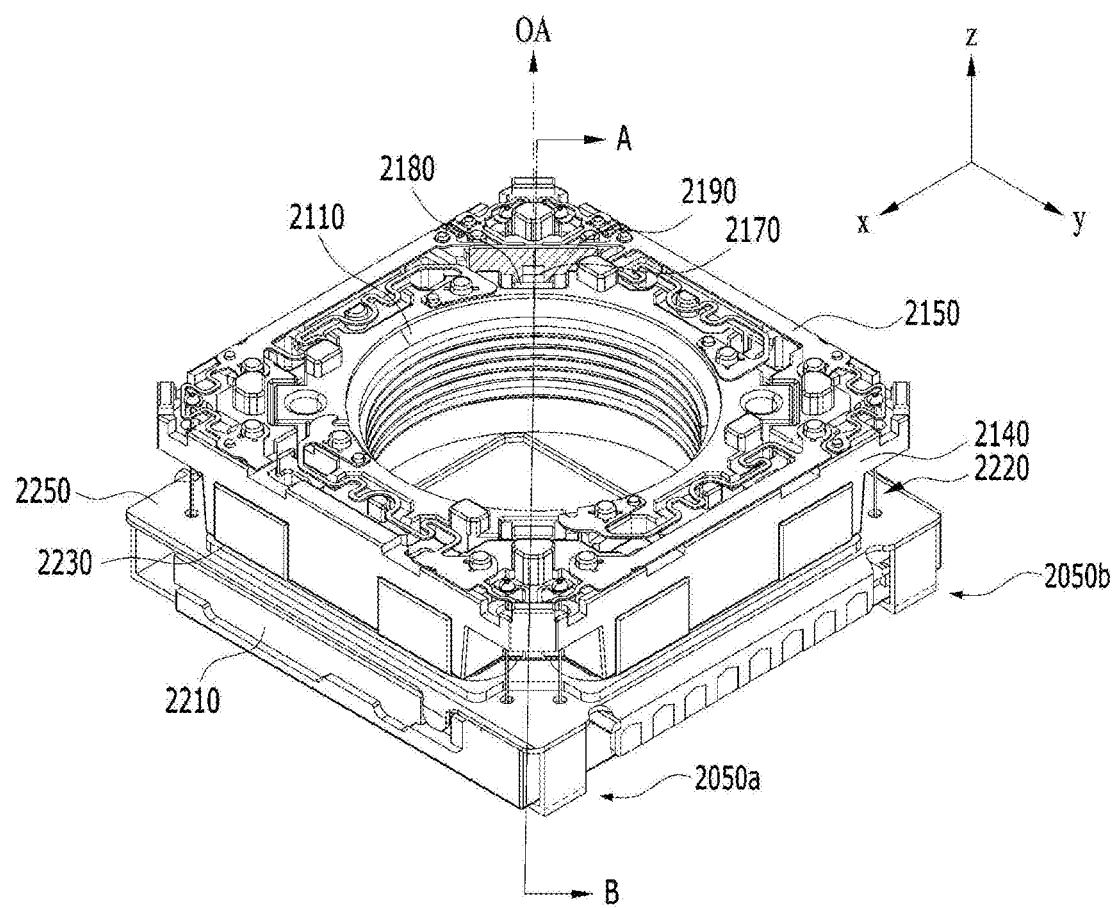
FIG. 42 is an assembled perspective view of the lens moving apparatus shown in FIG. 40, from which a cover member is removed.

FIG. 40 is a perspective view of a lens moving apparatus 2100 according to an embodiment. FIG. 41 is an exploded view of the lens moving apparatus 2100 shown in FIG. 40. FIG. 42 is an assembled perspective view of the lens moving apparatus 2100 shown in FIG. 40, from which a cover member 2300 is removed.

Referring to FIGS. 40 to 42, the lens moving apparatus 2100 may include a bobbin 2110, a first coil 2120, first magnets 2130, a housing 2140, an upper elastic member 2150, a lower elastic member 2160, support members 2220, a circuit board 2250 and a base 2210.

The lens moving apparatus 2100 may further include a circuit board 2190, a first position sensor 2170, a second magnet 2180 and a third magnet 2185.

The lens moving apparatus 2100 may further include a second coil 2230 for optical image stabilize (OIS) driving, and a second position sensor 2240 for OIS feedback driving. The lens moving apparatus 2100 may further include a cover member 2300. The lens moving apparatus 2100 may further include first and second yokes 2192a and 2192b coupled to the housing 2140.

The cover member 2300 will first be described.

The cover member 2300 accommodates the components 2110, 2120, 2130, 2140, 2150, 2160, 2170, 2220, 2230 and 2250 in the space defined between the cover member 2300 and the base 2210.

The cover member 2300 may be configured to have a box shape, which is open at the bottom and includes a top plate and side plates. The lower portion of the cover member 2300 may be coupled to the upper portion of the base 2210. The top plate of the cover member 2300 may have a polygonal shape, for example, a square shape, an octagonal shape or the like.

The description of the cover member 300 shown in FIG. 2 may also be applied to the cover member 2300.

Next, the bobbin 2110 will be described.

The bobbin 2110 may be provided with a lens or a lens barrel mounted thereon, and may be disposed inside the housing 2140. The bobbin 2110 may be configured to have an opening so as to allow the lens or the lens barrel to be mounted therein. Although the opening may have a circular shape, an elliptical shape or a polygonal shape, the disclosure is not limited thereto.

Figure 43:
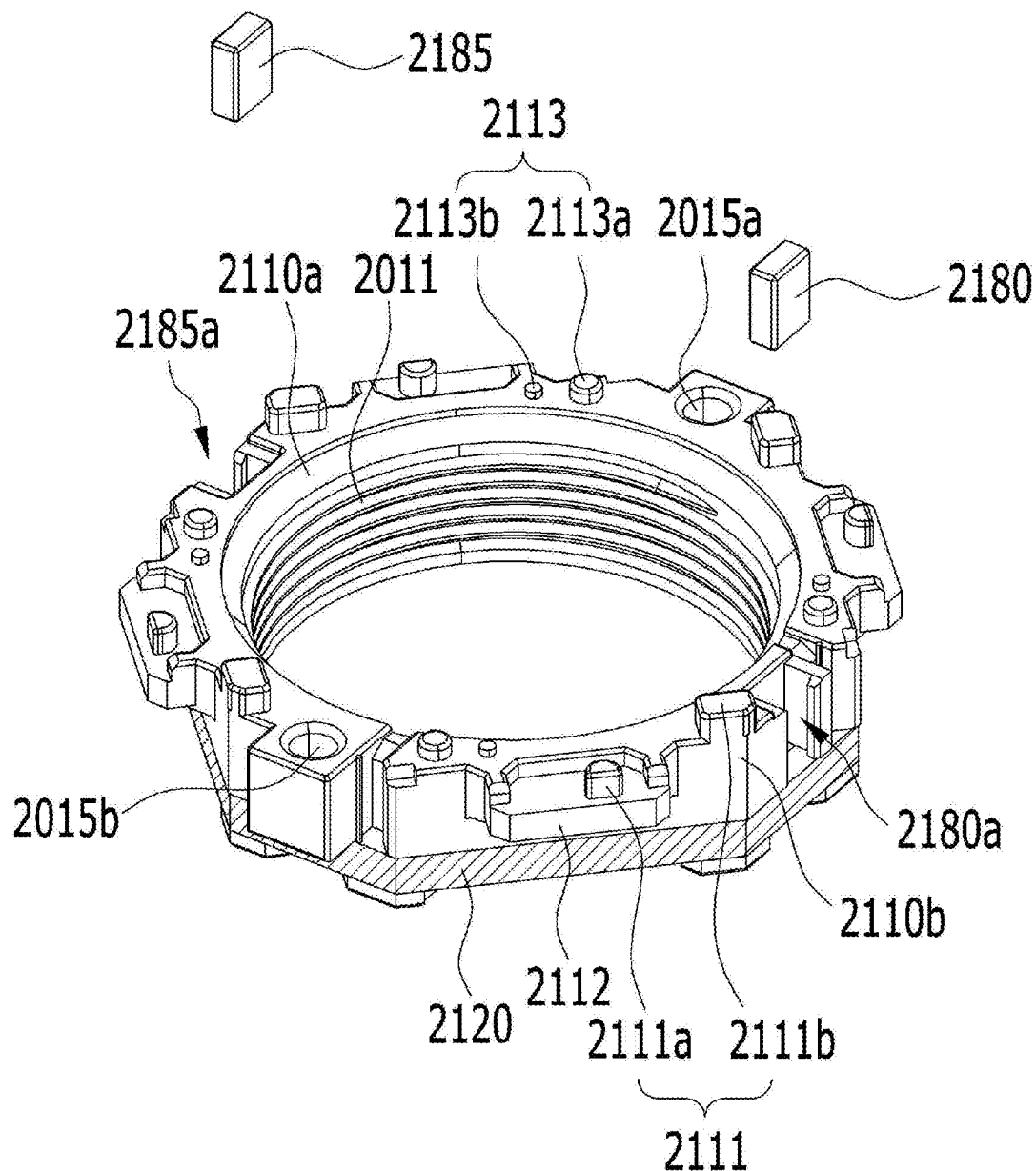
FIG. 43 is a perspective view of the bobbin, the second magnet and the third magnet, which are shown in FIG. 40.
Figure 44:
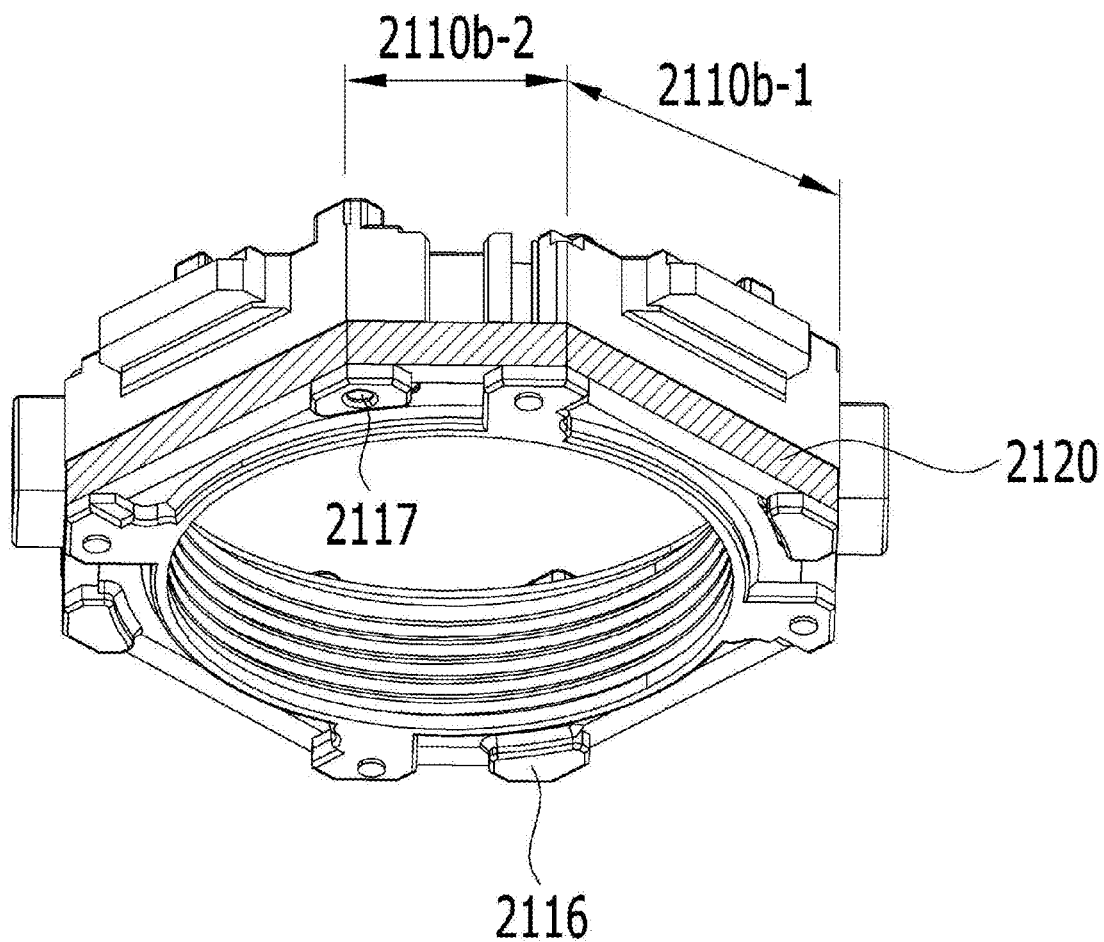
FIG. 44 is a bottom perspective view of the bobbin and the first coil, which are shown in FIG. 43.

FIG. 43 is a perspective view of the bobbin 2110, the second magnet 2180 and the third magnet 2140, which are shown in FIG. 40. FIG. 44 is a bottom perspective view of the bobbin 2110 and the first coil 2120, which are shown in FIG. 43.

Referring to FIGS. 43 and 44, the bobbin 2110 may include first projections 2111 and second projections 2112 projecting from the outer surface of the bobbin 2110 in the second and/or third direction.

Each of the first projections 2111 of the bobbin 2110 may include a first guide portion 2111a and a first stopper 2111b. The first guide portion 2111a of the bobbin 2110 may serve to guide the position of the upper elastic member 2150. For example, the first guide portion 2111a of the bobbin 2110 may guide a frame connector 2153 of the upper elastic member 2150.

The second projections 2112 of the bobbin 2110 may project from the outer surface of the bobbin 2110 in the second and/or third direction.

The first stoppers 2111b and the second projections 2112 of the bobbin 2110 may inhibit the upper and/or side surfaces of the bobbin 2110 from directly colliding with the inner surface of the cover member 2300 even though the bobbin 2110 is moved beyond a specified range due to external impact or the like when the bobbin 2110 is moved in the first direction in order to perform an autofocus function.

The bobbin 2110 may include second stoppers 2116 projecting from the lower surface thereof. The second stoppers 2116 of the bobbin may inhibit the lower surface of the bobbin 2110 from directly colliding with the base 2210, the second coil 2230 or the circuit board 2250 even if the bobbin 2110 is moved beyond a specified range due to external impact when the bobbin 2110 is moved in the first direction in order to perform an autofocus function.

The bobbin 2110 may include first side portions 2110b-1 and second side portions 2110b-2 positioned between the first side portions 2110b-1.

The first side portions 2110b-1 of the bobbin 2110 may correspond to or face the first magnets 2130. Each of the second side portions 2110b-2 of the bobbin 2110 may be disposed between two adjacent side members.

The bobbin 2110 may have at least one first coil groove (not shown) formed in the outer surface 2110b thereof, in which the first coil 2120 is disposed or mounted. For example, the first coil groove may be formed in the first side portions 2110b-1 and the second side portions 2110b-2 of the bobbin 2110.

The shape and number of first coil groove may correspond to The shape and number of first coil 2120 disposed on the outer surface 2110b of the bobbin 2110. Although the first coil groove formed in the first side portions 2110b-1 and the second side portions 2110b-2 of the bobbin 2110 may have a ring shape, the disclosure is not limited thereto.

In another embodiment, the bobbin 2110 may not have the first coil groove, and the first coil 2120 may be directly wound around the outer surface 2110b of the bobbin 2110 and may be secured thereto.

The bobbin 2110 may have a second magnet-mounting groove 2180a, in which the second magnet 2180 is mounted, fitted, secured or disposed, and a third magnet-mounting groove 2185a, in which the third magnet 2185 is mounted, fitted, secured or disposed.

The second magnet-mounting groove 2180a and the third magnet-mounting groove 2185a may be disposed on two members selected from the first side portions of the bobbin 2110.

For example, although the third magnet-mounting groove 2185a may be disposed so as to face the second magnet-mounting groove 2180a, the disclosure is not limited thereto.

For example, although the second magnet-mounting groove 2180a and the third magnet-mounting groove 2185a may be positioned above the first coil groove, the disclosure is not limited thereto.

The bobbin 2110 may be provided on the upper surface thereof with first upper support protrusions 2113, which are coupled to holes 2151a in the first inner frame 2151 of the upper elastic member 2150.

Although the first upper support protrusions 2113 may be provided on the upper surfaces of the first side portions 2110b-1, the disclosure is not limited thereto.

For example, each of the first upper support protrusions 2113 may include a first upper protrusion 2113a and a second upper protrusion 2113b. Each of the first side portions 2110b-1 of the bobbin 2110 may be provided with the first upper protrusion 2113a and the second upper protrusions 2113b, which are spaced apart from each other.

Although the first upper protrusions 2113a are intended to be fused to the first inner frames 2151 of the upper elastic member 2150 and the second upper protrusions 2113b are intended to be conductively connected to the first inner frames 215 of the upper elastic member 2150 via a solder or a conductive adhesive member, the disclosure is not limited thereto. For example, the diameter of each of the first upper protrusions 2113a may be larger than the diameter of each of the second upper protrusions 2113b.

The bobbin 2110 may be provided in the lower surface thereof with a first lower coupling groove 2117, which is coupled and secured to a hole 2161a in the lower elastic member 2160. In another embodiment, the bobbin 2110 may be provided on the lower surface thereof with support protrusions for coupling with the hole 2161a in the lower elastic member 2160.

The bobbin 2110 may be provided in the inner peripheral surface 2110a thereof with a threaded line 2011 for coupling with a lens or a lens barrel. The threaded line 2011 may be formed in the inner peripheral surface of the bobbin 2110 in the state in which the bobbin 2110 is held by means of a jig, and the upper surface of the bobbin 2110 may have jig-holding grooves 2015a and 2015b formed therein. For example, the jig-holding grooves 2015a and 2015b may be provided in upper surfaces of second side portions 2110b-2 that are opposite each other, without being limited thereto.

Next, the first coil 2120 will be described.

The first coil 2120 may be a drive coil, which is disposed on the outer peripheral surface 2110b of the bobbin 2110 so as to electromagnetically interact with the magnets 2130 disposed on the housing 2140.

In order to create electromagnetic force through interaction with the first magnets 2130, a drive signal (for example, drive current or voltage) may be applied to the first coil 2120.

The drive signal applied to the first coil 2120 may be an AC signal (for example, AC current) or a DC signal (for example, DC current). In another embodiment, the drive signal applied to the first coil 2120 may include an AC signal and a DC signal. For example, the AC signal may be a sinusoidal wave signal or a pulse signal (for example, a pulse width modulation (PWM) signal).

An AF movable unit may be moved in the first direction by virtue of electromagnetic force resulting from the interaction between the first coil 2120 and the first magnets 2130. By controlling the intensity and/or polarity of the drive signal applied to the first coil 2120 (for example, the direction in which current flows) and thus controlling the intensity and/or direction of electromagnetic force resulting from the interaction between the first coil 2120 and the magnets 2130, it is possible to control the movement of the AF movable unit in the first direction, thereby performing an autofocus function.

The AF movable unit may include the bobbin 2110, which is elastically supported by the upper and lower elastic members 2150 and 2160, and components that are mounted on the bobbin 110 and are moved therewith. For example, the AF movable unit may include the bobbin 2110, the first coil 2120, second and third magnets 2180 and 2185 and a lens (not shown) mounted on the bobbin s110.

The first coil 2120 may be wound or disposed around the outer peripheral surface 2110b of the bobbin 2110 in a clockwise or counterclockwise direction about the optical axis. In another embodiment, the first coil 2120 may be embodied as a coil ring, which is wound or disposed in a clockwise or counterclockwise direction about an axis perpendicular to the optical axis. Although the number of coil ring may be equal to the number of first magnet 2130, the disclosure is not limited thereto.

The first coil 2120 may be conductively connected to at least one of the upper elastic member 2150 or the lower elastic member 2160, and may be conductively connected to the circuit board 2250 via the upper elastic member 2150 or the lower elastic member 2160 and the support members 2220.

For example, the first coil 2120 may be coupled to bonding portions 2022a and 2022b (see FIG. 48), which are provided at the first inner frame 2151 of each of the second and third upper springs 2150-2 and 2150-3.

Although the first coil 2120 disposed on the bobbin 2110, the second magnet 2180 disposed on the bobbin 2110 and the third magnet 2185 may be spaced apart from one another in a direction perpendicular to the optical axis OA, the disclosure is not limited thereto. In another embodiment, each of the second magnet 2180 disposed on the bobbin 2110 and the third magnet 2185 may be brought into contact with the first coil 2120.

Next, the housing 2140 will be described.

The housing 2140 accommodates therein the bobbin 2110, with the first coil 2120 disposed thereon.

Figure 45A:
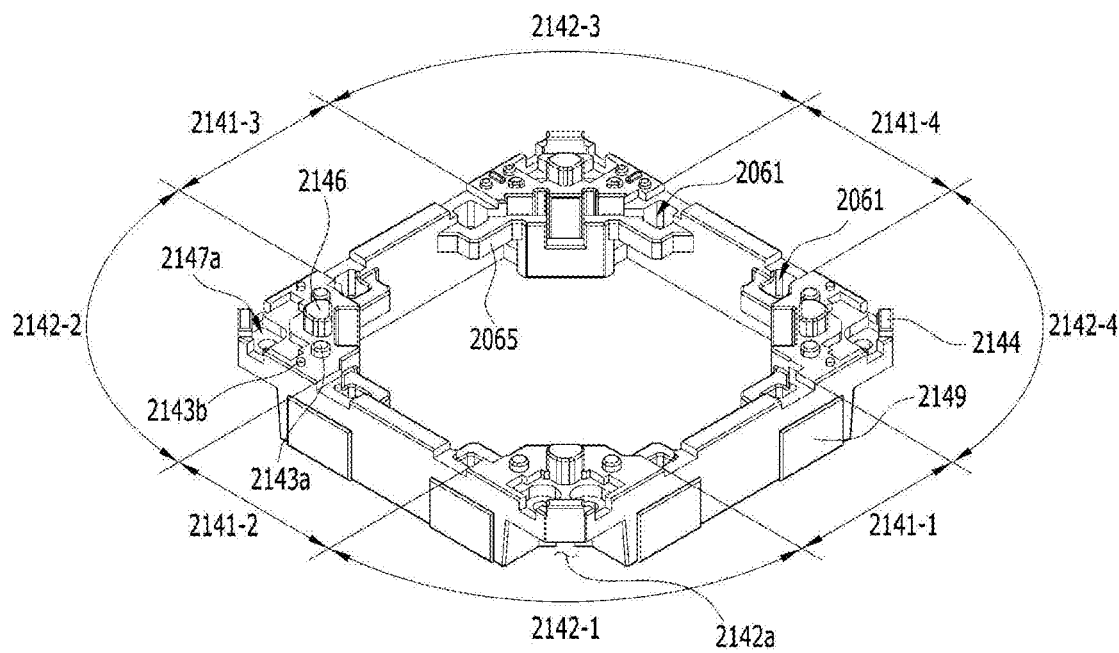
FIG. 45A is a first perspective view of the housing shown in FIG. 40.
Figure 45B:
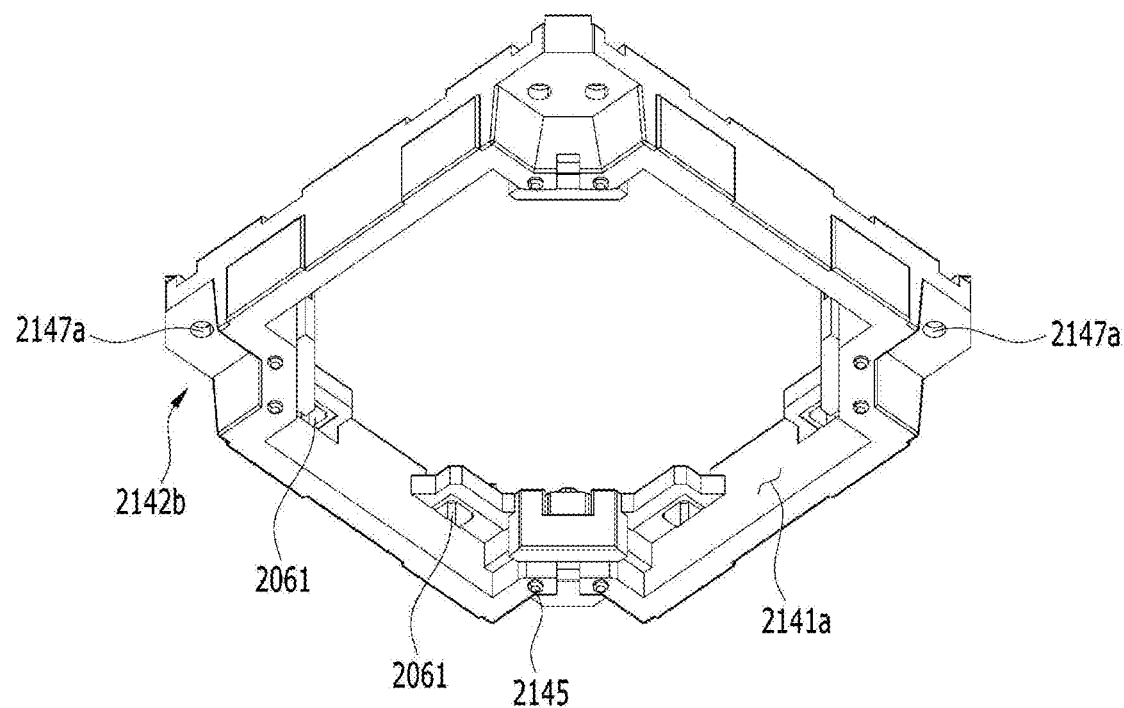
FIG. 45B is a second perspective view of the housing shown in FIG. 40.

FIG. 45A is a first perspective view of the housing 2140 shown in FIG. 40. FIG. 45B is a second perspective view of the housing 2140 shown in FIG. 40. FIG. 46A is a perspective view of the housing 2140, the first position sensor 2170 and the circuit board 2190, which are shown in FIG. 40. FIG. 46B is a perspective view of the housing 2140, the first position sensor 2170, the circuit board 2190 and the first and second yokes 2192a and 2192b, which are shown in FIG. 40.

Referring to FIGS. 45A to 46B, the housing 2140 may be configured to have the overall shape of a cylinder having an opening therein, and may include a plurality of side members and corner portions.

For example, the housing 2140 may include the side members 2141-1 to 2141-4, which are spaced apart from each other, and the corner portions 2142-1 to 2142-4, which are spaced apart from each other.

Each of the side members 2141-1 to 2141-4 of the housing 2140 may be disposed or positioned between two adjacent corner portions 2142-1 and 2142-2, 2142-2 and 2142-3, 2142-3 and 2142-4, and 2142-4 and 2142-1 so as to connect the two adjacent corner portions 2142-1 and 2142-2, 2142-2 and 2142-3, 2142-3 and 2142-4, and 2142-4 and 2142-1 to each other, and may include a flat surface having a predetermined depth.

Although the side members 2141-1 to 2141-4 of the housing 2140 may correspond to the first side portions 2110b-1, and the corner portions 2142-1 to 2142-4 of the housing 2140 may correspond to the second side portions 2110b-2 of the bobbin 2110, the disclosure is not limited thereto.

The first magnets 2130; 2130-1 to 2130-4 may be disposed or mounted on the side members (for example, 2141-1 to 2141-4) of the housing 2140, and the support members 2220 may be disposed on the corner portions 2142-1 to 2142-4 of the housing 2140.

The housing 2140 may include magnet mounts 214a, which are provided on the inner surfaces of the side members 2141-1 to 2141-4 so as to support or receive the first magnets 2130-1 to 2130-4.

The side members 2141-1 to 2141-4 of the housing 2140 may be provided with grooves 2061, into which adhesive for attaching the first magnets 2130-1 to 2130-4 to the magnet mounts 2141a of the housing 2140 is introduced.

The side members 2141 of the housing 2140 may be disposed so as to be parallel to the respective side plates of the cover member 2300. The corner portions 2142-1 to 2142-4 of the housing 2140 may be provided with holes 2147a, through which respective support members 2220 extend. Although each of the holes 2147a may have a constant diameter, the disclosure is not limited thereto. In another embodiment, the diameter of the holes 2147a gradually increases moving toward the lower surface from the upper surface of the housing 2140 in order to facilitate the application of a damper.

Furthermore, in order to inhibit the housing 2140 from directly colliding with the inner surface of the cover member 2300, the upper surface of the housing 2140 may be provided with second stoppers 2144. For example, although the second stoppers 2144 may be disposed on the respective corners of the corner portions 2142-1 to 2142-4 of the housing 2140, the disclosure is not limited thereto.

Furthermore, the upper surface of the housing 2140 may be provided with second guide portions 2146, which serve to guide positioning of the first outer frames 2152 of the upper elastic member 2150 when the upper elastic member 2150 is disposed on the upper surface of the housing 2140.

The second guide portions 2146 may be disposed on the corner portions 2141-1 to 2141-4 of the housing 2140 so as to be spaced apart from the second stoppers 2144. For example, the second guide portion 2146 and the second stopper 2144 may face each other in a diagonal direction. Here, the diagonal direction may be a direction toward one of the second stoppers 2144 from the center of the housing 2140. The second guide portion 2146 may serve as a stopper.

The housing 2140 may include one or more second upper protrusions 2143a and 2143b, which are disposed on the upper surfaces of the corner portions 2142-1 to 2142-4 so as to be coupled to holes 2152a and 2152b in the first outer frames 2152 of the upper elastic member 2150.

The second upper protrusions 2143a and 2143b may be disposed on at least one upper surface of the corner portions 2142-1 to 2142-4 of the housing 2140. For example, the second upper protrusions 2143a and 2143b may be disposed at at least one of both sides of each of the second guide portions 2146.

Furthermore, the housing 2140 may include one or more second lower protrusions 2145, which are disposed on the lower surfaces of the corner portions 2142-1 to 2142-4 for coupling and securing with the holes 2162a in the second outer frames 2162 of the lower elastic member 2160. For example, although the second lower protrusions 2145 may be disposed on at least one lower surface of the corner portions 2142-1 to 2142-4 of the housing 2140, the disclosure is not limited thereto.

In order not only to ensure paths, through which the support members 2220 extend, but also to ensure spaces, in which silicone capable of serving to perform a damping function is charged, the housing 2140 may have recesses 2142a formed in lower portions of the corner portions 2142-1 to 2142-4. For example, the recesses 2142a in the housing 2140 may be filled with damping silicone.

The housing 2140 may include third stoppers 2149, which project from the outer surface of the side members 2141-1 to 2141-4 in the second or third direction. The third stoppers 2149 serve to inhibit the housing 2140 from colliding with the inner surfaces of the side plates of the cover member 2300 when the housing 2140 is moved in the second or third direction.

In order to inhibit the bottom surface of the housing 2140 from colliding with the base 2210, the second coil 2230 and/or the circuit board 2250, which will be described later, the housing 2140 may further include a fourth stopper (not shown), which projects from the lower surface of the housing 2140.

Referring to FIG. 46A, the housing 2140 may have a first groove 2014a for receiving the circuit board 2190 therein and a second groove 2014b for receiving the first position sensor 2170 therein.

The first groove 2014a may be formed in the upper portion or the upper end of one of the corner portions 2142-1 to 2142-4 of the housing 2140. In order to facilitate mounting of the circuit board 2190, the first groove 2104a may have a groove shape, which is open at the upper face thereof and has a side surface and a bottom. The side surface of the first groove 2014a may have a shape that corresponds to or coincides with the shape of the circuit board 2190.

The second groove 2014b may be formed in the inner surface of one of the corner portions 2142-1 to 2142-4 of the housing 2130. Although the second groove 2014b may have an opening that is open inwards and communicates with the first groove 2014a, the disclosure is not limited thereto.

In order to facilitate mounting of the first position sensor 2170, the second groove 2014b may have an opening that is open at the upper surface and the side surface thereof. The second groove 2014b may have a shape that corresponds to or coincides with the shape of the first position sensor 2170.

The first magnet 2130 may be secured to the first magnet mount 2141a of the housing 140 by means of an adhesive member such as an adhesive or a double-sided adhesive tape, and the circuit board 2190 may be secured to the first groove 2014a in the housing 2140 by means of an adhesive.

The one of the corner portions of the housing 2140 that faces the second magnet 2180 may be provided in the lower portion thereof with a first yoke-mounting groove 2035a, in which the first yoke 2192a is disposed, and the one among the corner portions of the housing 2140 that faces the third magnet 2185 may be provided in the lower portion thereof with a second yoke-mounting groove 2035b, in which the second yoke 2192b is disposed.

Next, the first magnets 2130 will be described.

The first magnets 2130 may be disposed on the housing 2140 so as to overlap, at at least a portion thereof, the first coil 2120 in the second or third direction perpendicular to the optical axis OA, when the bobbin 2110 is in the initial position. For example, the first magnets 2130 may be received or disposed in the magnet mount 2141a of the housing 2140. The description of the initial position of the bobbin 2110 has been given above.

In another embodiment, the first magnets 2130 may be disposed on the outer surfaces of the side members 2141-1 to 2141-4 of the housing 2140. In a further embodiment, the first magnets 2130 may be disposed on the inner surfaces or the outer surfaces of the corner portions 2142-1 to 2142-4 of the housing 2140.

Although each of the first magnets 2130 may have a rectangular parallelepiped shape, which corresponds to the shape of each of the side members 2141-1 to 2141-4 of the housing 2140, the disclosure is not limited thereto. The surface of the first magnet 2130 that faces the first coil 2120 may have a curvature that corresponds to or coincides with the curvature of a corresponding surface of the first coil 2120.

The first magnets 2130 may be integrally constructed such that the surface of the first magnet 2130 that faces the first coil 2120 becomes an S pole and the opposite surface of the first magnet 2130 becomes an N pole. However, the disclosure is not limited thereto, and the reversed configuration is also possible.

Two or more of the first magnets 2130 may be disposed on the side members 2141-1 to 2141-4 of the housing 2140 that face each other, and may be positioned so as to face each other.

For example, the first magnets 2130-1 to 2130-4 may be disposed on the side members 2141-1 to 2141-4 of the housing 2140. Two pairs of first magnets 2130-1 to 2130-4, each pair of first magnets facing each other, may be disposed on the side members 2141-1 to 2141-4 of the housing 2140 so as to intersect each other. Here, although the flat surface of each of the first magnets 2130-1 to 2130-4 may have an approximately rectangular shape, the shape may also be a triangular shape or a rhombic shape.

Next, the second magnet 2180 and the third magnet 2185 will be described.

The second magnet 2180 may be disposed in the second magnet-mounting groove 2180a in the bobbin 2110. The third magnet 2185 may be disposed in the third magnet-mounting groove 2185a in the bobbin 2110.

Although a portion of one surface of the second magnet 2180 mounted in the second magnet-mounting groove 2180a and a portion of one surface of the third magnet 2185 mounted in the third magnet-mounting groove 2185a may be exposed from the outer surface of the bobbin 2110, the disclosure is not limited thereto. In another embodiment, they may not be exposed from the outer surface of the bobbin 2110.

Although the boundary plane between the N pole and the S pole of each of the second magnet 2180 and the third magnet 2185 may be parallel to a direction perpendicular to the optical axis, the disclosure is not limited thereto. In another embodiment, the boundary plane between the N pole and the S pole may be parallel to the optical axis.

The second magnet 2180 may be moved together with the bobbin 2110 in the optical-axis direction OA by the interaction between the first coil 2120 and the first magnets 2130. The first position sensor 2170 may detect the intensity of the magnetic field of the second magnet 2180, which is moved in the optical-axis direction, and may output a signal according to the result of the detection. For example, a controller 830 of a camera module or a controller 780 of a terminal may detect displacement of the bobbin 2110 in the optical-axis direction based on the signal output from the first position sensor 2170.

The third magnet 2185 may be a balancing magnet for achieving weight equilibrium with respect to the second magnet 2180. Since the third magnet 2185 and the second magnet 2180 are disposed in a bilaterally symmetrical position, it is possible to balance the weight of the AF movable unit and thus to perform accurate AF motion.

In another embodiment, the second magnet 2180 and the third magnet 2185 may be omitted, and the first position sensor may be mounted on the bobbin rather than on the housing. Furthermore, as the bobbin 2110 and the first position sensor are moved in the optical-axis direction by virtue of the interaction between the first coil 2120 and the first magnets 2130, the first position sensor may detect the intensity of the magnetic field of the first magnet, and may output a signal according to the result of the detection.

Next, the first position sensor 2170 and the circuit board 2190 will be described.

The first position sensor 2170 and the circuit board 2190 may be disposed on one of the corner portions 2142-1 to 2142-4 of the housing 2140 so as to correspond to the second magnet 2180.

For example, the first position sensor 2170 may face and overlap the second magnet 2180 in a direction perpendicular to the optical axis when the bobbin 2110 is in the initial position.

For example, the circuit board 2190 may be disposed in the first groove 2014a in the housing 2140. The first position sensor 2170 may be mounted on the circuit board 2190 disposed on the housing 2140.

The first position sensor 2170 may be disposed on the first surface of the circuit board 2190. The first surface of the circuit board 2190 mounted on the housing 2140 may be the surface that faces toward the inside of the housing 2140.

The first position sensor 2170 may be embodied as a driver integrated circuit (IC) including a hall sensor, or may be embodied as a position detection sensor, such as a hall sensor, alone.

The first position sensor 2170 may include two input terminals and two output terminals. The input terminals and the output terminals of the first position sensor 2170 may be conductively connected to a corresponding one of a first pad 2001, a second pad 2002, a third pad 2003 and a fourth pad 2004 of the circuit board 2190.

The circuit board 2190 may include circuit patterns or wires (not shown), which connect the first to fourth pads 2001 to 2004 provided on the second surface thereof and the first position sensor 2170 mounted on the first surface thereof to the first to fourth pads 2001 to 2004. For example, the second surface of the circuit board 2190 may be the surface opposite the first surface. For example, the circuit board 2190 may be a printed circuit board or an FPCB.

In another embodiment, although the first position sensor 2170 may be disposed on the lower surface of the circuit board 2190 and the first to fourth pads 2001 to 2004 may be provided on the upper surface of the circuit board 2190, the disclosure is not limited thereto.

For example, the first to fourth pads 2001 to 2004 of the circuit board 2190 may be conductively connected to the circuit board 2250 via the upper springs 2150-1, 2150-4 to 2150-4 and the support members 2220-3 and 2220-6, and the first position sensor 2170 may be conductively connected to the circuit board 2250.

Both ends of the first coil 2120 may be connected to the inner frames of the second and third upper springs 2150-2 and 2150-3, and may be conductively connected to the circuit board 2250 via the second and third upper springs 2150-2 and 2150-3 and the support members 2220-2 and 2220-3.

Next, the first yoke 2192a and the second yoke 2192b will be described.

Each of the first yoke 2192a and the second yoke 2192b may be disposed on one of the second side portions of the housing 2140 between two adjacent first magnets 2130-1 and 2130-2, and 2130-2 and 2130-4, thereby increasing the electromagnetic force between the first coil 2120 and the first magnets 2130-1 to 2130-4.

For example, each of the first yoke 2192a and the second yoke 2192b may include a yoke body 2192-1, a first bent portion 2192-2, a second bent portion 2192-2 and a projection 2192-4. The yoke body 2192-1 may have a shape corresponding to the shape of the yoke mount 2142 of the housing 2140, and may be disposed so as to contact the yoke mount 2014a, 2014b.

The first bent portion 2192-2 may be bent at one end of the yoke body 2192-1, and the second bent portion 2192-3 may be bent at the other end of the yoke body 2192-1. Each of the first and second bent portions 2192-2 and 2192-3 may be bent in one direction from the yoke body 2192-1. In order to increase the coupling force between the projection 2192-4 and the housing 2140, the projection 2192-4 may be connected to a lower portion of the yoke body 2192-1 and may project from the yoke body 2192-1 in one direction.

Next, the upper elastic member 2150, the lower elastic member 2160 and the support members 2220 will be described.

The upper elastic member 2150 and the lower elastic member 2160 may be coupled both to the bobbin 2110 and to the housing 2140 so as to support the bobbin 2110.

For example, the upper elastic member 21150 may be coupled to the upper portion, the upper surface or the upper end of the bobbin 2110 and the upper portion, the upper surface or the upper end of the housing 2140, and the lower elastic member 2160 may be coupled to the lower portion, the lower surface or the lower end of the bobbin 2110 and the lower portion, the lower surface or the lower end of the housing 2140.

The support members 2220 may support the housing 2140 with respect to the base 2210, and may conductively connect at least one of the upper elastic member 2150 and the lower elastic member 2160 to the circuit board 2250.

Figure 47:
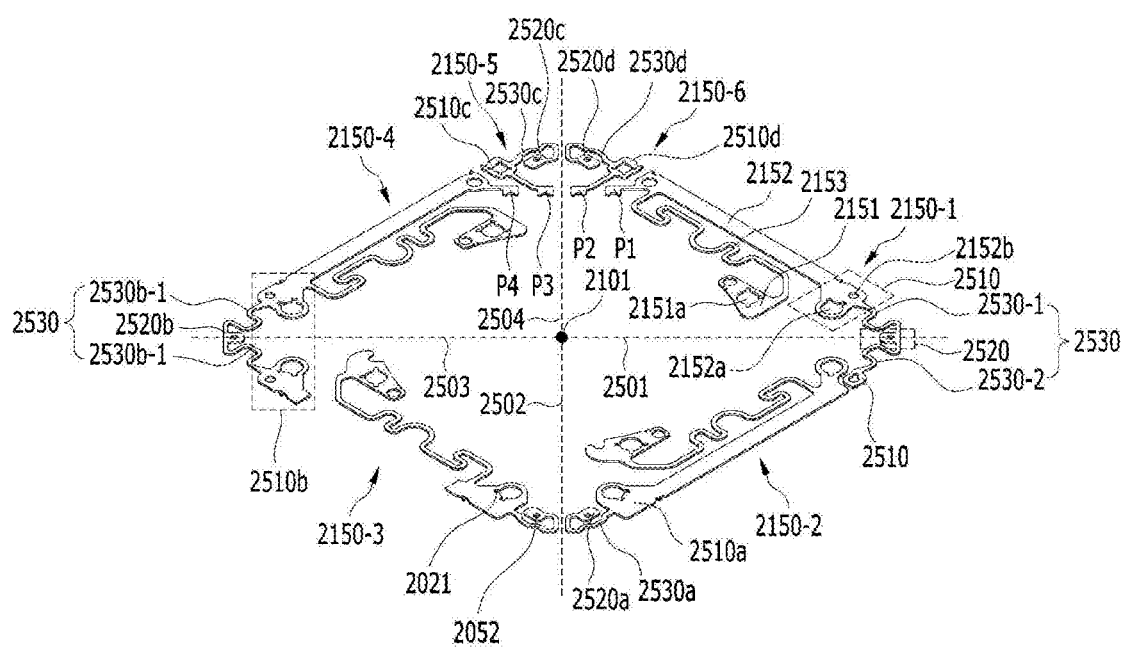
FIG. 47 is a perspective view of the upper elastic member shown in FIG. 40.
Figure 48:
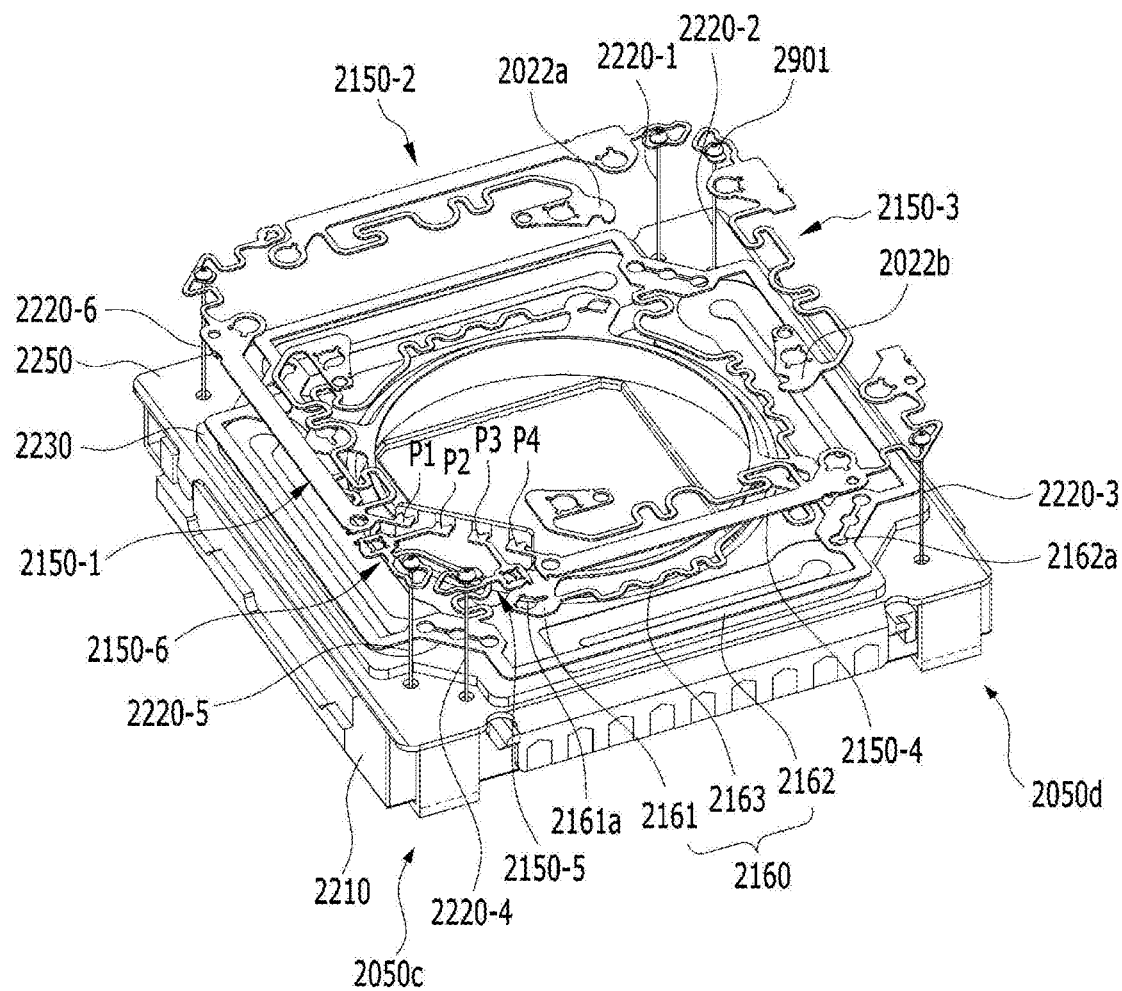
FIG. 48 is a perspective view of the upper elastic member, the lower elastic member, the second coil, the circuit board and the base, which are shown in FIG. 41.

FIG. 47 is a perspective view of the upper elastic member 2150 shown in FIG. 40. FIG. 48 is a perspective view of the upper elastic member 2150, the lower elastic member 2160, the second coil 2230, the circuit board 2250 and the base 2210, which are shown in FIG. 41.

Referring to FIGS. 47 and 48, at least one of the upper elastic member 2150 and the lower elastic member 2160 may be divided or separated into two or more members.

For example, the upper elastic member 2150 may include first to sixth upper springs 2150-1 to 2150-6, which are spaced apart from one another.

Although each of the upper elastic member 2150 and the lower elastic member 2160 may be embodied as a leaf spring, the disclosure is not limited thereto, and the member may also be embodied as a coil spring, a suspension wire or the like.

Each of the first to fourth upper springs 2150-1 to 2150-4 may include a first inner frame 2151 coupled to the upper portion, the upper surface or the upper end of the bobbin 2110, a first outer frame 2152 coupled to the upper portion, the upper surface or the upper end of the housing 2140, and a first frame connector 2153 connecting the first inner frame 2151 to the first outer frame 2152.

Each of the fifth and sixth upper springs 2150-5 and 2150-6 may include the first outer frame 2152, which is coupled to the upper portion, the upper surface or the upper end of the housing 2140.

Although each of the fifth and sixth upper springs 2150-5 and 2150-6 does not include the first inner frame or the first frame connector in FIG. 9, the disclosure is not limited thereto. In another embodiment, each of the fifth and sixth upper springs may include the first inner frame and the first frame connector.

The first outer frame 2152 of each of the first to sixth upper springs 2150-1 to 2150-6 may include first couplers 2520, 2520a to 2520d coupled the support members 2220-1 to 2220-6, second couplers 2510, 2510a to 2510d coupled to the corner portions 2142-1 to 2142-4 of the housing 2140, and connectors 2530, 2530a to 2530d connecting the first couplers 2520, 2520a to 2520d to the second couplers 2510, 2510a to 2510d.

The second couplers 2510, 2510a to 2510d may include at least one coupling region coupled to the corner portions 2142-1 to 2142-4 of the housing 2140.

For example, the second couplers 2510, 2510a to 2150d may include at least one coupling region including holes 2152a and 2152b, which are coupled to the second upper protrusions 2143a and 2143b of the housing 2140.

Although the coupling regions of the second couplers 2510, 2510a to 2510d of the first to sixth upper springs 2150-1 to 2150-6 may be bilaterally symmetrical with respect to a reference line (for example, 2501 to 2504) in order to support the housing 2140 in a balanced state without eccentricity, the disclosure is not limited thereto.

In the embodiment shown in FIG. 47, although each of the coupling regions of the second couplers 2510, 2510a to 2510d of the first to sixth upper springs 2150-1 to 2150-6 is embodied as including a hole, the disclosure is not limited thereto. In another embodiment, the coupling regions may be embodied as having various shapes suitable for coupling to the housing 2140, for example, grooves or the like.

For example, the holes 2152a in the second coupler 2510, 2510a to 2510d may have at least one slit (not shown), which allows an adhesive member to be introduced between the second upper protrusions 2143a and the holes 2152a.

For example, each of the second couplers 2510, 2510b of the first to fourth upper springs 2150-1 and 2150-4 may include a first coupling region positioned at one side of a corresponding one of the reference lines 2501 to 2504, and a second coupling region positioned at the other side of the corresponding one of the reference lines 2501 to 2504.

For example, each of the second couplers 2510a, 2510c and 2510d of the second, third, fifth and sixth upper springs 2150-2, 2150-3, 2150-5 and 2150-6 may include a coupling region positioned at one side of a corresponding one of the reference lines 2501 to 2504.

The first couplers 2520, 2520a to 2520d may have holes 2052, through which the support members 2220-1 to 2220-6 extend. The first ends of the support members 2220-1 to 2220-6, which extend through the holes 2052, may be coupled to the first couplers 2520, 2520a to 2520d via a conductive adhesive member or a solder 2901, and the first couplers 2520, 2520a to 2520d and the support members 2220-1 to 2220-6 may be conductively connected to each other.

Each of the first couplers 2520, 2520a to 2520d, which is a region at which the solder 2901 is disposed, may include the hole 2052 and a region around the hole 2052.

The connectors 2520, 2530a to 2530d may connect the coupling regions of the first couplers 2520, 2520a to 2520d and the second couplers 2510, 2510a to 2510d to each other.

For example, the connectors 2530, 2530b may include first connectors 2530-1, 2530b-1 connecting the first coupling regions of the second couplers 2510, 2510b of each of the first and fourth upper springs 2150-1 and 2150-4, and second connectors 2530-2, 2530b-2 connecting the second coupling regions of the second couplers 2510, 2510b to the first couplers 2520, 2520b.

Each of the second, third, fifth and sixth upper springs 2150-2, 2150-3, 2150-5 and 2150-6 may include one connecting region 2520a, 2530c, 2530d connecting the coupling regions of the second couplers 2510a, 2510c, 2510d to the first couplers 2520a, 2520c, 2520d.

Although each of the connecting regions 2530-1, 2530-2, 2530b1, 2530b2, 2530c, 2530d may include a bent portion, which is bent at least once, or a curved portion, which is curved at least once, the disclosure is not limited thereto. In another embodiment, the connecting regions may be linear.

Since the width of each of the connectors 2530, 2530a to 2530d may be smaller than the width of each of the second couplers 2510, 2510a to 2510d, the connectors 2530, 2530a to 2530d may be easily movable in the first direction, making it possible to distribute the stress applied to the upper elastic member 2150 and the stress applied to the support member 2220.

Although the connectors 2530, 2530a to 2530d may be bilaterally symmetrical with respect to the reference line in order to support the housing 2140 in a balanced state without eccentricity, the disclosure is not limited thereto. In another embodiment, the connectors may not be bilaterally symmetrical. The reference line 2501 to 2504 may be a line that extends through the center point 2101 (see FIG. 47) and through a corresponding one of the corners of the corner portions 2142-1 to 2142-4 of the housing 2140. Here, the center point 2101 may be the center of the housing 2140.

The first outer frame 2152 of each of the first and fourth to sixth upper springs 2150-1, 2150-4 to 2150-6 may include contacts P1 to P4, which are in contact with or connected to a corresponding one of the pads 2001 to 2004 of the circuit board 2190.

Each of the fifth upper spring 2150-5 and the sixth spring 2150-6 may include a contact P2, P3, which extends from the second coupler 2510c, 2510d.

Each of the first upper spring 2150-1 and the fourth upper spring 2150-4 may include a contact P1, P4, which extends from one end of the first outer frame coupled to a side member of the housing 2140.

Each of the contacts P1 to P4 may be brought into direct contact with a corresponding one of the pads 2001 to 2004 of the circuit board 2190, and each of the contacts P1 to P4 and a corresponding one of the pads 2001 to 2004 of the circuit board 2190 may be conductively connected to each other via a solder or the like.

The lower elastic member 2160 may include a second inner frame 2161 coupled to the lower portion, the lower surface or the lower end of the bobbin 2110, a second outer frame 2162 coupled to the lower portion, the lower surface or the lower end of the housing 2140, and a second frame connector 2163 connecting the second inner frame 2161 to the second outer frame 2162.

Furthermore, the lower elastic member 2160 may have therein a hole 2161a, which is formed in the second inner frame 2161 and which is coupled to the first lower coupling groove 2117 in the bobbin 2110 via a solder or a conductive adhesive member, and a hole 2162a, which is formed in the second outer frame 2162 and which is coupled to the second lower protrusion 2147 of the housing 2140.

Each of the first and second frame connectors 2153 and 2163 of the upper and lower elastic members 2150 and 2160 may be bent or curved (or rounded) at least once so as to define a predetermined pattern. The upward and/or downward movement of the bobbin 2110 in the first direction may be elastically (or flexibly) supported by virtue of positional variation and fine deformation of the first and second frame connectors 2153 and 2163.

In order to absorb or buffer vibrations of the bobbin 2110, the lens moving apparatus 2100 may further include a first damping member (not shown), which is disposed between each of the upper springs 2150-1 to 2150-6 and the housing 2140.

For example, a first damping member (not shown) may be disposed in the space between the first frame connector 2153 of each of the upper springs 2150-1 to 2150-6 and the housing 2140.

The lens moving apparatus 2100 may further include a second damping member (not shown), which is disposed between the second frame connector 2163 of the lower elastic member 2160 and the housing 2140.

The lens moving apparatus 2100 may further include a third damping member (not shown), which is disposed between the support member 2220 and the hole 2147a in the housing 2140.

The lens moving apparatus 2100 may further include a fourth damping member (not shown), which is disposed at the first coupler 2520, 2520a to 2520d and the first end of the support member 2220, and a fifth damping member (not shown), which is disposed at the second end of the support member 2220 and the circuit board 2250.

A damping member (not shown) may further be disposed between the inner surface of the housing 2140 and the outer peripheral surface of the bobbin 2110.

Next, the support members 2220 will be described.

The first ends of the support members 2220 may be coupled to the first outer frames 2152 of the upper elastic member 2150 via a solder or a conductive adhesive member, and the second ends of the support members 2220 may be coupled to a portion of the circuit board 2250, which is positioned on the lower surface of the base 2210 via a solder or a conductive adhesive member.

The support members 2220 may include a plurality of support members. Each of the plurality of support members 2220-1 to 2220-6 may be coupled to the first coupler 2520, 2520a to 2520d of a corresponding one of the first couplers 2520, 2520a to 2520d via the solder 2901, and may be conductively connected to the first coupler 2520. For example, the plurality of support members 2220-1 to 2220-6 may be disposed on four second side portions 2142.

The plurality of support members 2220-1 to 2220-6 may support the bobbin 2110 and the housing 2140 such that the bobbin 2110 and the housing 2140 are movable in a direction perpendicular to the first direction. Although one or two support members are disposed on each of the corner portions of the housing 2140 in FIGS. 42 and 48, the disclosure is not limited thereto.

In another embodiment, two or more support members may be disposed on each of the corner portions of the housing 2140, and one support member may be disposed on each of the corner portions of the housing 2140.

Each of the plurality of support members 2220-1 to 2220-6 may be spaced apart from the housing 2140, and may be directly connected to the first couplers 2520, 2520a to 2520*d* of the first outer frames of each of the upper springs 2150-1 to 2150-6 without being secured to the housing 2140.

The drive signal from the circuit board 2250 may be transmitted to the first coil 2120 via the plurality of support members 2220-1 to 2220-6 and the upper springs 2150-1 to 2150-6 and may be supplied to the first position sensor 2170, and the output signal of the first position sensor 2170 may be transmitted to the circuit board 2250.

For example, the drive signal from the circuit board 2250 may be supplied to the first coil 2120 through the second and third upper springs 2150-2 and 2150-3 and the first and second support members 2220-1 and 2220-2.

For example, the drive signal from the circuit board 2250 may be supplied to the first position sensor 2170 through the fourth and fifth upper springs 2150-4 and 2150-5 and the third and fourth support members 2220-4 and 2220-5, and the output signal of the first position sensor 2170 may be transmitted to the circuit board 2250 through the first and sixth upper springs 2150-1 and 2150-6 and the fifth and sixth support members 2220-5 and 2220-6.

The plurality of support members 2220-1 to 2220-6 may be made of members different from the upper elastic member 2150, and may be embodied as members capable of supporting an object, for example, leaf springs, coil springs, suspension wires or the like. In another embodiment, the support members 2220-1 to 2220-6 may be integrally formed with the upper elastic member 2150.

Next, the base 2210, the circuit board 2250, the second coil 2230 and the second position sensor 2240 will be described.

The base 2210 may have an opening, which corresponds to the opening in the bobbin 2110 and/or the opening in the housing 2140, and may have a shape that coincides with or corresponds to that of the cover member 2300, for example, a square shape.

Figure 49:
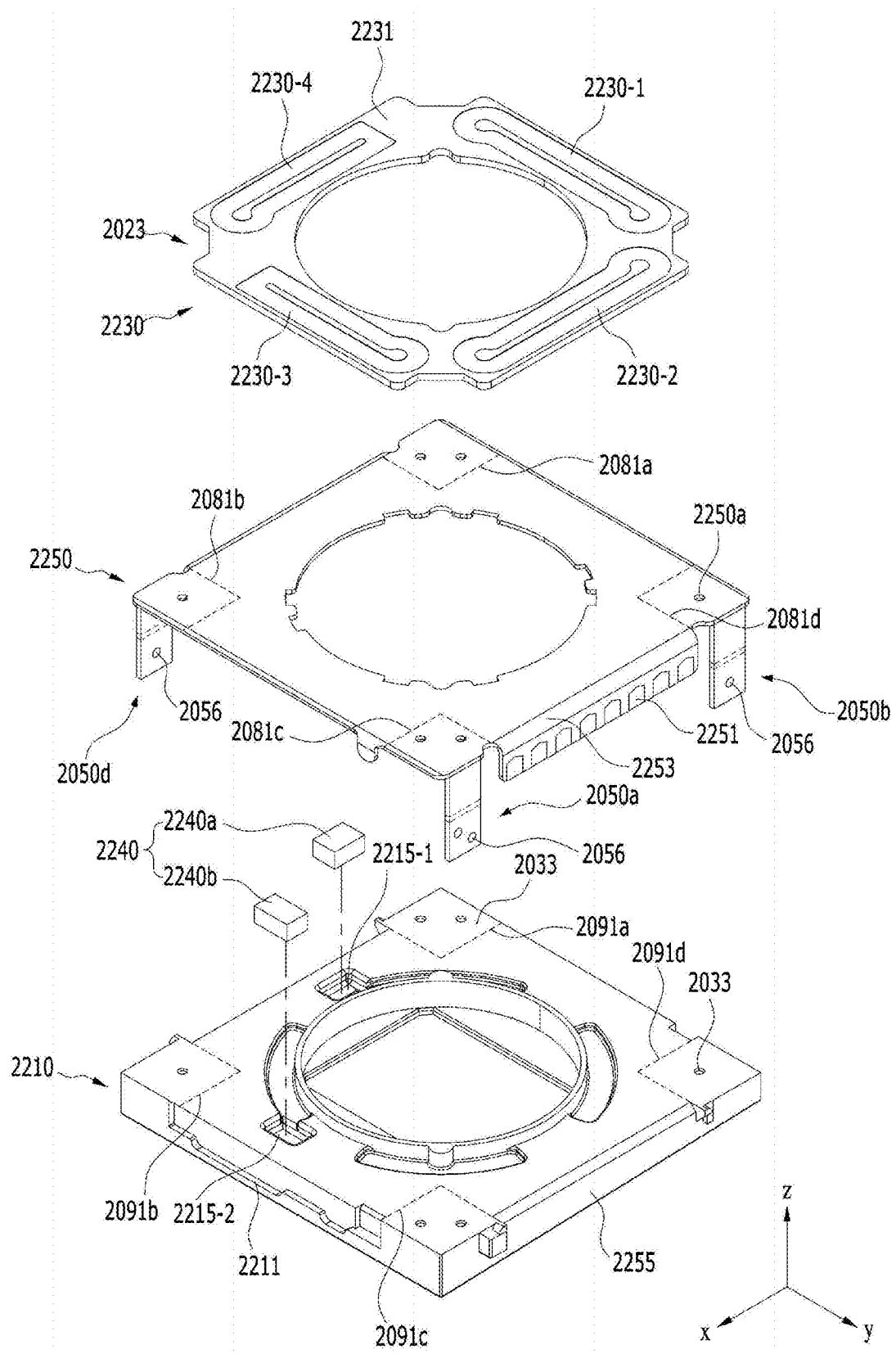
FIG. 49 is a perspective view of the second coil, the circuit board, the base and the second position sensor.
Figure 50A:
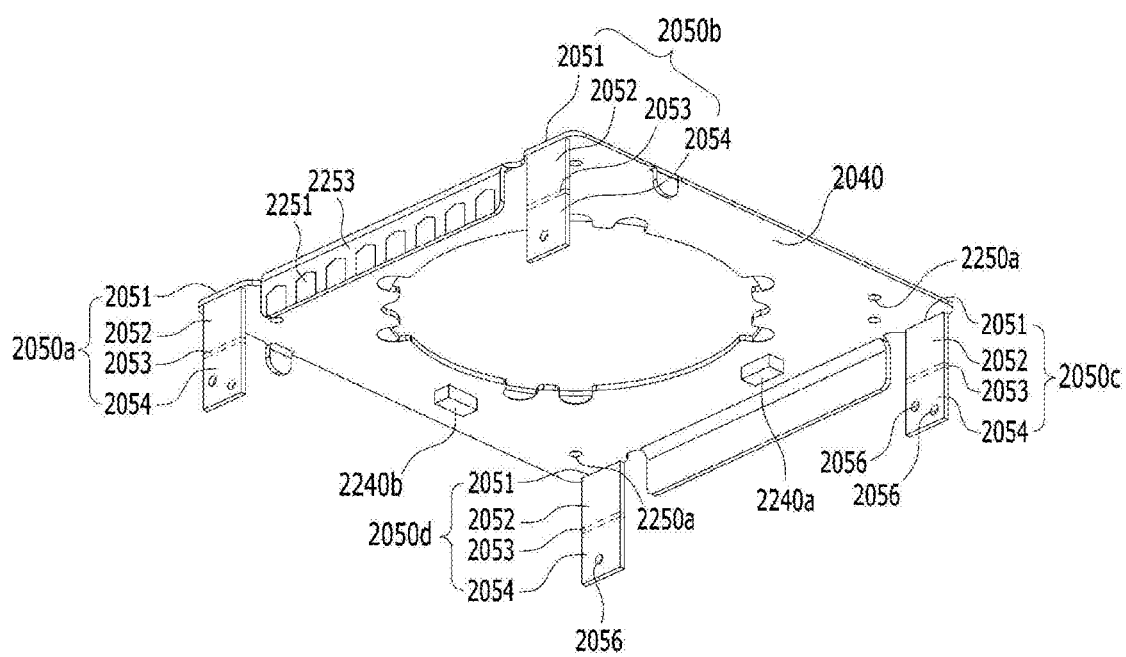
FIG. 50A is a bottom view of the circuit board shown in FIG. 49.
Figure 50B:
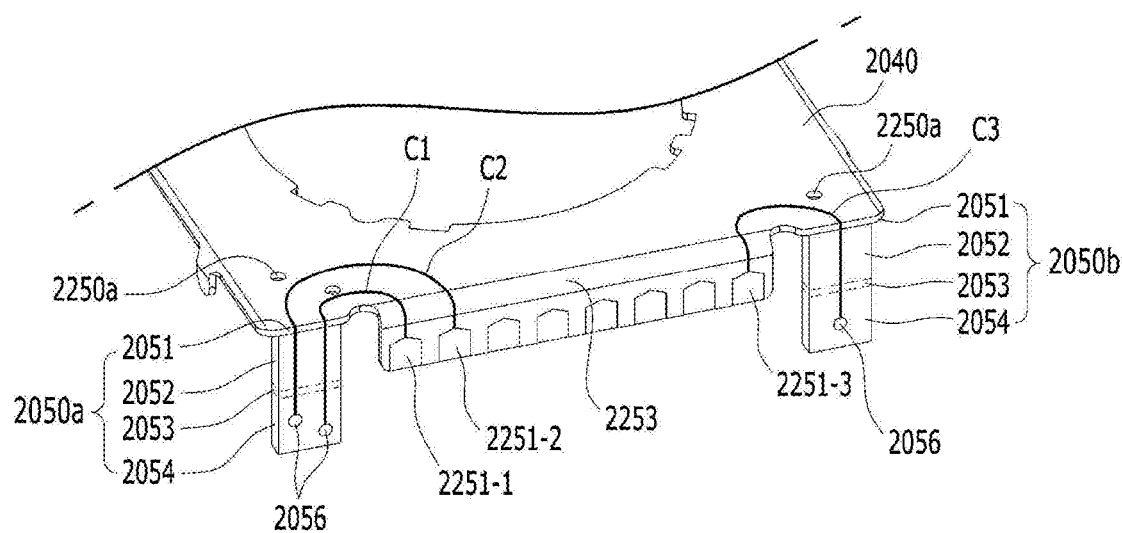
FIG. 50B is a partial wiring diagram of the circuit board.
Figure 51A:
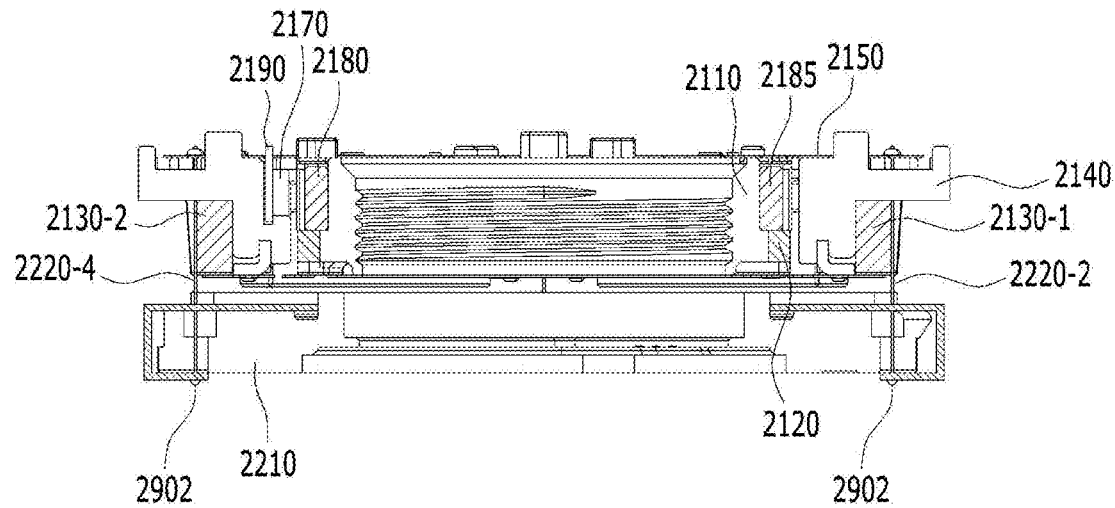
FIG. 51A is a cross-sectional view of the lens moving apparatus shown in FIG. 42, which is taken along line A-B in FIG. 42.
Figure 51B:
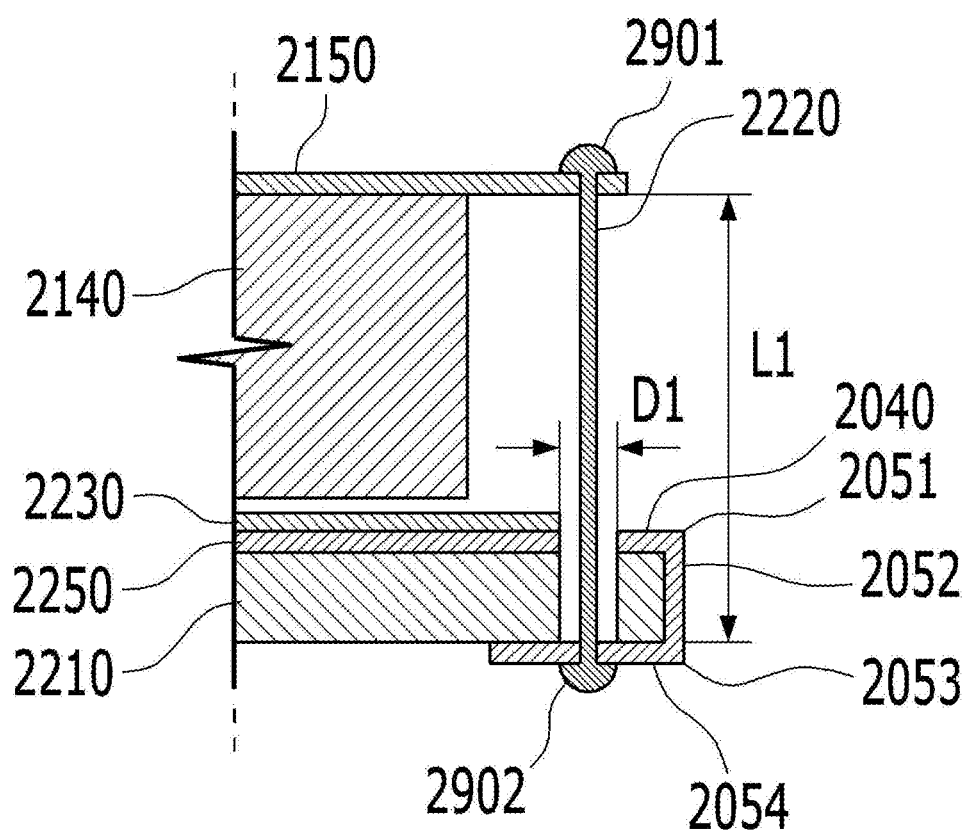
FIG. 51B is a partial schematic view of FIG. 51A.

FIG. 49 is a perspective view of the second coil 2230, the circuit board 2250, the base 2210 and the second position sensor 2240. FIG. 50A is a bottom view of the circuit board 2250 shown in FIG. 49. FIG. 50B is a partial wiring diagram of the circuit board 2250. FIG. 51A is a cross-sectional view of the lens moving apparatus shown in FIG. 42, which is taken along line A-B in FIG. 42. FIG. 51B is a partial schematic view of FIG. 51A.

FIGS. 49, 50A and 50B illustrate the state before extensions 2050*a* to 2050*d* of the circuit board 2250 are bent toward the lower surface of the base 2210 so as to be coupled to the lower surface of the base 2210. FIGS. 51A and 51B illustrate the state in which the extensions 2050*a* to 2050*d* of the circuit board 2250 shown in FIG. 50B are bent toward the lower surface of the base 2210 and coupled to the support members 2220.

Referring to FIGS. 49 to 51B, the base 2210 may include a stepped portion 2211, to which an adhesive is applied in order to attach and secure the cover member 2300 to the base 2210. Here, the stepped portion 2211 may guide the guide plates of the cover member 2300 and may face the lower ends of the side plates of the cover member 2300.

The surface of the base 2210 that faces a portion of the circuit board 2250, on which the terminals 2251 are formed, may be provided with a support portion 2255 having a size corresponding to the portion including the terminals 2251. The support portion 2255 of the base 2210 may support the terminal member 2253 of the circuit board 2250.

The upper surface of the base 2210 may be provided with mount grooves 2215-1 and 2215-2, in which the second position sensors 2240 mounted on the circuit board 2250 are disposed. According to the embodiment, the base 2210 may be provided with two mount grooves 2215-1 and 2215-2.

The base 2210 may include side members corresponding to the side members 2141-1 to 2141-4 of the housing 2140, and corner portions 2091*a* to 2091*d* corresponding to the corner portions 2142-1 to 2142-4 of the housing 2140. The corner portions 2091*a* to 2091*d* of the base 2210 may be positioned between the side members of the base 2210.

For example, the corner portions 2091*a* to 2091*d* of the base 2210 may be regions within a predetermined range from the corner vertices of the base 210, and may overlap the corner portions 2142-1 to 2142-4 of the housing 2140 in the optical-axis direction or in the first direction.

The base 2210 may have holes 2033, which correspond to the support members 2220-1 to 2220-6 and through which the second ends of the support members 2220-1 to 2220-6 extend. The holes 2033 may be positioned at the corner portions 2091*a* to 2091*d* of the base 2210.

For example, the number of holes 2033 in each of the corner portions 2091*a* to 2091*d* of the base 2210 may be the same as the number of support members provided on a corresponding one of the corner portions 2142-1 to 2142-4 of the housing 2140.

For example, one or more holes 2033 may be provided at each of the corner portions 2091*a* to 2091*d* of the base 2210.

For example, the holes 2033 provided at the corner portions 2091*a* to 2091*d* of the base 2210 may be disposed so as to face each other in the diagonal direction of the base 2210.

For example, although the holes 2033 may overlap the circuit board 2250 in the optical-axis direction or in a direction toward the circuit board 2250 from the base 2210, the disclosure is not limited thereto. In another embodiment, the holes may not overlap the circuit board 2250.

Although the diameter of each of the holes 2033 in the base 2210 may be constant from the upper end to the lower end thereof, the disclosure is not limited thereto.

In another embodiment, each of the holes 2033 in the base 2210 may have a portion that is increased in diameter toward the upper surface from the lower surface of the base 2210 in order to stably maintain the state of being spaced apart from the support member 2220.

In a further embodiment, each of the holes 2033 in the base 2210 may include an upper zone abutting the upper surface of the base 2210 and a lower zone positioned between the upper zone and the lower surface of the base 2210. The diameter of the upper zone of the hole 2033 in the base 2210 may increase moving toward the upper surface from the lower surface of the base 2210. The diameter of the lower zone of each of the holes in the base 2210 may be constant, and may be the same as the minimal diameter of the upper zone of the hole 2033 in the base 2210.

The second end of each of the support members 2220-1 to 2220-6 may extend through a corresponding one of the holes 2033 in the corner portions 2091*a* to 2091*d* of the base 2210. The second ends of the support members 2220-1 to 2220-6, which extend through the holes 2033, may be coupled to the extensions 2050*a* to 2050*d* of the circuit board 2250, which extend to the lower surface of the base 2210.

The diameter of each of the support members 2220-1 to 2220-6 may be smaller than the diameter D1 of each of the holes 2033 in the base 2210. For example, the diameter or thickness of each of the support members 2220-1 to 2220-6 may be within the range of 30 μm-70 μm. For example, the diameter or thickness of each of the support members 2220-1 to 2220-6 may be within the range of 36 μm-50 μm.

The diameter D1 of the hole 2033 in the base 2210 may be within the range of 0.1 mm-1 mm. For example, D1 may be within the range of 0.25 mm-0.6 mm. The distance between the inner surface of the hole 2033 in the base 2210 and the support member 2220-1 to 2220-6 may be within the range of 0.015 mm-0.48 mm.

The diameter of the hole 2052 in the first couplers 2520, 2520a to 2520d of the first outer frame 2152 may be smaller than the diameter D1 of the hole 2033 in the base 2210. For example, the diameter of the hole 2052 in the first couplers 2520, 2520a to 2520d may be within the range of 0.07 mm-0.5 mm so as to allow the support members 2220-1 to 2220-6 to be easily bonded therein.

In another embodiment, in order to absorb or buffer vibrations or movement of the support members 2220, the holes 2033a in the base 2210 may be filled with a damper (not shown).

The second coil 2230 may be disposed above the circuit board 225, and the second position sensor 2240 may be disposed under the circuit board 2250.

For example, the second position sensor 2240 may be mounted on the lower surface of the circuit board 2250, and the lower surface of the circuit board 2250 may be the surface that faces the upper surface of the base 2210.

When the housing 2140 is moved in a direction perpendicular to the optical-axis direction, the second position sensor 2230 may detect the intensity of the magnetic field of the first magnets 2130, and may output an output signal (for example, output voltage) according to the result of the detection.

Displacement of the housing 2140 with respect to the base 2210 in a direction (for example, in the X-axis direction or in the Y-axis direction) perpendicular to the optical-axis direction (for example, in the Z-axis direction) may be detected based on the output signal of the second position sensor 2240.

The second position sensor 2240 may include two OIS position sensors 2240a and 2240b in order to detect displacement of the housing 2140 in the second direction (for example, in the X-axis direction) and/or in the third direction (for example, in the Y-axis direction) perpendicular to the optical-axis direction.

The OIS position sensor 2240a may detect the intensity of the magnetic field of the first magnet 2130 when the housing 2140 is moved, and may output a first output signal according to the result of the detection. The OIS position sensor 2240b may detect the intensity of the magnetic field of the first magnet 2130 when the housing 2140 is moved, and may output a second output signal according to the result of the detection. The controller 830 of the camera module or the controller 780 of the portable terminal 200A may detect the displacement of the housing 2140 based on the first output signal and the second output signal.

The circuit board 2250 may be positioned under the housing 2140 and on the upper surface of the base 2210. For example, the circuit board 2250 may be attached or secured to the base 2210 via an adhesive member.

For example, the circuit board 2250 may include a board body 2040, the terminal member 2253, which is bent toward the outer surface of the side members of the base 2210 from the board body 2040 and which includes a plurality of terminals 2251 or pins for conductive connection to the outside, and one or more extensions 2050a to 2050d, which extend to the outer surface and the lower surface of the base 2210 from the board body 2040.

For example, although the circuit board 2250 may be an FPCB, the disclosure is not limited thereto.

The board body 2040 of the circuit board 2250 may have an opening that corresponds to the opening in the bobbin 2110, the opening in the housing 2140 and/or the opening in the base 2210.

The board body 2040 of the circuit board 2250 may have a shape that coincides with or corresponds to the upper surface of the base 2210, for example, a square shape.

The board body 2040 of the circuit board 2250 may include corner portions or corners zones 2081a to 2081d that correspond to the corner portions 2142-1 to 2142-4 of the housing 2140 and the corner portions 2091a to 2091d of base 2210.

Although the circuit board 2250 may include two terminal members provided at two side surfaces that are opposite each other, the disclosure is not limited thereto, and the number of terminal members may be one or more. In another embodiment, the terminal members may be disposed on side surfaces of the board body 2040 that are not opposite each other.

For example, the lens moving apparatus may receive a drive signal from the outside through the terminals 2251 of the terminal member 2253 of the circuit board 2250, may supply power or the drive signal to the first and second coils 2120 and 2230 and the first and second position sensors 2170 and 2240, and may output an output signal output from the first and second position sensors 2170 and 2240 to the outside.

The corner portions or corner zones 2081a to 2081d of the circuit board 2250 may be provided with first holes 2250a, through which the support members 2220-1 to 2220-6 extend.

The position and number of the first holes 2250a in the circuit board 2250 may correspond to or coincide with the position and number of the support members 2220-1 to 2220-6. Each of the support members 2220-1 to 2220-6 may be spaced apart from the inner surface of a corresponding first hole 2250a in the circuit board 2250.

Although the diameter of each of the first holes 2250a in the circuit board 2250 may be the same as the diameter D1 of the holes in the base 2210, the disclosure is not limited thereto. In another embodiment, the diameter of each of the first holes 2250a in the circuit board 2250 may be larger than the diameter D1 of the holes 2033 in the base 2210.

One or more extensions 2050a to 2050d may extend to the outer surface and the lower surface of the base 2210 from one or more corner portions or corner zones 2081a to 2081d of the circuit board 2250.

For example, the extensions 2050a to 2050d may extend to the outer surface and the lower surface of the base 2210 from each of the corner portions or corner zones 2081a to 2081d of the circuit board 2250.

As illustrated in FIGS. 50A and 50B, the extensions 2050a to 2050d may be disposed at the side surfaces (or sides) of the board body 2040 that is the same as the side surfaces (or sides) of the board body 2040 at which the terminal members 2253 of the circuit board 2250 are positioned.

The extensions 2050a to 2050d may extend to the outer surfaces and the lower surfaces of the corner portions 2091a to 2091d) of the base 2210. The extensions 2050a to 2050d may be attached or secured to the outer surfaces and the lower surfaces of the corner portions 2091a to 2091d of the base 2210 via an adhesive member.

Each of the extensions 2050a to 2050d may include a first extension 2052 that is disposed on the outer surface of the base 2210 and a second extension 2054 that is disposed on the lower surface of the base 2210 (or the lower surface of the corner portion).

The first extension 2052 may extend to the first outer surface of the base 2210 from the board body 2040 of the circuit board 2250, and the second extension 2054 may be connected to the first extension 2052 and may extend to the lower surface of the base 2210 from the first extension 2052.

The first extensions 2052 may be bent toward the outer surfaces of the corner portions 2091*a* to 2091*d* of the base 2210 from the corner portions or corner zones 2081*a* to 2081*d* of the circuit board 2250, and may be bonded or secured to the outer surfaces of the corner portions 2091*a* to 2091*d* via an adhesive member.

The second extensions 2054 may be connected to the first extensions 2052, may be bent toward the lower surfaces of the corner portions 2091*a* to 2091*d* of the base 2210, and may be attached or secured to the lower surfaces of the corner portions 2091*a* to 2091*d* via an adhesive member.

For example, the second extensions 2054 may overlap the holes 2033 in the base 2210 in the optical-axis direction or in a direction toward the upper surface from the lower surface of the base 2210.

For example, the extensions 2050*a* to 2050*d* may further include first bent portions 2051, positioned between the corner portions or corner zones 2081*a* to 2081*d* and the first extensions 2052, and second bent portions 2053, positioned between the first extensions 2052 and the second extensions 2054.

The extensions 2050*a* to 2050*d* may have respective holes 2056, which correspond to the holes 2033 in the base 2210 and overlap the holes 2033 in the base 2210 in the optical-axis direction or in a direction toward the upper surface from the lower surface of the base 2210.

For example, the second extensions 2054 may have respective second holes 2056, which correspond to the holes 2033 in the base 2210 and overlap the holes 2033 in the base 2210 in the optical-axis direction or in a direction toward the upper surface from the lower surface of the base 2210.

The number and position of the second holes 2056 in the second extensions 2054 may correspond to or coincide with the number and position of the holes 2033 in the base 2210.

Although the diameter of the second hole 2056 in the second extension 2054 may be smaller than the diameter of the hole 2033 in the base 2210, the disclosure is not limited thereto. In another embodiment, the diameter of the second hole 2056 may be the same as the diameter of the hole 2033 in the base 2210.

For example, the diameter of the second hole 2056 in the second extension 2054 may be within the range of 0.05 mm-1 mm.

In another embodiment, the diameter of the second hole 2056 in the second extension 2054 may be within the range of 0.08 mm-0.5 mm.

The first ends of the support members 2220-1 to 2220-6 may be coupled to the upper elastic member, for example, the first couplers 2520, 2520*a* to 2520*d* of the upper springs 2150-1 to 2150-6.

The support members 2220-1 to 2220-6 may extend through the circuit board 2250, the base 2210 and the portions of the extensions 2050*a* to 2050*d* disposed on the lower surface of the base 2210, and may be coupled to the portions of the extensions 2050*a* to 2050*d* disposed on the lower surface of the base 2210 via the solder 2902.

For example, the second ends of the support members 2220-1 to 2220-6 may be coupled to the lower surfaces of the second extensions 2054. Here, the lower surface of the second extension 2054 may be the surface opposite the upper surface of the second extension 2054, and the upper surface of the second extension 2054 may be the surface that faces the lower surface of the base 2210 and that is in contact with the lower surface of the base 2210.

The second ends of the support members 2220-1 to 2220-6 may extend through the first holes 2250*a* in the circuit board 2250, the holes 2033 in the base 2210 and the second holes 2056 in the second extensions 2054, and may be coupled to the second holes 2056 in the second extensions 2054 via the solder 2902.

Referring to FIG. 5, the circuit board 2250 may include wires or circuit patterns (for example, C1 to C3) for conductively connecting the terminals provided on the terminal member 2253 to the second ends of the support members 2220-1 to 2220-6 coupled to the second extensions 2054.

For example, the circuit pattern (for example, C3) may conductively connect the second hole 2056 formed in the second extension 2054 of the extension (for example, 2050*b*) to a corresponding one of the terminals of the terminal member 2251 (for example, 2251-3).

For example, the wires or the circuit patterns C1 to C3 may be formed on the board body 2040 and the extensions 2050*a* to 2050*d*.

Since the extensions 2050*a* to 2050*d* and the terminal members 2253 are positioned on the same side surfaces (or the same sides) of the board body 2040 of the circuit board 2250, it is possible to reduce the length of the circuit patterns between the extensions and the terminals of the terminal member 2253 and to increase the freedom in wiring for the circuit board 2250.

Furthermore, since two extensions (for example, 2050*a* and 2050*b*, and 2050*c* and 2050*d*) are disposed at both sides of the terminal member 2253, it is possible to reduce the length of the circuit patterns between the extensions and the terminals of the terminal members 2253 and to increase the freedom in wiring for the circuit board.

Figure 52:
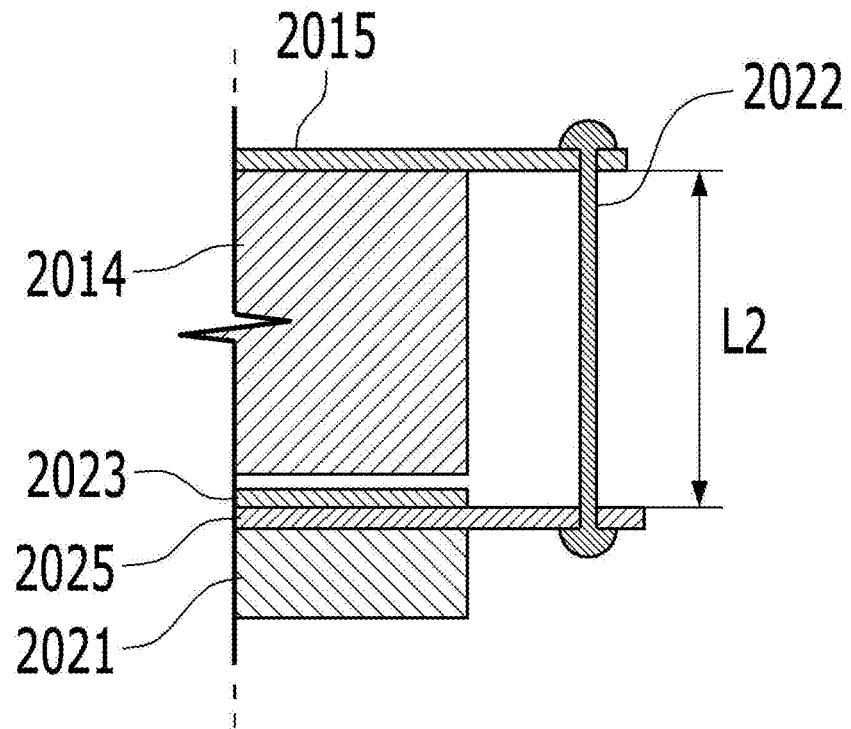
FIG. 52 illustrates the length of the support member when the support member is coupled to the lower surface of the circuit board.

FIG. 52 illustrates the length L2 of the support member 2022 when the support member 2022 is coupled to the lower surface of the circuit board 2025.

Referring to FIG. 52, the circuit board 2025 may be positioned on the upper surface of the base 2021, and the second coil 2023 may be positioned on the circuit board 2025. The first ends of the support members 2022 may be coupled to the upper elastic member 2025, and the second ends of the support members 2022 may be coupled to the lower surface of the circuit board 2025 positioned above the base 2021.

Generally, as the thickness of a cellular phone is decreased, the thickness of the camera module (for example, the length of the camera module in the optical-axis direction) is also decreased. In order to realize a camera module having a small thickness, it is required to reduce the length L2 of the OIS wire, which corresponds to the support member 2022 of the lens moving apparatus.

When the length of the OIS wire, which has a constant diameter, is reduced, the resistance of the OIS wire is reduced, thereby increasing the current flowing through the OIS wire and thus increasing power consumption. Although it is possible to inhibit an increase in current or power consumption attributable to reduction of the length of the OIS wire by reducing the diameter of the OIS wire, reduction of the diameter of the OIS wire may deteriorate reliability in OIS driving.

According to the embodiment, the second ends of the support members 2220 may extend through the base 2210 and may be coupled to the extensions 2050*a* to 2050*d* of the circuit board 2250. Accordingly, the embodiment is able to increase the length L1 of the support members 2220.

Assuming that the sizes (for example, heights) of the housings 2014 and 2140, the upper elastic members 2015 and 2150, the second coils 2023 and 2230, the bases 2021 and 2210 and the like are the same in FIGS. 51A, 51B and 52, the length L1 of the support members 2220 shown in FIG. 51B may be larger than the length L2 of the support member 2022 shown in FIG. 52.

Since the length L1 of the support members 2220 is increased, the resistance of the support members 2220 may be increased and the intensity of current flowing through the support member 2220 may be decreased. Consequently, the embodiment is able to reduce power consumption and to inhibit deterioration of reliability in OIS driving attributable to reduction in the diameter of the OIS wire.

Although the second coil 2230 is embodied as being provided on the circuit member 2231 or the board, which is separate from the circuit board 2250, the disclosure is not limited thereto. In another embodiment, the second coil 2230 may be embodied as a ring-shaped coil block or an FP coil.

In a further embodiment, the second coil 2230 may be embodied as a circuit pattern formed on the circuit board 2250.

The circuit member 2231, on which the second coil 2230 is provided, may be provided in the corners thereof with escape grooves 2023. The escape grooves 2023 may be formed by chamfering the corner portions of the circuit member 2231. In another embodiment, the corner portions of the circuit member 2231 may be provided with holes, through which the support members 2220 extend.

The second coil 2230 may be disposed on the circuit board 2250 so as to correspond to the first magnets 2130 disposed on the housing 2140. In another embodiment, the circuit board 2250 may include the second coil that faces the first magnets 2130.

For example, although the second coil 2230 may include four OIS coils 2230-1 to 2230-4, which are disposed so as to correspond to four sides of the circuit board 2250, the disclosure is not limited thereto. Only a total of two OIS coils, that is, only one OIS coil for a second direction and one OIS coil for a third direction, may be provided, or four or more OIS coils may be provided.

As described above, handshake correction may be performed by moving the housing 2140 in the second and/or third direction by the interaction between the first magnets 2130 and the second coil 2230, which correspond to each other.

Each of the OIS position sensors 2240a and 2240b may be embodied as a hall sensor. Any sensor may be used as long as the sensor is capable of detecting the intensity of a magnetic field. For example, each of the OIS position sensors 2240 may be embodied as a driver including a hall sensor, or may be embodied as a position detection sensor, such as a hall sensor, alone.

Each of the OIS position sensors 2240a and 2240b may be mounted on the circuit board 2250, and the circuit board 2250 may include terminals, which are conductively connected to the OIS position sensors 2240a and 2240b.

For the purpose of coupling between the circuit board 2250 and the base 2210, the base 2210 may be provided on the upper surface thereof around the opening with a projection 2010a. The opening in the circuit board 2250 may be fitted onto the projection 2010a of the base 2210, and the circuit board 2250 may be secured to the upper surface of the base 2210 via an adhesive member such as epoxy.

Figure 53:
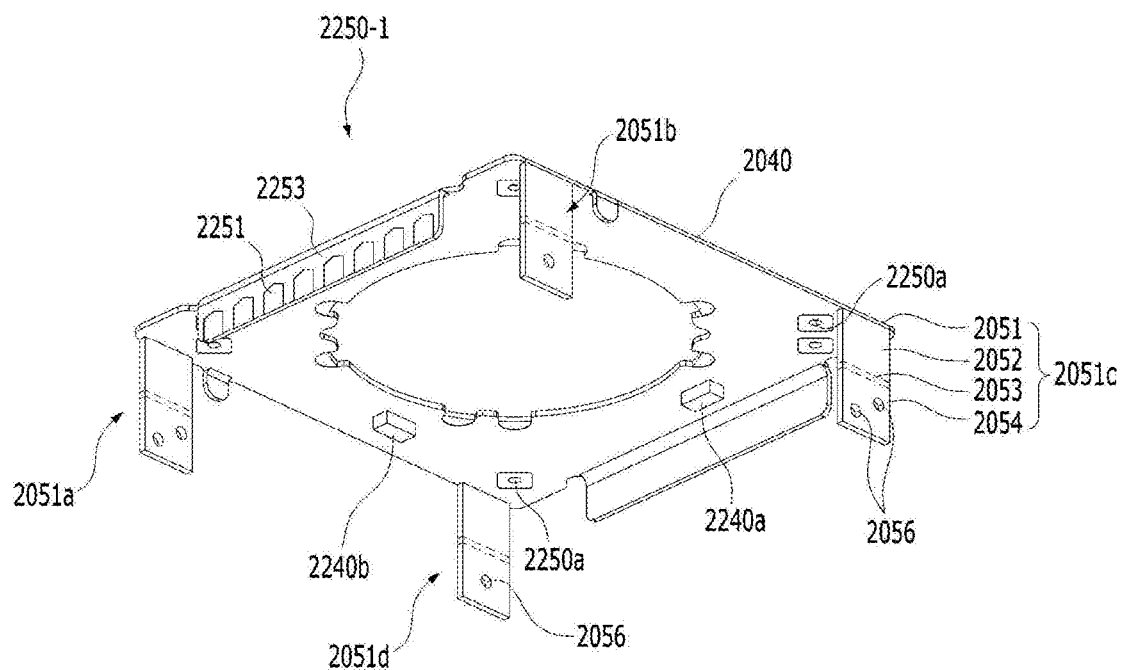
FIG. 53 is a perspective view illustrating a circuit board according to another embodiment.

FIG. 53 is a perspective view illustrating a circuit board 2250-1 according to another embodiment.

The circuit board 2250-1 shown in FIG. 53 may be a modification of the circuit board 2250 shown in FIG. 49.

Referring to FIG. 53, the circuit board 2250-1 may include the board body 2040, the terminal members 2253 and extensions 2051a to 2051d. The extensions 2051a to 2051d of the circuit board 2250-1 may be disposed on the side surfaces (or sides) of the board body 2040 other than the side surfaces (or sides) of the board body 2040 at which the terminal members 2253 of the circuit board 2250-1 are positioned.

For example, one of the terminal members 2253 may be disposed on a first side surface (or a first side) of the board body 2040 of the circuit board 2250-1, and the extensions 2051a to 2051d may be disposed on a second side surface (or a second side) of the board body 2040 of the circuit board 2250-1. For example, the first side surface and the second side surface of the board body 2040 may be orthogonal to each other.

Since the embodiment shown in FIG. 53 is constructed such that the terminal members 2253 and the extensions 2051a to 2051d are disposed on different side surfaces of the board body 2040, it is possible to increase freedom in design of the terminal member 2253 and the extensions 2051a to 2051d.

Figure 54:
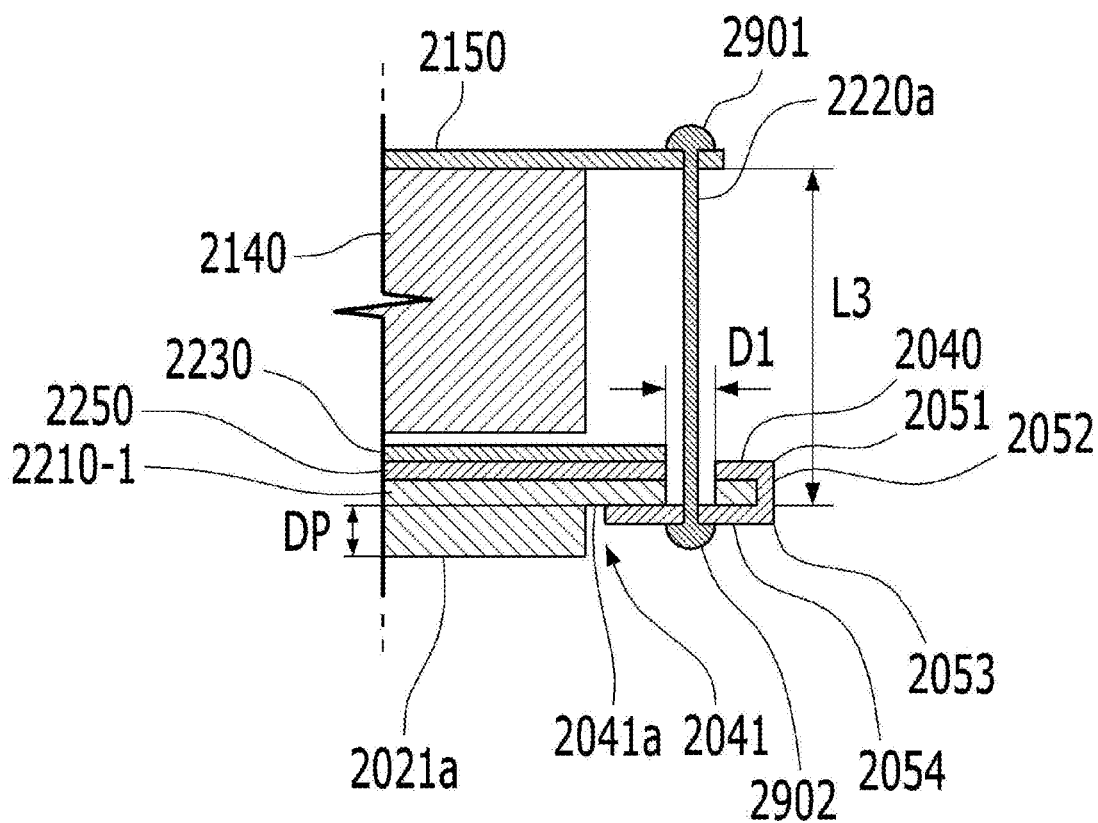
FIG. 54 illustrates another embodiment of the base shown in FIG. 49.

FIG. 54 illustrates another embodiment 210-1 of the base shown in FIG. 49.

Referring to FIG. 54, the base 2210-1 may be a modification of the base 2210 shown in FIG. 49.

The base 2210-1 may include a stepped portion 2041 formed in the lower surface of at least one of the corner portions 2091a to 2091d.

The stepped portion 2014 may have a height difference DP from the lower surface of the base 2210-1 (or the lower surface of one of the corner portions 2091a to 2091d) toward the upper surface of the base 2210-1 (or the upper surface of the one of the corner portions 2091a to 2091d).

For example, although the stepped portion 2041 may have a groove form, which is formed in the lower surface 2021a of one of the corner portions 2091a to 2091d of the base 2210-1, the disclosure is not limited thereto. For example, the stepped portion 2041 may be configured to be depressed from the lower surface of the base 2210-1 or the lower surface of one of the corner portions 2091a to 2091d.

The stepped portion 2041 may include a stepped surface 204a, which has a height difference from the lower surface of the base 2210-1 or the lower surface of one of the corner portions 2091a to 2091d. For example, the stepped surface 2041a may be parallel to the lower surface of the base 2210-1 or the lower surface of one of the corner portions 2091a to 2091d and may have a height difference DP from the lower surface of the base 2210-1 or the lower surface of one of the corner portions 2091a to 2091d. The hole 2033 in the base 2210-1 may be formed through the stepped surface 2041a.

For example, the height difference DP of the stepped portion 2041 may be larger than or equal to the sum of the thickness of the circuit board 2250 (or the second extension 2054) and the height of the solder 2902.

The second extension 2054 of the circuit board 2250 may be disposed on the stepped surface 2041a of the stepped portion 2041. In the embodiment shown in FIG. 54, the reason for provision of the stepped portion 2041 is to inhibit the solder 2902 for coupling the support member 2220a to the second extension 2054 of the circuit board 2250-1 from projecting from the lower surface of the base 2210-1 or the lower surface 2021*a* of one of the corner portions 2091*a* to 2091*d*. In other words, since the solder 2902 does not project from the lower surface of the base 2210-1 or the lower surface of one of the corner portions 2091*a* to 2091*d*, it is possible to inhibit an electrical short or spatial interference between the lens moving apparatus 2100 and other components, for example, the circuit board of a camera module or components mounted on the circuit board, when the lens moving apparatus 2100 is mounted on the camera module.

The length L3 of the support member 2220*a* shown in FIG. 54 may be larger than the length L2 of the support member 2022 shown in FIG. 52 but smaller than the length L1 of the support member 2220 shown in FIG. 51B. The embodiment shown in FIG. 54 is able to adjust the length L3 of the support member 2220*a* using the height difference of the stepped portion 2041.

Figure 55:
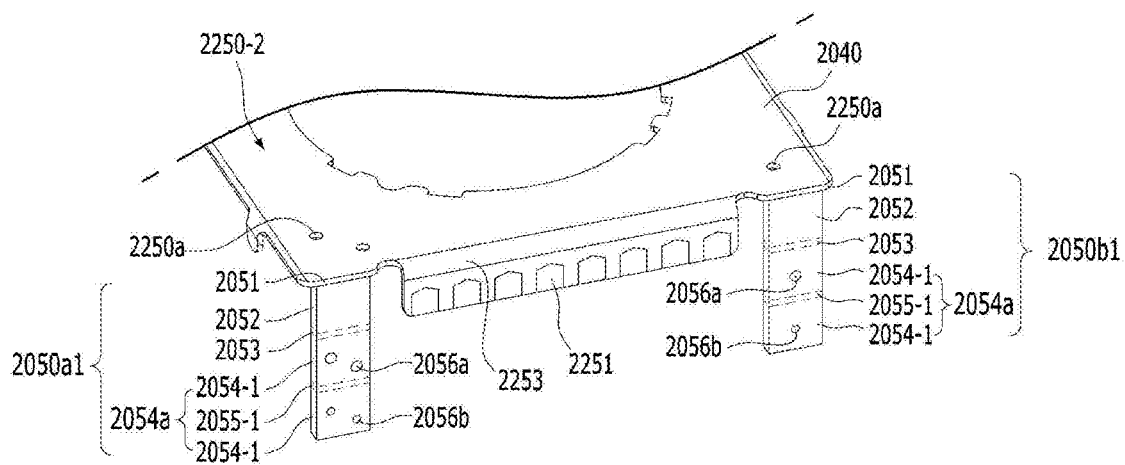
FIG. 55 illustrates a portion of a circuit board according to a further embodiment.
Figure 56:
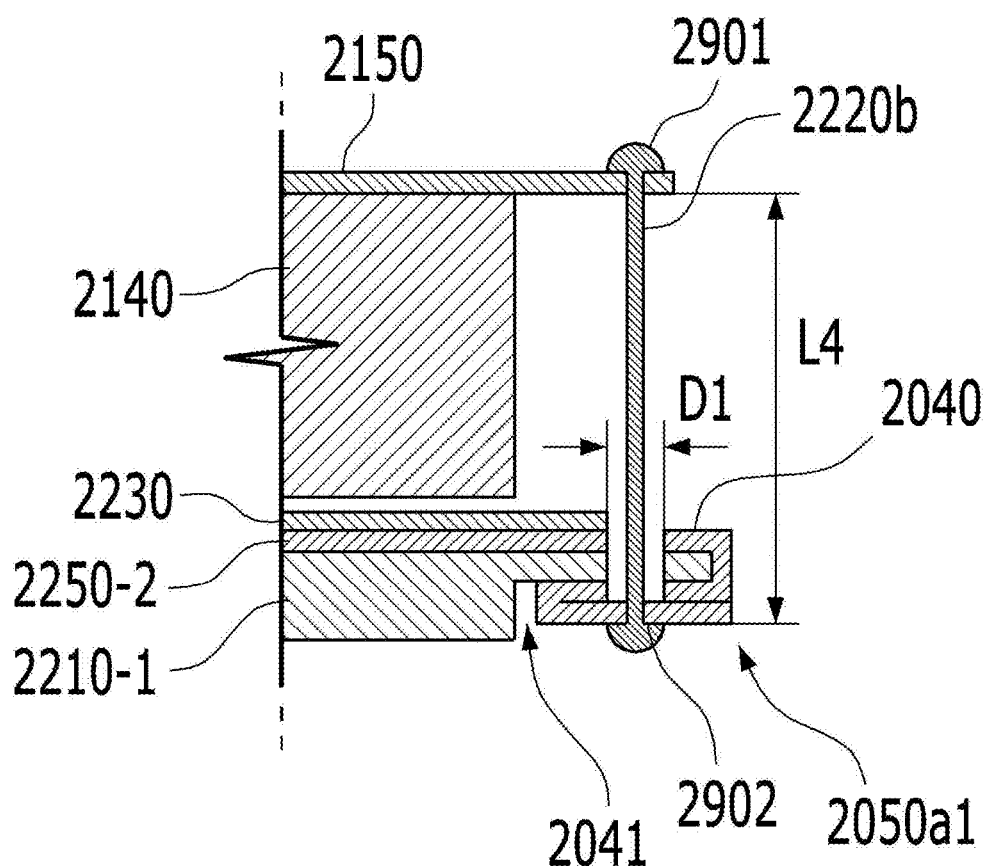
FIG. 56 is a cross-sectional view of an embodiment including the circuit board shown in FIG. 55.

FIG. 55 illustrates a portion of a circuit board 2250-2 according to a further embodiment. FIG. 56 is a cross-sectional view of an embodiment including the circuit board 2250-2 shown in FIG. 55.

The circuit board 250-2 shown in FIG. 56 may be a modification of the circuit board shown in FIG. 54.

Referring to FIGS. 55 and 56, the circuit board 2250-2 may include the board body 2040, the terminal member 2253 and extensions 2050*a*1 and 1050*b*1. Although FIGS. 55 and 56 illustrate two extensions, the disclosure is not limited thereto. The disposition of the extensions shown in FIG. 50A may be applied to this embodiment.

Furthermore, although the extensions are disposed on the same side surface as the side surface of the board body 2040 on which the extensions 2253 are disposed, the disclosure is not limited thereto, and the disposition of the extensions according to the embodiment shown in FIG. 53 may be applied to this embodiment.

Each of the extensions 2050*a*1 and 2050*b*1 may include a first extension 2052 disposed on the outer surface of the base 2210 (or the outer surface of one of the corner portions 2091*a* to 2091*d*) and a second extension 2054*a* disposed on the lower surface of the base 2210 (or the lower surface of one of the corner portions 2091*a* to 2091*d*).

The second extension 2054*a* may be configured to be bent once or more, and may include a plurality of layers (for example, 2054-1 and 2054-2), which are layered one on top of another in a vertical direction, and holes 2056*a* and 2056*b*, which are formed through the plurality of layers (for example, 2054-1 and 2054-2) so as to allow the support members 2220*b* to extend therethrough.

For example, the plurality of layers (for example, 2054-1 and 2054-2) of the second extension 2054*a* may be alternately bent in opposite directions.

The second extension 2054*a* may further include a bent portion 2055-1 connecting the two adjacent layers (for example, 2054-1 and 2054-2) to each other.

The plurality of layers (for example, 2054-1 and 2054-2) may have respective holes (for example, 2056*a* and 2056*b*) corresponding to the hole 2033 in the base 2210-1.

The support member 2220*b* may extend through the hole 2033 in the base 2210-1 and the holes in the second extension 2054*a*, and may be coupled to the lower surface of the lowermost layer of the plurality of layers (for example, 2054-1 and 2054-2).

Although the second extension 2054 of one of the extensions 50*a* to 50*d* and 51*a* to 51*d* shown in FIGS. 11, 33 and 34 includes only one layer on the lower surface of one of the bases 2210 and 2210-1, one of the extensions 2050*a*1 and 2050*b*1 shown in FIGS. 55 and 56 may include two or more layers (for example, 2054-1 and 2054-2). Consequently, by virtue of the two or more layers (for example, 2054-1 and 2054-2), the length L4 of the support member 2220*b* may be greater than the length L3 of the support member 2220*a* shown in FIG. 54.

The circuit board 2250-2 shown in FIGS. 55 and 56 may also be applied to the embodiment shown in FIG. 51B. When the circuit board 2250-2 is applied to the base 2210 shown in FIG. 51B, the length of the support member 2220*b* may be greater than the length L1 of the support member 2220 shown in FIG. 51B.

As described above, the embodiments are able to increase the length of the support members 2220, 2220*a*, and 2220*b* using the extensions 2050*a* to 2050*d*, 2051*a* to 2051*d*, 2051*a*1 and 2051*b*1 of the circuit boards 2250, 2250-1 and 2250-2, to reduce power consumption, and to inhibit deterioration of reliability in OIS driving attributable to reduction in diameter of the OIS wire.

The electrical connection among the support members 220, the base 210 and the circuit board 250, which has been described with reference to FIGS. 11 to 19, may be applied to or replaced with the electrical connection among some of the support members 1220, some of the terminal members 1270*a* to 1270*d* and some of the terminals of the circuit board 1250, which has been described with reference to FIGS. 31 to 39.

In contrast, the electrical connection among some of the support members 1220, some of the terminal members 1270*a* to 1270*d* and some of the terminals of the circuit board 1250, which has been described with reference to FIGS. 31 to 39, may be partially applied to the embodiment shown in FIGS. 11 to 19.

Furthermore, the electrical connection between the circuit board 2250 and the support members 2230, which has been described with reference to FIGS. 50A to 56, may be partially applied to the embodiment shown in FIGS. 11 to 19 and to the embodiment shown in FIGS. 31 to 39. The reverse application is also possible.

Meanwhile, the lens moving apparatuses according to the above-described embodiments may be used in various fields, such as, for example, those of a camera module or an optical device.

For example, the lens moving apparatus 100 according to the embodiment may be included in an optical instrument, which is designed to form the image of an object in a space using reflexion, refraction, absorption, interference, diffraction or the like, which is the characteristic of light, to extend eyesight, to record an image obtained through a lens or to reproduce the image, to perform optical measurement, or to propagate or transmit an image. For example, the optical instrument according to the embodiment may include a smart phone and a portable terminal equipped with a camera.

Figure 57:
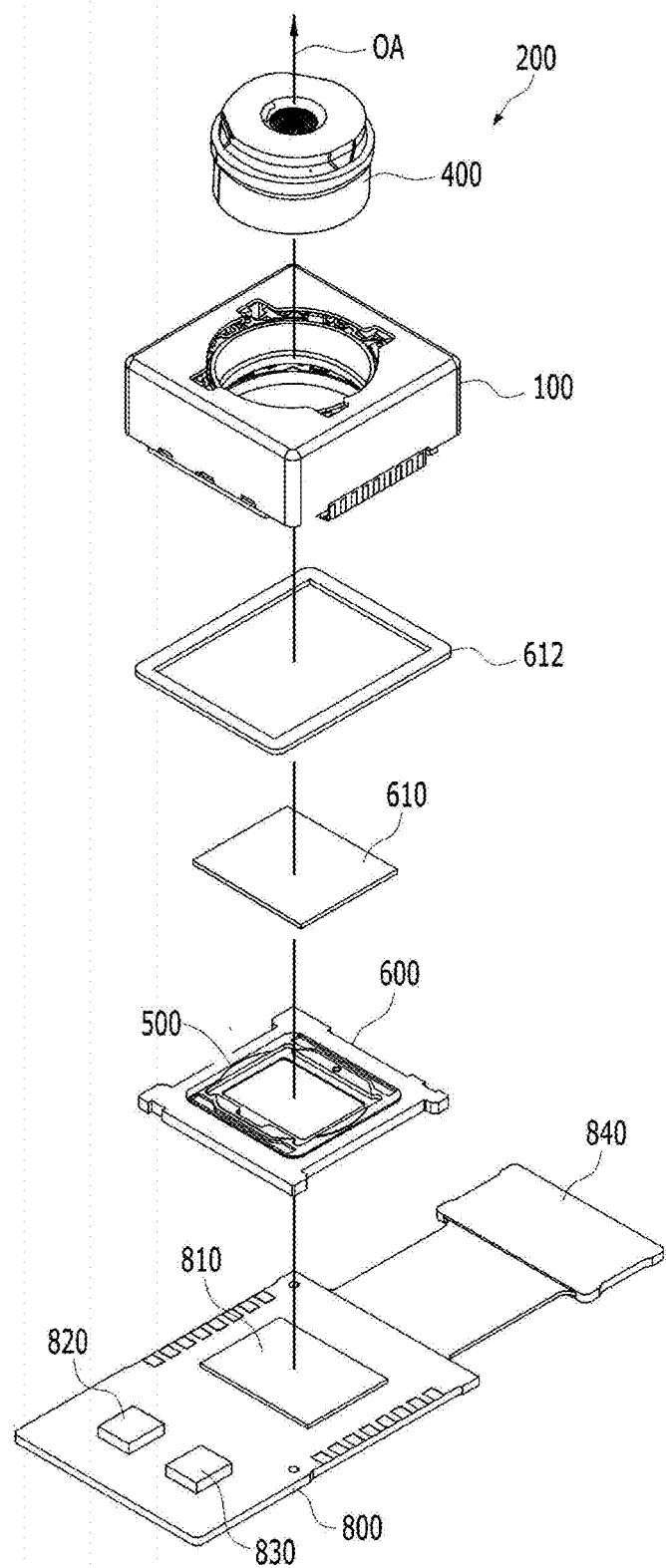
FIG. 57 is an exploded perspective view illustrating a camera module according to an embodiment.

FIG. 57 is an exploded perspective view illustrating a camera module 200 according to an embodiment.

Referring to FIG. 57, the camera module 200 may include a lens or a lens barrel 400, the lens moving apparatus 100, an adhesive member 612, a filter 610, a first holder 600, a second holder 800, an image sensor 810, a motion sensor 820, a controller 830, and a connector 840.

The lens or the lens barrel 400 may be mounted in the bobbin 110 of the lens moving apparatus 100.

The first holder 600 may be located under the base 210, 1210, 2210 of the lens moving apparatus 100, 1100, 2100. The filter 610 may be mounted on the first holder 600, and the first holder 600 may have a raised portion 500 on which the filter 610 is seated.

The adhesive member 612 may couple or attach the base 210 of the lens moving apparatus 100 to the first holder 600.

In addition to the attachment function described above, the adhesive member 612 may serve to inhibit contaminants from entering the lens moving apparatus 100.

The adhesive member 612 may be, for example, epoxy, thermohardening adhesive, or ultraviolet hardening adhesive.

The filter 610 may serve to inhibit light within a specific frequency band that passes through the lens barrel 400 from being introduced into the image sensor 810. The filter 610 may be, for example, an infrared-light-blocking filter, without being limited thereto. In another embodiment, the filter 610 may be an infrared-transmitting filter. Here, the filter 610 may be oriented parallel to the X-Y plane.

The region of the first holder 600 in which the filter 610 is mounted may be provided with a hole in order to allow the light that passes through the filter 610 to be introduced into the image sensor 810.

The second holder 800 may be disposed under the first holder 600, and the image sensor 810 may be mounted on the second holder 600. The image sensor 810 may include an active area, an imaging area, an effective area or the like, which is an area on which an image included in the light that passes through the filter 610 and that is introduced thereinto is formed.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor 810 may be mounted, on which a circuit pattern may be formed, and to which various devices may be coupled.

The first holder 600 may be referred to a "sensor base", and the second holder 800 may be referred to a "circuit board".

The image sensor 810 may receive an image contained in the light introduced through the lens moving apparatus 100, 1100, 2100 and may convert the received image into electrical signals.

The filter 610 and the image sensor 810 may be spaced apart from each other so as to be opposite each other in the first direction.

The motion sensor 820 may be mounted on the second holder 800, and may be conductively connected to the controller 830 through the circuit pattern formed on the second holder 800.

The motion sensor 820 may output rotational angular speed caused by motion. The motion sensor 820 may be embodied as a dual-axis or triple-axis gyro sensor or an angular speed sensor.

The controller 830 may be mounted on the second holder 800. The second holder 800 may be conductively connected to the lens moving apparatus 100, 1100 or 2100. For example, the second holder 800 may be conductively connected to the first coil 120, 1120, 2120, the second coil 230, 1230, 2230, the first position sensor 170, 1170, 2170 and the second position sensor 240, 1240, 2240 of the lens moving apparatus 100, 1100, 2100.

For example, a drive signal may be supplied to the first coil 120, 1120, 2120, the second coil 230, 1230, 2230, the first position sensor 170, 1170, 2170 and the second position sensor 230, 1230, 2230 through the second holder 800, and the signal output from each of the first position sensor 170, 1170, 2170 and the second position sensor 230, 1230, 2230 may be transmitted to the second holder 800. For example, the signal output from each of the first position sensor 170, 1170, 2170 and the second position sensor 240, 1240, 2240 may be received by the controller 830.

The connector 840 may be conductively connected to the second holder 800, and may have a port for the electrical connection of an external component.

Figure 58:
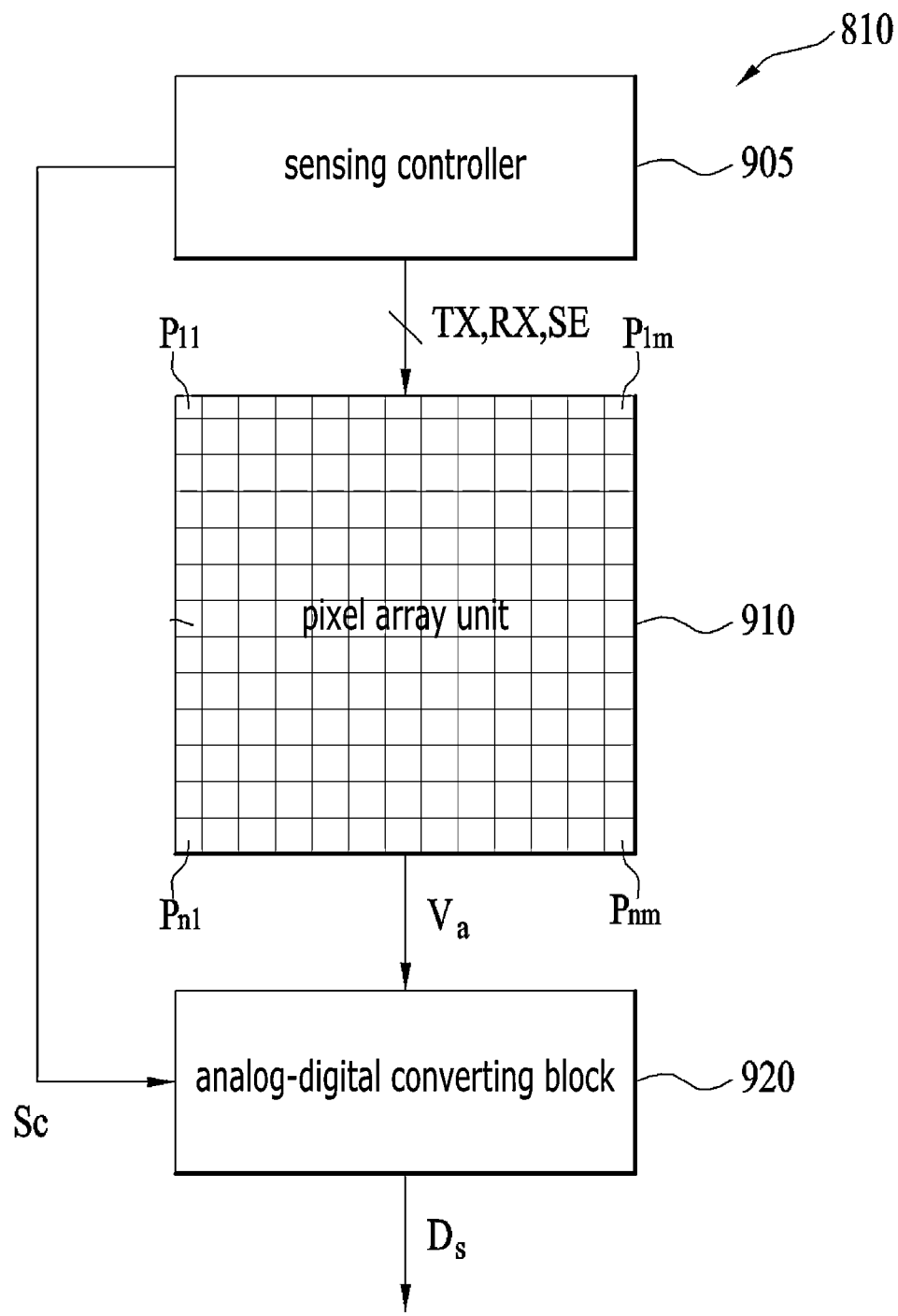
FIG. 58 is a block diagram of an image sensor according to an embodiment shown in FIG. 57.

FIG. 58 is a block diagram illustrating an embodiment of the image sensor 810 shown in FIG. 57.

Referring to FIG. 58, the image sensor 810 includes a sensing controller 905, a pixel array unit 910 and an analog-digital converting block 920.

The sensing controller 905 outputs signals for controlling transistors included in the pixel array unit 910 (for example, a reset signal RX, a transmission signal TX and a selection signal SX) and signals Sc for controlling the analog-digital converting block 920.

The pixel array unit 910 includes a plurality of unit pixels P11 to Pnm (each of n and M is a natural number greater than 1). The plurality of unit pixels P11 to Pnm may be arranged so as to have a matrix constituted by rows and columns. Each of the unit pixels P11 to Pnm may be a photoelectric conversion element capable of detecting light and converting the light into an electric signal.

The pixel array unit 910 may include sensing lines connected to the output terminals of the unit pixels P11 to Pnm.

Although each of the unit pixels P11 to Pnm may include, for example, a photodiode, a transfer transistor, a reset transistor, a drive transistor and a select transistor, the disclosure is not limited thereto. The number of transistors included in the unit pixel may be three or five, and is not limited to four.

The photodiode may absorb light and may generate an electric charge using the absorbed light.

The transfer transistor may transmit the electric charge, which is generated by the photodiode, to a detection node (for example, a floating diffusion region) in response to a transmission signal TX. The reset transistor may reset the unit pixels in response to a reset signal RX. The drive transistor may be controlled in response to the voltage of the detection node, may be embodied as a source follower, and may serve as a buffer. The select transistor may be controlled in response to a selection signal SE, and may output a detection signal Va to the output terminal.

The analog-digital converting block 920 performs sampling of a detection signal Va, which is an analog signal output from the pixel array unit 910, and converts the sampled detection signal into a digital signal Ds. The analog-digital converting block 920 may perform correlated double sampling (CDS) in order to eliminate fixed-pattern noise inherent in the pixels.

Although the sensing controller 905 and the analog-digital converting block 920 may be embodied independently of the controller 830, the disclosure is not limited thereto. The sensing controller 905, the analog-digital converting block 920 and the controller 830 may also be embodied as a single controller.

Figure 59:
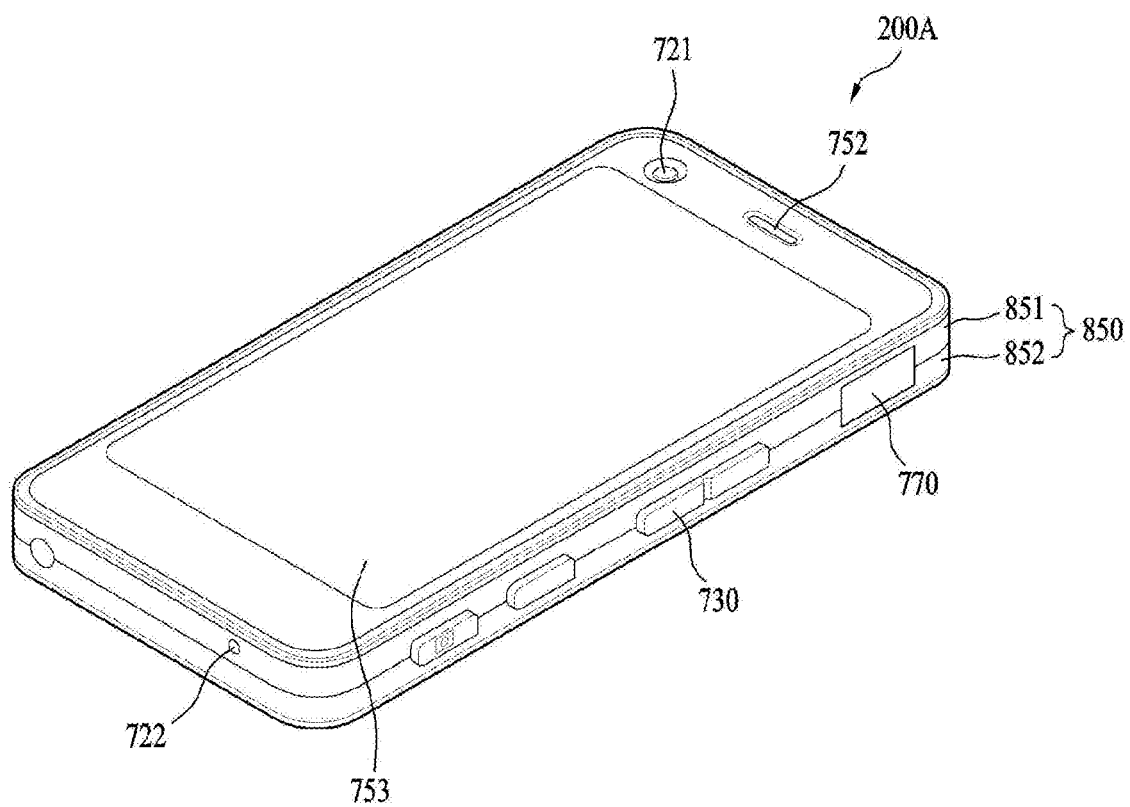
FIG. 59 is a perspective view of a portable terminal according to an embodiment.

FIG. 59 is a perspective view illustrating a portable terminal 200A according to an embodiment. FIG. 60 is a view illustrating the configuration of the portable terminal 200A illustrated in FIG. 59.

Referring to FIGS. 59 and 60, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 59 has a bar shape, without being limited thereto, and may be any of various types such as, for example, a slide type, a folder type, a swing type, or a swivel type, in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera 200 including the camera module 200 according to the embodiment shown in FIG. 59.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals applied thereto. For example, the display module 751 may include at least one among a liquid crystal display, a thin-film-transistor-liquid crystal display, an organic light-emitting diode, a flexible display and a 3D display.

The sound output module 752 may output audio data received from the wireless communication unit 710 in, for example, a call signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 180 or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configuration, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

The embodiments may be applied to a lens moving apparatus capable of reducing the intensity of current flowing through the support members and thus reducing power consumption and of inhibiting deterioration of reliability in OIS driving attributable to a reduction in the diameter of an OIS wire, and a camera module and an optical device each including the lens moving apparatus.

The invention claimed is:
1. A lens moving apparatus comprising:
a base;
a circuit board disposed on an upper surface of the base;
a housing disposed on the circuit board;
a bobbin disposed in the housing;
a first coil disposed on the bobbin;
a first magnet disposed on the housing;
an upper elastic member coupled both to the bobbin and to the housing;
a terminal portion coupled to the base; and
a support member comprising one part coupled to the upper elastic member and another part coupled to the terminal portion via a solder,
wherein the terminal portion is positioned lower than a lower surface of the circuit board and positioned higher than a lower surface of the base, wherein the base comprises a stepped portion depressed from the upper surface of the base, and the terminal portion is disposed in the stepped portion, and wherein an outermost perimeter of the base includes the stepped portion.

2. The lens moving apparatus according to claim 1, wherein the another part of the support member is disposed to be spaced apart from the circuit board.

3. The lens moving apparatus according to claim 1, wherein the another part of the support member is positioned lower than a lower surface of the circuit board and positioned higher than a lower surface of the base.

4. The lens moving apparatus according to claim 1, wherein the terminal portion is conductively connected to the circuit board.

5. The lens moving apparatus according to claim 1, wherein the solder is disposed under a lower surface of the terminal portion.

6. The lens moving apparatus according to claim 1, wherein the terminal portion comprises a hole and the another part of the support member is coupled to the terminal portion through the hole of the terminal portion.

7. The lens moving apparatus according to claim 1, wherein the circuit board comprises a pad portion coupled to the terminal portion.

8. The lens moving apparatus according to claim 1, wherein the upper elastic member comprises a hole through which the one part of the support member passes.

9. The lens moving apparatus according to claim 1, comprising:
a second magnet disposed on the bobbin; and
a position sensor disposed on the housing so as to correspond to the second magnet.

10. The lens moving apparatus according to claim 1, comprising a second coil facing the first magnet, and
wherein the housing is configured to move in a direction perpendicular to an optical axis by an interaction between the first magnet and the second coil.

11. The lens moving apparatus according to claim 10, comprising a position sensor disposed on the base and electrically connected to the circuit board.

12. The lens moving apparatus according to claim 1 wherein the stepped portion is formed in a corner portion of the base.

13. The lens moving apparatus according to claim 5, wherein the solder is coupled to the lower surface of the terminal portion.

14. The lens moving apparatus according to claim 1, wherein the terminal portion comprises a conductive material.

15. The lens moving apparatus according to claim 1, wherein the base comprises a protrusion formed on a lower surface of the stepped portion, and
wherein the terminal portion comprises a hole with which the protrusion of the base is coupled.

16. The lens moving apparatus according to claim 1, wherein the base comprises a groove configured to avoid spatial interference with the another part of the support member.

17. The lens moving apparatus according to claim 1, wherein the circuit board comprises at least one terminal member bent from an upper surface thereof.

18. A lens moving apparatus comprising:
a base;
a circuit board disposed on an upper surface of the base;
a housing disposed on the circuit board;
a bobbin disposed in the housing;
a first coil disposed on the bobbin;
a first magnet disposed on the housing;
an upper elastic member coupled both to the bobbin and to the housing;
a terminal portion coupled to the base; and
a support member comprising one part coupled to the upper elastic member and another part coupled to the terminal portion,
wherein the base comprises a stepped portion depressed from the upper surface of the base, and the terminal portion is disposed in the stepped portion, and
wherein an outermost perimeter of the base includes the stepped portion.

19. The lens moving apparatus according to claim 1, wherein the stepped portion comprises a first surface positioned lower than the upper surface of the base and a second surface connecting the first surface and the upper surface of the base, and
wherein the terminal portion is disposed on the first surface of the stepped portion.

20. A lens moving apparatus comprising:
a base;
a circuit board disposed on an upper surface of the base;
a housing disposed on the circuit board;
a bobbin disposed in the housing;
a first coil disposed on the bobbin;
a first magnet disposed on the housing;
an upper elastic member coupled both to the bobbin and to the housing;
a terminal portion coupled to the base; and
a support member comprising one part coupled to the upper elastic member and another part coupled to the terminal portion via a solder,
wherein the terminal portion is positioned lower than a lower surface of the circuit board and positioned higher than a lower surface of the base,
wherein the base comprises a stepped portion depressed from the upper surface of the base, and the terminal portion is disposed in the stepped portion,
wherein the base comprises a protrusion formed on a lower surface of the stepped portion, and
wherein the terminal portion comprises a hole with which the protrusion of the base is coupled.

* * * * *